US011907930B2

(12) United States Patent
Barta et al.

(10) Patent No.: US 11,907,930 B2
(45) Date of Patent: *Feb. 20, 2024

(54) SYSTEMS AND METHODS FOR MANAGING TRANSACTIONS FOR A MERCHANT

(71) Applicant: MASTERCARD INTERNATIONAL INCORPORATED, Purchase, NY (US)

(72) Inventors: Deborah Barta, Wildwood, MO (US); David C. Brown, Dardenne Prairie, MO (US); Adam K. Hosp, Lake St. Louis, MO (US); Matthew Wickman, O'Fallon, MO (US); Joshua G. Monroe, Wentzville, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/887,107

(22) Filed: Aug. 12, 2022

(65) Prior Publication Data

US 2022/0391881 A1 Dec. 8, 2022

Related U.S. Application Data

(63) Continuation of application No. 16/697,759, filed on Nov. 27, 2019, now Pat. No. 11,416,845, which is a
(Continued)

(51) Int. Cl.
*G06Q 20/38* (2012.01)
*G06Q 20/34* (2012.01)
*G06Q 20/12* (2012.01)

(52) U.S. Cl.
CPC ............. *G06Q 20/34* (2013.01); *G06Q 20/12* (2013.01)

(58) Field of Classification Search
CPC ......... G06Q 20/34; G06Q 20/12; G06Q 20/38
(Continued)

(56) References Cited

U.S. PATENT DOCUMENTS 5,757,917 A 5/1998 Rose
5,870,473 A 2/1999 Boesch
(Continued)

OTHER PUBLICATIONS

Dialog NPL (non-patent literature) Search, dated Apr. 7, 2022. (Year: 2022).
(Continued)

*Primary Examiner* — Hai Tran
(74) *Attorney, Agent, or Firm* — Armstrong Teasdale LLP

(57) ABSTRACT

A method and system for managing payment transactions for a merchant using a computing device coupled to a memory device is described. Each transaction is initiated by a consumer using a payment card. The method includes receiving a registration request from a candidate merchant for enrollment within a manager module wherein the registration request includes registration data associated with the candidate merchant, executing a primary approval process using at least some of the registration data, and transmitting an account request message requesting an opening of a merchant account for the candidate merchant with an acquiring bank upon approval. The method further includes receiving, in real-time, merchant account data associated with the candidate merchant from the acquiring bank upon approval by a secondary approval process wherein the candidate merchant becomes a registered merchant upon the secondary approval. The method further includes managing a first payment transaction submitted by the registered merchant.

20 Claims, 45 Drawing Sheets

Related U.S. Application Data continuation of application No. 13/865,838, filed on Apr. 18, 2013, now abandoned.

(60) Provisional application No. 61/751,166, filed on Jan. 10, 2013, provisional application No. 61/635,154, filed on Apr. 18, 2012.

(58) Field of Classification Search
USPC .......................................................... 705/39
See application file for complete search history.

(56) References Cited

U.S. PATENT DOCUMENTS

| | | | |
|---|---|---|---|
| 6,092,053 A | 7/2000 | Boesch | |
| 6,752,313 B1 * | 6/2004 | Caviles | G06Q 40/02 235/375 |
| 6,993,572 B2 | 1/2006 | Ross, Jr. | |
| 7,096,192 B1 | 8/2006 | Pettitt | |
| 7,139,565 B2 | 11/2006 | Fiatal | |
| 7,249,094 B2 | 7/2007 | Levchin | |
| 7,333,953 B1 | 2/2008 | Banaugh | |
| 7,346,551 B2 | 3/2008 | Pe Jimenez | |
| 7,403,922 B1 | 7/2008 | Lewis | |
| 7,630,924 B1 | 12/2009 | Collins | |
| 7,647,278 B1 | 1/2010 | Foth | |
| 7,752,084 B2 | 7/2010 | Pettitt | |
| 7,814,017 B2 | 10/2010 | Vancini | |
| 7,853,984 B2 | 12/2010 | Antell | |
| 7,865,427 B2 | 1/2011 | Wright | |
| 7,970,701 B2 | 6/2011 | Lewis | |
| 7,983,987 B2 | 7/2011 | Kranzley | |
| 8,019,678 B2 | 9/2011 | Wright | |
| 8,041,620 B2 | 10/2011 | Collins | |
| 8,046,271 B2 | 10/2011 | Jimenez | |
| 8,050,997 B1 | 11/2011 | Nosek | |
| 8,073,865 B2 | 12/2011 | Davis | |
| 8,108,260 B2 | 1/2012 | Maguire | |
| 8,145,537 B2 | 3/2012 | Wehmann | |
| 8,170,932 B1 | 5/2012 | Krakowiecki | |
| 8,195,565 B2 | 6/2012 | Bishop | |
| 8,204,826 B2 | 6/2012 | Banaugh | |
| 8,214,285 B2 | 7/2012 | Hu | |
| 8,275,704 B2 | 9/2012 | Bishop | |
| 8,326,760 B2 | 12/2012 | Ma | |
| 2002/0156724 A1 | 10/2002 | Levchin | |
| 2003/0014317 A1 | 1/2003 | Siegel | |
| 2004/0006532 A1 * | 1/2004 | Lawrence | G06Q 40/08 705/38 |
| 2004/0107170 A1 * | 6/2004 | Labrou | G06Q 20/04 705/64 |
| 2007/0027832 A1 | 2/2007 | Fiatal | |
| 2008/0071682 A1 | 3/2008 | Dominguez | |
| 2009/0216861 A1 | 8/2009 | Shiely | |
| 2010/0049656 A1 | 2/2010 | Roubal | |
| 2010/0114776 A1 | 5/2010 | Weller | |
| 2011/0060663 A1 | 3/2011 | Mcphie | |
| 2011/0112897 A1 | 5/2011 | Tietzen | |
| 2011/0213898 A1 | 9/2011 | Fiatal | |
| 2011/0218909 A1 | 9/2011 | Collins | |
| 2011/0264581 A1 | 10/2011 | Clyne | |
| 2012/0011026 A1 | 1/2012 | Jimenez | |
| 2012/0066044 A1 | 3/2012 | Honnef | |
| 2012/0084208 A1 | 4/2012 | Powell | |
| 2012/0130847 A1 | 5/2012 | Kalin | |
| 2012/0150644 A1 | 6/2012 | Shiely | |
| 2012/0197700 A1 | 8/2012 | Kalin | |
| 2012/0197753 A1 | 8/2012 | Kalin | |
| 2012/0197754 A1 | 8/2012 | Kalin | |
| 2012/0253976 A1 | 10/2012 | Roubal | |
| 2012/0260199 A1 | 10/2012 | Griffin | |
| 2012/0271700 A1 | 10/2012 | Light | |
| 2012/0284145 A1 | 11/2012 | Kalin | |

OTHER PUBLICATIONS

Dialog NPL (non-patent literature) Search, dated Dec. 29, 2021. (Year: 2021).
European Search Report, Application No. 13778131.6, dated Oct. 2, 2015. pp 7.
Google NPL Search, dated Apr. 7, 2022. (Year: 2022).
Google Patent Search, dated Apr. 7, 2022. (Year: 2022).
International Search Report and Written Opinion, Patent Application No. PCT/US2013/037215, dated Jul. 25, 2013, pp 10.

* cited by examiner

FIG. 26

SYSTEMS AND METHODS FOR MANAGING TRANSACTIONS FOR A MERCHANT

CROSS-REFERENCE TO RELATED APPLICATIONS

This application is a continuation application of and claims priority to U.S. patent application Ser. No. 16/697,759 filed Nov. 27, 2019, which is a continuation of and claims priority to U.S. patent application Ser. No. 13/865,838, filed Apr. 18, 2013, which claims the benefit of U.S. Provisional Application No. 61/635,154, filed Apr. 18, 2012, and of U.S. Provisional Application No. 61/751,166, filed Jan. 10, 2013, the entire contents of which are all hereby incorporated by reference in their entirety.

BACKGROUND OF THE INVENTION

This invention relates generally to managing transactions for a merchant and, more particularly, to network-based methods and systems for registering and underwriting a merchant with an acquiring bank in real-time for processing payment card transactions, and managing the transactions for the merchant including providing transaction management services to the merchant.

There are service provider companies that provide a variety of services to numerous consumers. These service provider companies utilize computer systems to provide these services. For example, in the financial industry, companies such as large banks, interchange networks and payment networks provide certain financial services to consumers, merchants, companies and other banks. Oftentimes, these service provider companies provide services that include receiving, processing and storing financial data in computer systems managed by the service provider companies. In many cases, access to this financial data is restricted to certain approved users. Restricting access to such financial data provides at least some protection for the data. However, it also limits the potential uses of the data.

For example, an acquiring bank (or acquirer) is the bank or financial institution that processes credit and/or debit card payments for products or services for a merchant. The term acquirer indicates that the bank accepts or acquires payment card transactions from merchants. In these known system, the acquiring bank will contract with the merchant, and will create a merchant account for the merchant at the acquiring bank. The arrangement is actually a line of credit and not a bank account. Under the agreement, the acquiring bank exchanges funds with issuing banks on behalf of the merchant, and pays the merchant for the net balance of their daily payment card activity: gross sales minus reversals, interchange fees, and acquirer fees.

Because this arrangement includes a line of credit, the acquiring bank is accepting certain risks. For example, the acquiring bank accepts the risk that the merchant will remain solvent over time. Thus, before an acquiring bank will approve a merchant for processing payment card transactions, the acquiring bank will require the merchant to complete an extensive application process wherein the merchant is required to provide very detailed financial information so that the acquiring bank can review it before making its decision about whether to underwrite the merchant. The process of submitting and reviewing the merchant application is very complicated and time consuming, and can prevent many smaller to mid-size merchants from even trying to register for such services. Because of these complexities in trying to navigate the payments ecosystem, many merchants, developers and entrepreneurs have had to forego transacting business using payment card transactions.

In addition, these merchants, who are essentially left out of the payment card processing industry, are unable to access many services relating to the payment card processing industry. In other words, these known systems, which are extremely complex, do not enable most small or mid-size merchants to easily register for processing payment card transactions and do not provide transaction management services to these merchants, which would enable these merchants to more efficiently operate their businesses.

BRIEF DESCRIPTION OF THE INVENTION

In one embodiment, a computer-based method for managing payment transactions for a merchant using a computing device coupled to a memory device is provided. Each transaction is initiated by a consumer using a payment card. The method includes receiving, at the computing device, a registration request from a candidate merchant for enrollment within a manager module included within the computing device wherein the registration request includes registration data associated with the candidate merchant, executing by the merchant manager module a primary approval process using at least some of the registration data, and transmitting an account request message requesting an opening of a merchant account for the candidate merchant with an acquiring bank upon approval by the primary approval process wherein the account request message includes the registration data. The method further includes receiving, in real-time, merchant account data associated with the candidate merchant from the acquiring bank upon approval by a secondary approval process, wherein the acquiring bank performs the secondary approval process using at least some of the registration data, wherein the merchant account data represents an agreement by the acquiring bank to underwrite payment transactions submitted by the candidate merchant to the merchant manager module, and wherein the candidate merchant becomes a registered merchant upon the secondary approval. The method further includes managing, at the merchant manager module, a first payment transaction submitted by the registered merchant by transmitting transaction data associated with the first payment transaction and the merchant account data to a payment processor for processing.

In another embodiment, a computer system for managing payment transactions for a merchant is provided, wherein each transaction is initiated by a consumer using a payment card. The system includes a memory device for storing data; and a processor in communication with the memory device. The processor is programmed to receive a registration request from a candidate merchant for enrollment within a manager module, the registration request including registration data associated with the candidate merchant, the manager module in communication with the processor. The processor is also programmed to cause the merchant manager module to execute a primary approval process using at least some of the registration data. The processor is also programmed to transmit an account request message requesting an opening of a merchant account for the candidate merchant with an acquiring bank upon approval by the primary approval process, wherein the account request message includes the registration data. The processor is also programmed to receive, in real-time, merchant account data associated with the candidate merchant from the acquiring bank upon approval by a secondary approval process, wherein the acquiring bank performs the secondary approval process using at least some of the registration data, the merchant account data representing an agreement by the acquiring bank to underwrite payment transactions submitted by the candidate merchant to the merchant manager module, the candidate merchant becoming a registered merchant upon secondary approval. The processor is also programmed to cause the merchant manager module to manage a first payment transaction submitted by the registered merchant by transmitting transaction data associated with the first payment transaction and the merchant account data to a payment processor for processing.

In another embodiment, one or more computer-readable storage media having computer-executable instructions embodied thereon for managing payment transactions for a merchant are provided, wherein each transaction is initiated by a consumer using a payment card. When executed by at least one processor, the computer-executable instructions cause the processor to receive a registration request from a candidate merchant for enrollment within a manager module, the registration request including registration data associated with the candidate merchant, the manager module in communication with the at least one processor. The computer-executable instructions also cause the processor to cause the merchant manager module to execute a primary approval process using at least some of the registration data. The computer-executable instructions also cause the processor to transmit an account request message requesting an opening of a merchant account for the candidate merchant with an acquiring bank upon approval by the primary approval process, wherein the account request message includes the registration data. The computer-executable instructions also cause the processor to receive, in real-time, merchant account data associated with the candidate merchant from the acquiring bank upon approval by a secondary approval process, wherein the acquiring bank performs the secondary approval process using at least some of the registration data, the merchant account data representing an agreement by the acquiring bank to underwrite payment transactions submitted by the candidate merchant to the merchant manager module, the candidate merchant becoming a registered merchant upon secondary approval. The computer-executable instructions also cause the processor to cause the merchant manager module to manage a first payment transaction submitted by the registered merchant by transmitting transaction data associated with the first payment transaction and the merchant account data to a payment processor for processing.

In another embodiment, a computer-based method for managing transactions for a merchant using a manager module hosted by a service provider (SP) computer system and accessible through an application programming interface (API) platform is provided. The method comprises receiving a request for access to the merchant manager module from a merchant wherein the request is received at the API platform, and causing to be displayed a dashboard including a plurality of merchant manager modules including a payment application, a customers application, an inventory application, a coupons and offers application, an analytics application and a fraud management application. The method further includes receiving from the merchant a selection of an application from the merchant manager module, receiving input data from the merchant related to the selected application, and processing the input data within the selected application.

In another aspect, a computer system for managing transactions for a merchant using a manager module hosted by a service owner (SO) computer device is provided. The SO computer device is associated with a SO. The computer system comprises a memory device for storing data; and a service provider (SP) computer system comprising a processor and an application programming interface (API) platform. The SP computer system is in communication with the memory device and the SO computer device. The SP computer system is programmed to: receive a request for access to the merchant manager module from a merchant wherein the request is received at the API platform, and cause to be displayed a dashboard including a plurality of merchant manager modules including a payment application, a customers application, an inventory application, a coupons and offers application, an analytics application and a fraud management application. The SP computer system is further programmed to receive from the merchant a selection of an application from the merchant manager module; receive input data from the merchant related to the selected application; and process the input data within the selected application.

In one aspect, a computer-based method for managing merchant transactions by at least one service application stored within a service provider (SP) computer system through an application programming interface (API) platform is provided. Moreover, a merchant manager module that is hosted on the (SP) computer system and that is accessible by a remote computer device is provided. The merchant manager module is configured to facilitate management of merchant operations including payment management, customer management, inventory management, coupon and offer management, business analytics and fraud protection.

In another embodiment, a computer system for managing merchant transactions by at least one service application stored within a service owner (SO) computer device is provided. The SO computer device is associated with a SO. The computer system includes a memory device for storing data, and a service provider (SP) computer system. The SP computer system includes a processor and an application programming interface (API) platform. The SP computer system is in communication with the memory device and the SO computer device. Moreover, a merchant manager module that is hosted on the (SP) computer system and that is accessible by a remote computer device is provided. The merchant manager module is configured to facilitate management of merchant operations including payment management, customer management, inventory management, coupon and offer management, business analytics and fraud protection.

In another embodiment, a computer system for managing merchant transactions by at least one service application is provided. The computer system includes a service owner (SO) computer device associated with a SO, a memory device for storing data, and a service provider (SP) computer device comprising a processor and an application programming interface (API) platform. The SO computer device is configured to store the service application and grant access to the service application. The SP computer device is in communication with the memory device and the SO computer device. Moreover, a merchant manager module that is hosted on the (SP) computer system and that is accessible by a remote computer device is provided. The merchant manager module is configured to facilitate management of merchant operations including payment management, customer management, inventory management, coupon and offer management, business analytics and fraud protection.

In another embodiment, one or more computer-readable non-transitory media comprising a computer-executable program that instructs at least one processor to provide access to a service application stored within a service provider (SP) computer system through an application programming interface (API) platform is provided.

In another embodiment, a computer-based method for managing transactions for a merchant using a merchant manager module hosted by a service provider (SP) computer system and accessible through an application programming interface (API) platform is provided. The method includes activating a merchant account with the merchant manager module, generating merchant credentials associated with the merchant account, receiving, at the merchant manager module, a transaction request from the merchant that includes the merchant credentials, and determining whether to approve or deny the transaction based at least in part on the merchant credentials.

BRIEF DESCRIPTION OF THE DRAWINGS

FIGS. 1-44 show example embodiments of the methods and systems described herein.

FIG. 1 is a schematic diagram illustrating an example multi-party payment card industry system for enabling ordinary payment-by-card transactions in which merchants and card issuers do not necessarily have a one-to-one relationship.

FIG. 2 is a simplified block diagram of an example service system including a plurality of computer devices in accordance with one embodiment of the present invention.

FIG. 4 is a block diagram of an example embodiment of a user computer device as shown in FIGS. 2 and 3A.

FIG. 5 is a block diagram of an example embodiment of a server computer device as shown in FIGS. 2 and 3A.

FIG. 6 is a flow chart showing an example activation process using a merchant manager module in accordance with one embodiment of the present invention.

FIG. 7 is a flow chart showing an example transaction process using the merchant manager module in accordance with one embodiment of the present invention.

FIG. 8 is a flow chart showing an example deposit process using the merchant manager module in accordance with one embodiment of the present invention.

FIG. 9 is a flow chart showing an example billing process using the merchant manager module in accordance with one embodiment of the present invention.

FIG. 10 is an example screenshot for an introduction screen for a merchant manager module showing category links, in accordance with one embodiment of the present invention.

FIG. 11 is an example screenshot for a sign-in screen for a merchant manager module in accordance with one embodiment of the present invention.

FIG. 12 is an example screenshot for a registration screen for a merchant manager module in accordance with one embodiment of the present invention.

FIG. 13 is an example screenshot for a dashboard for a merchant manager module in accordance with one embodiment of the present invention.

FIG. 14 is an example screenshot illustrating an account settings screen for a merchant manager module in accordance with one embodiment of the present invention.

FIG. 15 is an example screenshot for an account activation screen for a merchant manager module in accordance with one embodiment of the present invention.

FIG. 16 is an example screenshot for a payment activation screen for a merchant manager module in accordance with one embodiment of the present invention.

FIG. 17 is an example screenshot for a payment category screen for a merchant manager module in accordance with one embodiment of the present invention.

FIG. 18 is an example screenshot for a create payments screen for a merchant manager module in accordance with one embodiment of the present invention.

FIG. 19 is an example screenshot for a create new customers screen for a merchant manager module in accordance with one embodiment of the present invention.

FIG. 20 is an example screenshot for a search customers category screen for a merchant manager module in accordance with one embodiment of the present invention.

FIG. 21 is an example screenshot for an inventory category screen for a merchant manager module in accordance with one embodiment of the present invention.

FIG. 22 is an example screenshot for a new inventory screen for a merchant manager module in accordance with one embodiment of the present invention.

FIG. 23 is an example screenshot illustrating a coupon and offer campaigns screen for a merchant manager module in accordance with one embodiment of the present invention.

FIG. 24 is an example screenshot illustrating a new offer campaign screen for a merchant manager module in accordance with one embodiment of the present invention.

FIG. 25 is an example screenshot illustrating analytic categories for a merchant manager module in accordance with one embodiment of the present invention.

FIG. 26 is an example screenshot for a call log for a merchant manager module in accordance with one embodiment of the present invention.

FIG. 27 is an example screenshot for an input device, such as the user computing device shown in FIGS. 2 and 3A, according to an embodiment of the invention.

FIG. 28 is another example screenshot for an input device, such as the user computing device shown in FIGS. 2 and 3A, according to an embodiment of the invention.

FIG. 29 is another example screenshot for an input device, such as the user computing device shown in FIGS. 2 and 3A, according to an embodiment of the invention.

FIG. 30 is an example screenshot for a dashboard screen appearing on another input device such as the input device shown in FIGS. 2 and 3A.

FIG. 31 is an example screenshot for another dashboard screen appearing on an input device such as the input device shown in FIGS. 2 and 3A.

FIG. 32 is an example screenshot illustrating a category selection screen for an input device such as the input device shown in FIGS. 2 and 3A.

FIG. 33 is an example screenshot showing payment information, for an input device such as the input device shown in FIGS. 2 and 3A.

FIG. 34 is an example screenshot for a checkout screen, for an input device such as the input device shown in FIGS. 2 and 3A.

FIG. 35 is an example screenshot showing customer and visit information, for an input device such as the input device shown in FIGS. 2 and 3A.

FIG. 36 is an example screenshot showing payment options, for an input device such as the input device shown in FIGS. 2 and 3A.

FIG. 37 is an example screenshot showing coupon offerings, for an input device such as the input device shown in FIGS. 2 and 3A.

FIG. 38 is an example screenshot showing inventory information, for an input device such as the input device shown in FIGS. 2 and 3A.

FIG. 39 is an example screenshot showing checked out items, for an input device such as the input device shown in FIGS. 2 and 3A.

FIG. 40 is an example screenshot showing checkout information, for an input device such as the input device shown in FIGS. 2 and 3A.

FIG. 41 is an example screenshot showing payment information, for an input device such as the input device shown in FIGS. 2 and 3A.

FIG. 42 is an example screenshot showing items and sales information, for an input device such as the input device shown in FIGS. 2 and 3A.

FIG. 43 is an example screenshot showing customer and visit information, for an input device such as the input device shown in FIGS. 2 and 3A.

FIG. 44 is an example screenshot showing a login screen, for an input device such as the input device shown in FIGS. 2 and 3A.

DETAILED DESCRIPTION OF THE INVENTION

Figure 1:
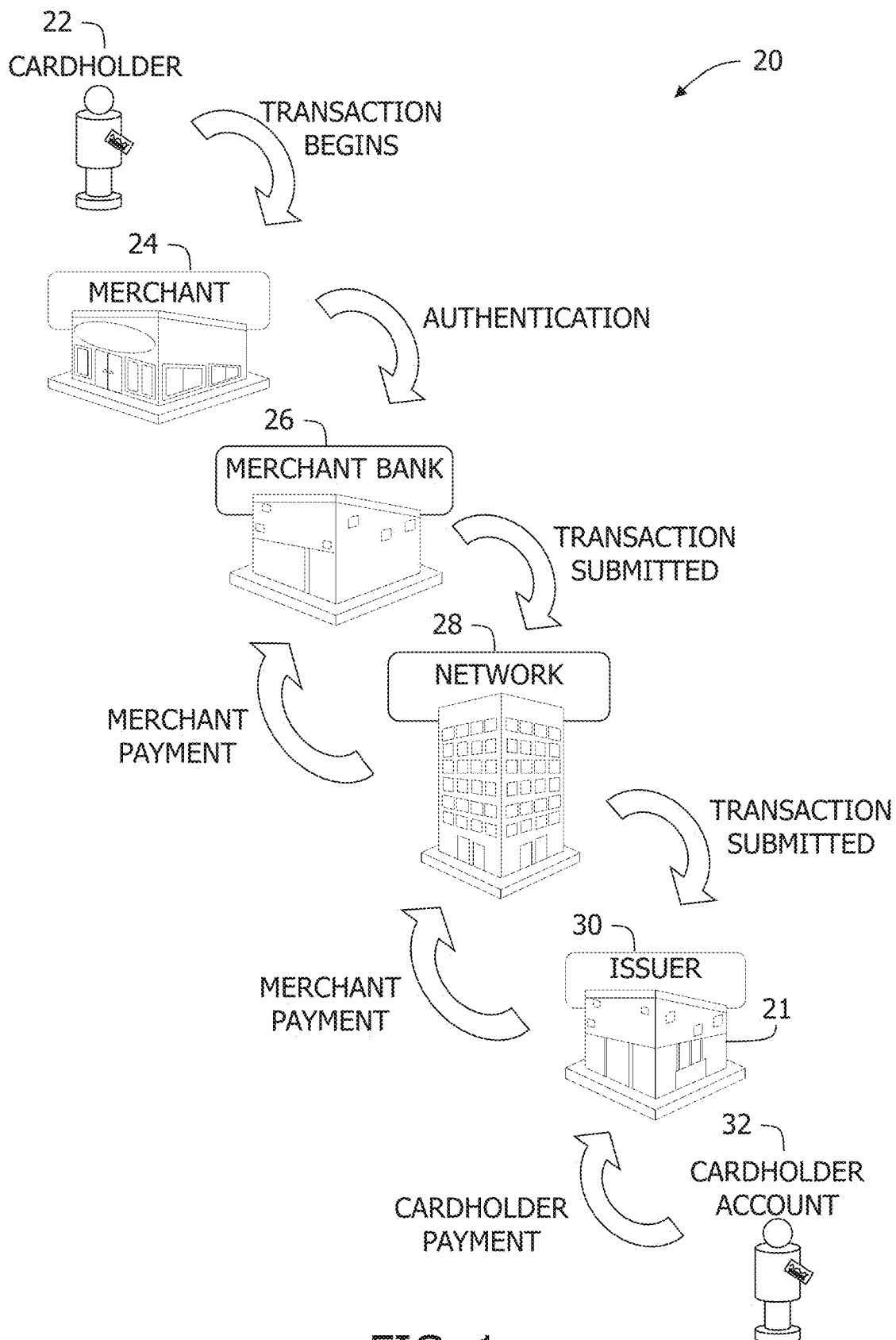

Embodiments of the methods and systems described herein enable a service provider company associated with a service provider computer system, which includes service applications stored therein, to offer access to the service applications for use by merchants and/or developers of computer software applications. The merchants access a merchant manager module stored within the service provider (SP) computer system through a merchant portal and an application programming interface (API) platform. The developers access the service applications stored within the service provider (SP) computer system through a developer portal and an application programming interface (API) platform. The service applications are stored within service owner (SO) computer devices, which are included with the SP computer system. The developers may for example access the server applications when configuring a website for a merchant to process payment card transactions using the merchant website in accordance with the systems and methods described herein.

More specifically, a computer-based method for managing payment transactions for a merchant is described herein. The transactions are managed by the service provider (SP) using a computing device coupled to a memory device. The computing device includes a processor and a manager module configured to enroll a candidate merchant in the service, and provide the service to the merchant. The computing device is associated with the SP. The transactions are initiated by consumers using payment cards. A registration request from a candidate merchant for enrollment within the manager module included within the computing device is received at the computing device. The registration request includes registration data associated with the candidate merchant. In an example embodiment, the registration data includes predetermined merchant data elements such as: a legal name, a statement name, a URL (Uniform Resource Locator), a description, a customer service phone number, a business address, a business city, a business state, a business zip code, a business state of filing, a business start date, a business type, a tax id/EIN, an owner first name, an owner last name, an owner address, an owner city, an owner state, an owner zip code, a social security number, a date of birth, a phone number, a mobile phone number, a bank name, a routing number, an account number, an average payment amount, an average number of payments monthly, a maximum payment amount, whether the merchant ships goods (Y/N), and a typical number of days to delivery.

In an example embodiment, the merchant manager module executes a primary approval process using at least some of the registration data. The primary approval process may include, for example, comparing the candidate merchant and/or the registration data of the candidate merchant to a list of high risk merchants who are not eligible for receiving this service. The high risk merchant list is stored in the memory device coupled to the computing device associated with the SP. In another embodiment, the primary approval process includes a model configured to receive at least some of the registration data, and determine whether the candidate merchant is a high risk merchant that should not be approved for processing payment card transactions. The candidate merchant is approved under the primary approval process if the comparison of the candidate merchant and/or the candidate merchant's registration data with the high risk merchant list generates a "no match," wherein the "no match" indicates a low risk that the candidate merchant is a high risk merchant.

In an example embodiment, the merchant manager module transmits an account request message requesting an opening of a merchant account for the candidate merchant with an acquiring bank upon approval by the primary approval process. The account request message includes the registration data. In the example embodiment, the acquiring bank has previously agreed with the SP to underwrite merchants that (i) provide certain registration information to the SP, (ii) are initially approved by the SP, and (iii) are subsequently approved by the acquiring bank. The merchant data elements are required by the acquiring bank prior to agreeing in real-time to underwrite payment transactions submitted through the merchant manager module.

In the example embodiment, the merchant manager module receives, in real-time, merchant account data associated with the candidate merchant from the acquiring bank upon approval by a secondary approval process. The acquiring bank performs the secondary approval process using at least some of the registration data. The merchant account data represents an agreement by the acquiring bank to underwrite payment transactions submitted by the candidate merchant to the merchant manager module. The candidate merchant becomes a registered merchant upon the secondary approval. In the example embodiment, real-time means between 0 and 30 seconds, and more specifically, between 0 and 10 seconds, and even more specifically, between 0 and 5 seconds.

In the example embodiment, after the merchant account data is received from the acquirer, the merchant manager module requests the provisioning of credentials for the registered merchant by a payment processor. The merchant manager module stores the registered merchant credentials received from the payment processor within the memory device. The merchant manager module then notifies the registered merchant that an account has been activated, such that the registered merchant is approved to submit to the merchant manager module payment transactions initiated by consumers using payment cards. In the example embodiment, the registered merchant credentials include security keys for access and communicating with the merchant manager module. The security keys can be provided to a developer of the merchant website so that it can be configured to communicate payment card transactions with the merchant manager module.

In the example embodiment, the merchant manager module manages at least one payment transaction submitted by the registered merchant by transmitting transaction data associated with the at least one payment transaction and the merchant account data to a payment processor for processing.

In the example embodiment, the computing device causes a dashboard to be displayed on a merchant computing device associated with the registered merchant, wherein the dashboard includes a plurality of merchant manager applications including a payment application, a customers application, an inventory application, a coupons and offers application, an analytics application and a fraud management application.

In the example embodiment, the merchant manager module receives from the merchant computing device a selection of an application from the merchant manager application. The merchant manager module further receives input data from the merchant computing device related to the selected merchant manager application. The merchant manager module processes the input data within the selected application.

In an embodiment, software developers may use data from the service applications in response to executing a developer application. A developer uses a developer computer system to send a request for access to a selected service application stored within the SP computer system by accessing the developer portal, and the API platform receives and forwards the developer request for access to the SO of the selected service application, who in turn approves or denies the developer request. Each SO being an owner of a particular service or set of services included within the overall SP computer system.

In the example embodiment, the service provider computer system is a financial service computer system that provides financial transaction services to developers, consumers, merchants, acquirers and/or issuers. The services may include providing data representing financial transactions, processing payment card transactions, locating banks or ATMs, providing information such as discounts and offers, etc.

In the exemplary embodiment, the service provider computer system includes a merchant manager module. The merchant manager module includes a value-added merchant manager system having a module that is hosted on the service computer system and is accessible by a remote computer device associated with a merchant. The merchant manager module allows at least one of small and large merchants, payment providers, acquirers and developers to interact with a plurality of services provided by the service computer system of the service provider. In one embodiment, the merchant manager module is configured to facilitate managing aspects of a merchant's business. Moreover, the module is configured to provide access to dashboard applications to a class of merchants, such as, but not limited to, small merchants and is configured to provide an application program interface (API) to another class of merchants, such as, but not limited to, large merchants. The merchant manager module is configured to provide a plurality of applications that facilitate payment management, customer management, inventory management, coupon and offer management, business analytics and/or fraud protection.

In one embodiment, the module is configured to provide an application for payment management. More particularly, the module is configured to allow merchants to accept payments on a global basis via a plurality of payment channels. For example, the module is configured to accept split-tender (multiple cards per transaction), and/or split-payments (paying 50% with credit, 50% with loyalty points). The module is also configured to provide payment details such as for example, tax/no-tax and SKU-level details.

The module is also configured to manage merchant customers. In one embodiment, the module is configured to link merchant customers with respective payments. More particularly, the module is configured to track payments over time to compile transaction information such as, for example, items bought, amount spent, and payment type.

The module is also configured to manage merchant inventory. In one embodiment, the module is configured to receive inventory information from the merchant and to track inventory status. The module is configured to link inventory to payment transactions to facilitate metric knowledge of buying trends and/or inventory storage trends.

The module is also configured to manage targeted coupons and offers. In one embodiment, the module is configured to allow merchants to create a targeted offer campaign. The module is configured to generate a plurality of target offerings defined by metrics such as, but not limited to, customer demographics, customer purchasing trends, and inventory trends. The module is configured to allow the merchant to send coupons and offers to their customers tailored or linked to specific customers and/or specific customer categories while tracking specific offer success rates.

The module is also configured to manage business analytics. In one embodiment, the module is configured to couple with other module tools to provide information specific to the merchant's business. The module is configured to provide analytics and associated outputs such as graphs, charts and other data illustrating to the success and/or progress of the merchant's business. In one embodiment, the module is configured to facilitate monitoring trends relating to customer purchasing and inventory status.

The module is also configured to manage fraud detection. In one embodiment, the module is configured to provide fraud protection for any transaction that comes through the module. The module is configured to rate or score each transaction and to provide a cutoff value or point depending on the merchant provided risk amount.

The module is coupled to an API to allow the merchant to interact with their data outside of the module dashboard and to allow merchant development of their own tools or applications. Merchant developers can build their own application on top of the module to provide tools specific to the merchant. The module is configured to provide seamless sign-in and registration to the merchant to provide convenient access to the plurality of module tools. In one embodiment, the module provides a "sandbox" module to allow for transaction simulations for the merchant prior to interacting with the merchant customers. Moreover, the module is configured to provide a plurality of payment options to the merchant such as, for example, credit and bank cards provided by the service provider.

In the example embodiment, a developer application can also be executed by a computer system associated with at least one of a consumer, a merchant, an acquirer, a processor and an issuer (collectively used herein as a "user"). In other words, in some cases, a user can download the developer application from the developer computer system for execution by the user computer device. In this embodiment, the user computer sends a developer application message to the API platform. The API platform validates the developer application message, and checks the throttling limit assigned to the developer application before forwarding the developer application message to the proper service application. The service application applies rules (access rules) to the developer application message, returns a number of records in response to the applied rules, and sends a service response to the API platform for forwarding to the user computer device. The developer application receives the service response, and displays the results or uses the results at the user computer system.

The following detailed description illustrates embodiments of the invention by way of example and not by way of limitation. It is contemplated that the invention has general application to processing financial transaction data by a third party in industrial, commercial, and residential applications.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

The methods and systems described herein may be implemented using computer programming or engineering techniques including computer software, firmware, hardware or any combination or subset thereof, wherein the technical effect may be achieved by performing at least one of the following steps: (a) receiving, at a computing device, a registration request from a candidate merchant for enrollment within a manager module included within the computing device, the registration request including registration data associated with the candidate merchant; (b) executing by the merchant manager module a primary approval process using at least some of the registration data; (c) transmitting an account request message requesting an opening of a merchant account for the candidate merchant with an acquiring bank upon approval by the primary approval process, wherein the account request message includes the registration data; (d) receiving, in real-time, merchant account data associated with the candidate merchant from the acquiring bank upon approval by a secondary approval process, wherein the acquiring bank performs the secondary approval process using at least some of the registration data, the merchant account data representing an agreement by the acquiring bank to underwrite payment transactions submitted by the candidate merchant to the merchant manager module, the candidate merchant becoming a registered merchant upon secondary approval; (e) managing, at the merchant manager module, a first payment transaction submitted by the registered merchant by transmitting transaction data associated with the first payment transaction and the merchant account data to a payment processor for processing; (f) receiving, at the computing device, a registration request including registration data associated with the candidate merchant, the registration data including at least one of a legal name, a statement name, a URL (Uniform Resource Locator), a description, a customer service phone number, a business address, a business city, a business state, a business zip code, a business state of filing, a business start date, a business type, a tax id/EIN, an owner first name, an owner last name, an owner address, an owner city, an owner state, an owner zip code, a social security number, a date of birth, a phone number, a mobile phone number, a bank name, a routing number, an account number, an average payment amount, an average number of payments monthly, a maximum payment amount, whether the merchant ships goods (Y/N), and a typical number of days to delivery; (g) storing a high risk merchant list within a memory device; (h) comparing the registration data of the candidate merchant to the high risk merchant list; (i) approving the candidate merchant under the primary approval process if the comparison step generates a no match for the candidate merchant, wherein a no match indicates a low risk that the candidate merchant is a high risk merchant; (j) pre-determining merchant data elements for inclusion within the registration data, the merchant data elements required by the acquiring bank prior to agreeing in real-time to underwrite payment transactions submitted through the merchant manager module; (k) transmitting the account request message and then receiving the merchant account data associated with the candidate merchant from the acquiring bank in real-time, wherein real-time means less than 30 seconds; (l) requesting by the merchant manager module provisioning of credentials for the registered merchant with the payment processor after the merchant account data is received; (m) receiving the registered merchant credentials from the payment processor; (n) storing the registered merchant credentials within the memory device; (o) notifying the registered merchant of account activation, wherein the registered merchant is then approved to submit payment transactions initiated by consumers using payment cards to the merchant manager module; (p) causing to be displayed on a merchant computing device a dashboard including a plurality of merchant manager modules including a payment application, a customers application, an inventory application, a coupons and offers application, an analytics application and a fraud management application, wherein the merchant computing device is associated with the registered merchant; (q) receiving by the merchant manager module from the merchant computing device a selection of an application from the merchant manager module; (r) receiving from the merchant computing device input data related to the selected application; and (s) processing by the merchant manager module the input data within the selected application.

FIG. 1 is a schematic diagram illustrating an example multi-party transaction card industry system 20 for enabling ordinary payment-by-card transactions in which merchants 24 and card issuers 30 do not need to have a one-to-one special relationship. Embodiments described herein may relate to a transaction card system, such as a credit card payment system using the MasterCard® interchange network (which is a type of payment network). The MasterCard® interchange network is a set of proprietary communications standards promulgated by MasterCard International Incorporated® for the exchange of financial transaction data and the settlement of funds between financial institutions that are members of MasterCard International Incorporated®. (MasterCard is a registered trademark of MasterCard International Incorporated located in Purchase, New York).

In a typical transaction card system, a financial institution called the "issuer" issues a transaction card, such as a credit card, to a consumer or cardholder 22, who uses the transaction card to tender payment for a purchase from a merchant 24. To accept payment with the transaction card, merchant 24 must normally establish an account with a financial institution that is part of the financial payment system. This financial institution is usually called the "merchant bank," the "acquiring bank," or the "acquirer." When cardholder 22 tenders payment for a purchase with a transaction card, merchant 24 requests authorization from a merchant bank 26 for the amount of the purchase. The request may be performed over the telephone, but is usually performed through the use of a point-of-sale terminal, which reads cardholder's 22 account information from a magnetic stripe, a chip, or embossed characters on the transaction card and communicates electronically with the transaction processing computers of merchant bank 26. Alternatively, merchant bank 26 may authorize a third party to perform transaction processing on its behalf. In this case, the point-of-sale terminal will be configured to communicate with the third party. Such a third party is usually called a "merchant processor," an "acquiring processor," or a "third party processor."

Using a payment network 28, computers of merchant bank 26 or merchant processor will communicate with computers of an issuer bank 30 to determine whether cardholder's 22 account 32 is in good standing and whether the purchase is covered by cardholder's 22 available credit line. Based on these determinations, the request for authorization will be declined or accepted. If the request is accepted, an authorization code is issued to merchant 24.

When a request for authorization is accepted, the available credit line of cardholder's 22 account 32 is decreased. Normally, a charge for a payment card transaction is not posted immediately to cardholder's 22 account 32 because bankcard associations, such as MasterCard International Incorporated®, have promulgated rules that do not allow merchant 24 to charge, or "capture," a transaction until goods are shipped or services are delivered. However, with respect to at least some debit card transactions, a charge may be posted at the time of the transaction. When merchant 24 ships or delivers the goods or services, merchant 24 captures the transaction by, for example, appropriate data entry procedures on the point-of-sale terminal. This may include bundling of approved transactions daily for standard retail purchases. If cardholder 22 cancels a transaction before it is captured, a "void" is generated. If cardholder 22 returns goods after the transaction has been captured, a "credit" is generated. Payment network 28 and/or issuer bank 30 stores the transaction card information, such as a type of merchant, amount of purchase, date of purchase, in a database 120 (shown in FIG. 2).

After a purchase has been made, a clearing process occurs to transfer additional transaction data related to the purchase among the parties to the transaction, such as merchant bank 26, payment network 28, and issuer bank 30. More specifically, during and/or after the clearing process, additional data, such as a time of purchase, a merchant name, a type of merchant, purchase information, cardholder account information, a type of transaction, itinerary information, information regarding the purchased item and/or service, and/or other suitable information, is associated with a transaction and transmitted between parties to the transaction as transaction data, and may be stored by any of the parties to the transaction. In the example embodiment, when cardholder 22 purchases travel, such as airfare, a hotel stay, and/or a rental car, at least partial itinerary information is transmitted during the clearance process as transaction data. When payment network 28 receives the itinerary information, payment network 28 routes the itinerary information to database 120.

For debit card transactions, when a request for a personal identification number (PIN) authorization is approved by the issuer, cardholder's account 32 is decreased. Normally, a charge is posted immediately to cardholder's account 32. The payment card association then transmits the approval to the acquiring processor for distribution of goods/services or information, or cash in the case of an automated teller machine (ATM).

After a transaction is authorized and cleared, the transaction is settled among merchant 24, merchant bank 26, and issuer bank 30. Settlement refers to the transfer of financial data or funds among merchant's 24 account, merchant bank 26, and issuer bank 30 related to the transaction. Usually, transactions are captured and accumulated into a "batch," which is settled as a group. More specifically, a transaction is typically settled between issuer bank 30 and payment network 28, and then between payment network 28 and merchant bank 26, and then between merchant bank 26 and merchant 24.

Figure 2:
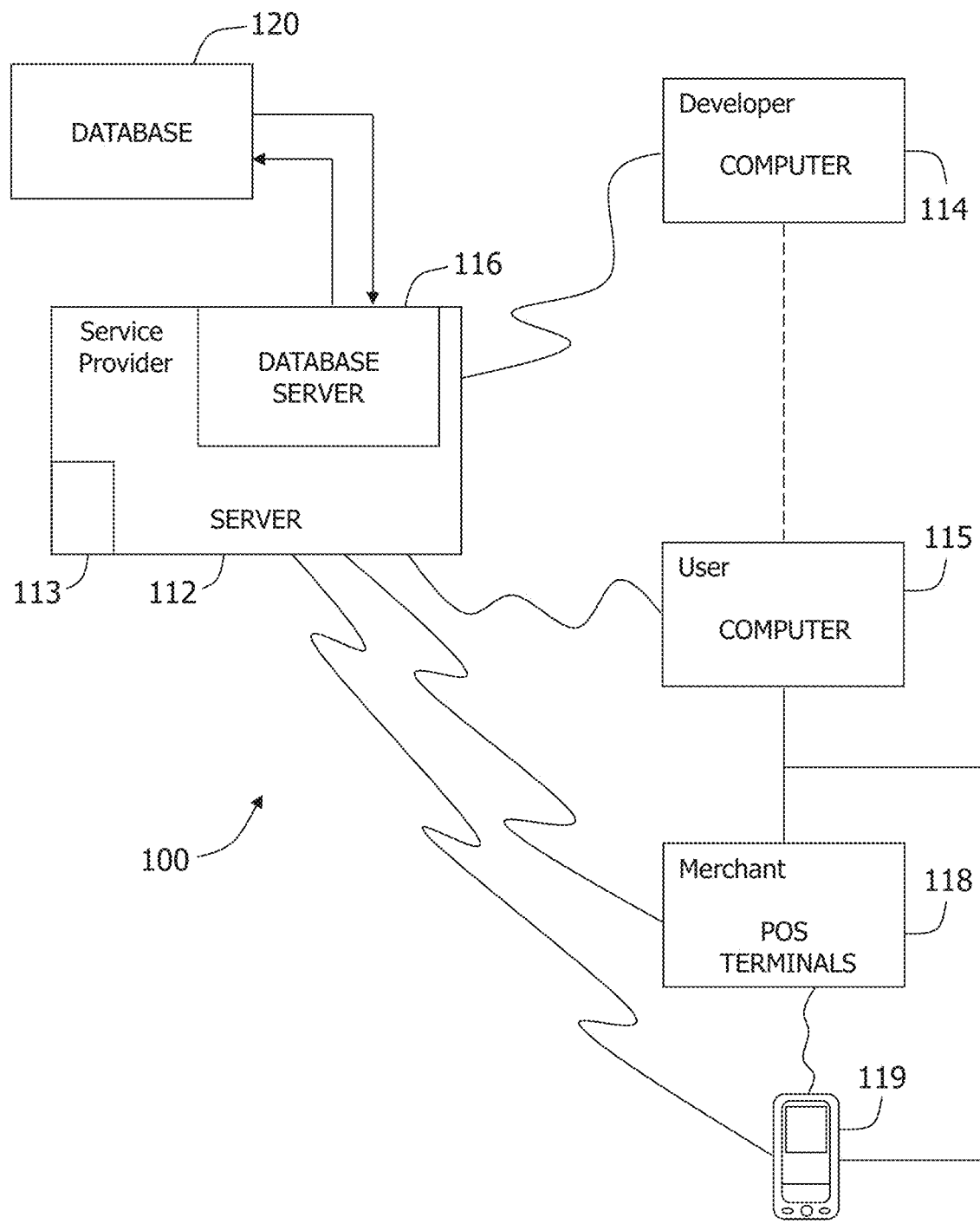

FIG. 2 is a simplified block diagram of an example service computer system 100 including a plurality of computer devices in accordance with one embodiment of the present invention. System 100 includes a service provider system (e.g., financial services provider) that allows developers of computer applications to access a variety of service applications hosted by the service provider (SP) computer system such that the developer applications can utilize data stored within the SP computer system. The developer applications can be utilized by the developer via a developer computer system or can be offered to a consumer, a merchant, an acquirer or an issuer (collectively a "user") for use by the users via user computer systems.

More specifically, in the example embodiment, system 100 includes a server system 112, which is a type of computer system, and a plurality of client sub-systems (also referred to as client systems 114 and 115) connected to server system 112. In one embodiment, client systems 114, 115 are computers including a web browser, such that server system 112 is accessible to client systems 114, 115 using the Internet. Client systems 114, 115 are interconnected to the Internet through many interfaces including a network, such as a local area network (LAN) or a wide area network (WAN), dial-in-connections, cable modems, and special high-speed ISDN lines. Client systems 114, 115 could be any device capable of interconnecting to the Internet including a web-based phone, personal digital assistant (PDA), or other web-based connectable equipment.

System 100 also includes point-of-sale (POS) terminals 118, which may be connected to client systems 114, 115 and may be connected to server system 112. POS terminals 118 are interconnected to the Internet through many interfaces including a network, such as a local area network (LAN) or a wide area network (WAN), dial-in-connections, cable modems, wireless modems, and special high-speed ISDN lines. POS terminals 118 could be any device capable of interconnecting to the Internet and including an input device capable of reading information from a consumer's financial transaction card.

System 100 also includes at least one input device 119, which is configured to communicate with at least one of POS terminal 118, client systems 114, 115 and server system 112. In the example embodiment, input device 119 is associated with or controlled by a merchant managing an inventory and/or a customer making a purchase. Input device 119 is interconnected to the Internet through many interfaces including a network, such as a local area network (LAN) or a wide area network (WAN), dial-in-connections, cable modems, wireless modems, and special high-speed ISDN lines. Input device 119 could be any device capable of interconnecting to the Internet including a web-based phone, personal digital assistant (PDA), or other web-based connectable equipment. Input device 119 is configured to communicate with POS terminal 118 using various outputs including, for example, Bluetooth communication, radio frequency communication, near field communication, network-based communication, and the like.

A database server 116 is connected to database 120, which contains information on a variety of matters, as described below in greater detail. In one embodiment, centralized database 120 is stored on server system 112 and can be accessed by potential users at one of client systems 114, 115 by logging onto server system 112 through one of client systems 114, 115. In an alternative embodiment, database 120 is stored remotely from server system 112 and may be non-centralized.

Database 120 may store transaction data generated as part of sales activities conducted over the services network including data relating to merchants, account holders or customers, developers, issuers, acquirers, purchases made, and services provided by system 100. Database 120 may also store account data including at least one of a cardholder name, a cardholder address, an account number, and other account identifier. Database 120 may also store merchant data including a merchant identifier that identifies each merchant registered to use the network, and instructions for settling transactions including merchant bank account information. Database 120 may also store purchase data associated with items being purchased by a cardholder from a merchant, and authorization request data.

In the example embodiment, client system 114 may be associated with a developer of computer applications and may be referred to as a developer computer device, and client system 115 may be associated with a consumer, an acquirer or an issuer and may be referred to as a user computer device. Developer computer device 114 stores developer applications that a user may access and utilize via user computer device 115. Server system 112 may be associated with a service provider (SP) and maybe referred to as a SP computer device. In the example embodiment, an SP may include a payment network provider, an interchange network provider, or any other provider of financial services.

In the embodiment where the SP is an interchange network provider, system 100 includes POS terminals 118, which may be associated with a merchant. In this embodiment, system 100 may be part of a multi-party payment card industry system for enabling ordinary payment-by-card transactions such as a credit card payment system using the MasterCard® interchange. The MasterCard® interchange is a proprietary communications standard promulgated by MasterCard International Incorporated® for the exchange of financial transaction data between financial institutions that are members of MasterCard International Incorporated®. (MasterCard is a registered trademark of MasterCard International Incorporated located in Purchase, New York).

For example, in a typical payment card system, a financial institution called the "issuer" issues a payment card, such as a credit card, to a consumer, who uses the payment card to tender payment for a purchase from a merchant. To accept payment with the payment card, the merchant must normally establish an account with a financial institution that is part of the financial payment system. This financial institution is usually called the "merchant bank" or the "acquiring bank" or "acquirer bank." When a consumer tenders payment for a purchase with a payment card (also known as a financial transaction card), the merchant requests authorization from the merchant bank for the amount of the purchase. The request may be performed over the telephone, but is usually performed through the use of a point-of-sale terminal, which reads the consumer's account information from the magnetic stripe on the payment card and communicates electronically with the transaction processing computers of the merchant bank. Alternatively, a merchant bank may authorize a third party to perform transaction processing on its behalf. In this case, the point-of-sale terminal will be configured to communicate with the third party. Such a third party is usually called a "merchant processor" or an "acquiring processor."

Using the interchange network, the computers of the merchant bank or the merchant processor will communicate with the computers of the issuer bank to determine whether the consumer's account is in good standing and whether the purchase is covered by the consumer's available credit line. Based on these determinations, the request for authorization will be declined or accepted. If the request is accepted, an authorization code is issued to the merchant.

When a request for authorization is accepted, the available credit line of consumer's account is decreased. Normally, a charge is not posted immediately to a consumer's account because bankcard associations, such as MasterCard International Incorporated®, have promulgated rules that do not allow a merchant to charge, or "capture," a transaction until goods are shipped or services are delivered. When a merchant ships or delivers the goods or services, the merchant captures the transaction by, for example, appropriate data entry procedures on the point-of-sale terminal. If a consumer cancels a transaction before it is captured, a "void" is generated. If a consumer returns goods after the transaction has been captured, a "credit" is generated.

For debit card transactions, when a request for a PIN authorization is approved by the issuer, the consumer's account is decreased. Normally, a charge is posted immediately to a consumer's account. The bankcard association then transmits the approval to the acquiring processor for distribution of goods/services, or information or cash in the case of an ATM.

After a transaction is captured, the transaction is settled between the merchant, the merchant bank, and the issuer. Settlement refers to the transfer of financial data or funds between the merchant's account, the merchant bank, and the issuer related to the transaction. Usually, transactions are captured and accumulated into a "batch," which is settled as a group.

The financial transaction cards or payment cards discussed herein may include credit cards, debit cards, a charge card, a membership card, a promotional card, prepaid cards, and gift cards. These cards can all be used as a method of payment for performing a transaction. As described herein, the term "financial transaction card" or "payment card" includes cards such as credit cards, debit cards, and prepaid cards, but also includes any other devices that may hold payment account information, such as mobile phones, personal digital assistants (PDAs), and key fobs.

Although the SP has been described herein as an interchange network provider, it does not have to be so limited. As indicated above, the SP may also be a payment network provider or any other provider of financial services. In these embodiments, a transaction card, a payment or even a purchase are not necessarily needed to utilize the services provided by the SP.

Figure 3A:
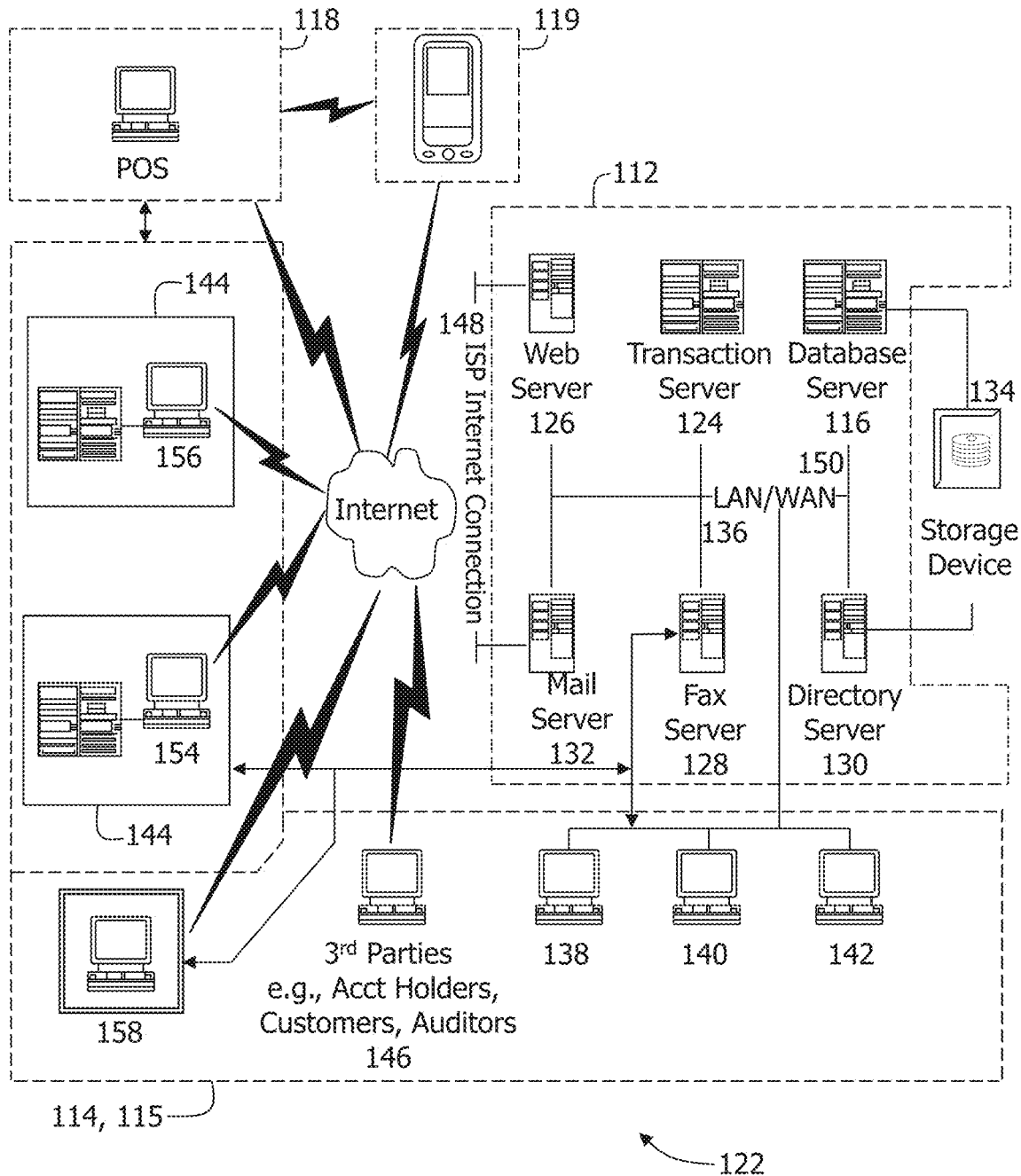
FIG. 3A is an expanded block diagram of an example embodiment of a server architecture of the service system including the plurality of computer devices in accordance with one embodiment of the present invention.

FIG. 3A is an expanded block diagram of an example embodiment of a server architecture of a service system 122 including other computer devices in accordance with one embodiment of the present invention. Components in system 122, identical to components of system 100 (shown in FIG. 1), are identified in FIG. 3 using the same reference numerals as used in FIG. 2. System 122 includes server system 112, client systems 114 and 115, POS terminals 118 and at least one input device 119. Server system 112 further includes database server 116, a transaction server 124, a web server 126, a fax server 128, a directory server 130, and a mail server 132. A storage device 134 is coupled to database server 116 and directory server 130. Servers 116, 124, 126, 128, 130, and 132 are coupled in a local area network (LAN) 136. In addition, a system administrator's workstation 138, a user workstation 140, and a supervisor's workstation 142 are coupled to LAN 136. Alternatively, workstations 138, 140, and 142 are coupled to LAN 136 using an Internet link or are connected through an Intranet.

Each workstation, 138, 140, and 142 is a personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to various individuals, including employees 144 and to third parties, e.g., account holders, customers, auditors, developers, consumers, merchants, acquirers, issuers, etc., 146 using an ISP Internet connection 148. The communication in the example embodiment is illustrated as being performed using the Internet, however, any other wide area network (WAN) type communication can be utilized in other embodiments, i.e., the systems and processes are not limited to being practiced using the Internet. In addition, and rather than WAN 150, local area network 136 could be used in place of WAN 150.

In the example embodiment, any authorized individual having a workstation 154 can access system 122. At least one of the client systems includes a manager workstation 156 located at a remote location. Workstations 154 and 156 are personal computers having a web browser. Also, workstations 154 and 156 are configured to communicate with server system 112. Furthermore, fax server 128 communicates with remotely located client systems, including a client system 158 using a telephone link. Fax server 128 is configured to communicate with other client systems 138, 140, and 142 as well.

Figure 3B:
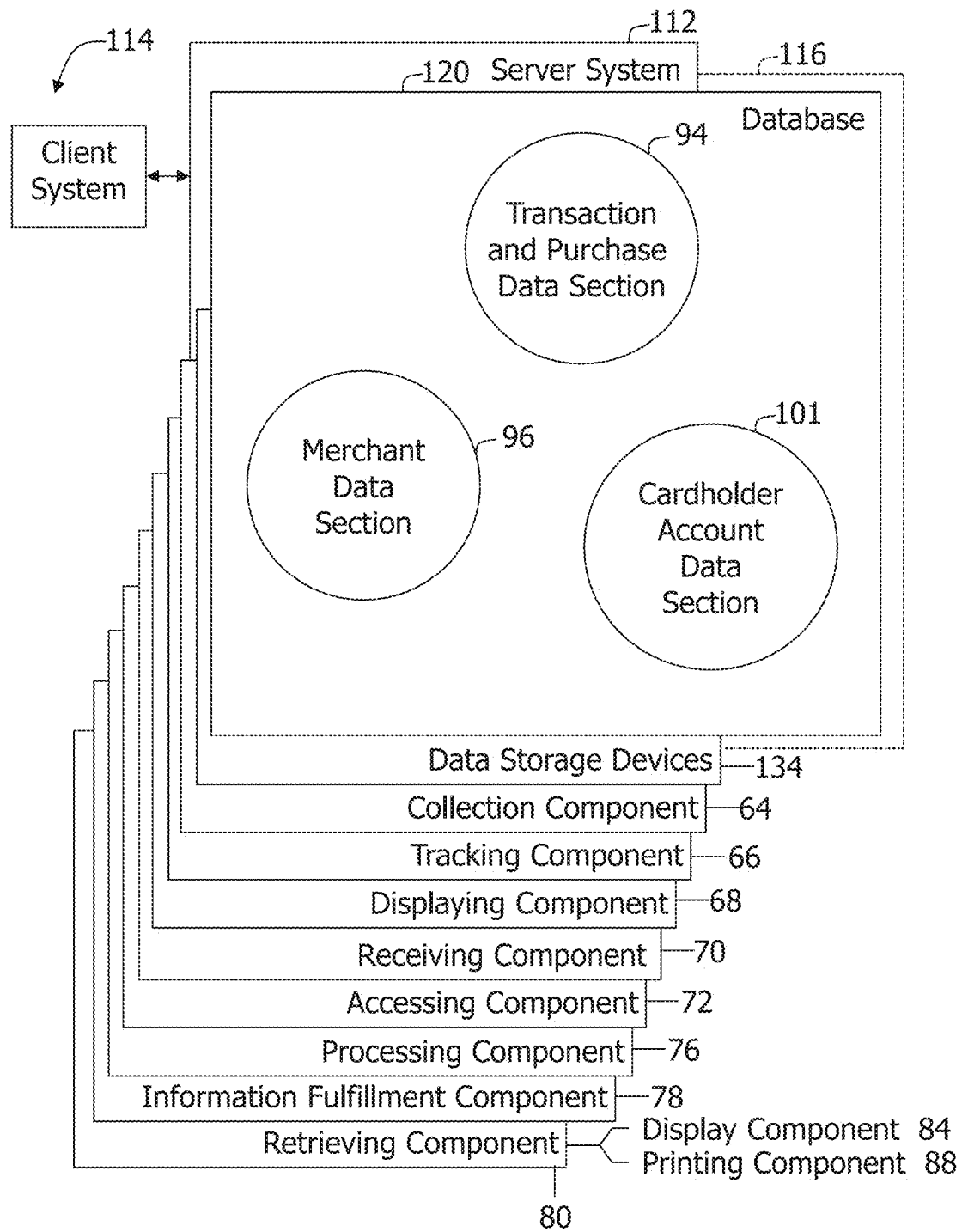
FIG. 3B shows a configuration of a database within the database server of the server system with other related server components.

FIG. 3B shows a configuration of database 120 within database server 116 of server system 112 with other related server components. More specifically, FIG. 3B shows a configuration of database 120 in communication with database server 116 of server system 112 shown in FIGS. 2 and 3A. Database 120 is coupled to several separate components within server system 112, which perform specific tasks.

Server system 112 includes a collection component 64 for collecting information from users into database 120, a tracking component 66 for tracking information, a displaying component 68 to display information, a receiving component 70 to receive a specific query from client system 114, and an accessing component 72 to access database 120. Receiving component 70 is programmed for receiving a specific query, a data request and/or a data message (collectively referred to as a "query") from one of a plurality of users. Server system 112 further includes a processing component 76 for searching and processing received queries against data storage device 134 containing a variety of information collected by collection component 64. An information fulfillment component 78, located in server system 112, downloads the requested information to the plurality of users in the order in which the requests were received by receiving component 70. Information fulfillment component 78 downloads the information after the information is retrieved from data storage device 134 by a retrieving component 80. Retrieving component 80 retrieves, downloads and sends information to client system 114 based on a query received from client system 114 regarding various alternatives.

Retrieving component 80 further includes a display component 84 configured to download information to be displayed on a client system graphical user interface and a printing component 88 configured to print information. Retrieving component 80 generates various reports requested by the user through client system 114 in a predetermined format. In an exemplary embodiment, system 100 includes an administrative component (not shown) that provides an input component as well as an edit component to facilitate administrative functions. System 100 is flexible to provide other alternative types of reports and is not constrained to the options set forth above.

In an exemplary embodiment, database 120 is divided into a plurality of sections, including but not limited to, a Transaction and Purchase Data Section 94, a Merchant Data Section 96, and a Cardholder Account Data Section 101. These sections within database 120 are interconnected to update and retrieve the information as required.

Figure 4:
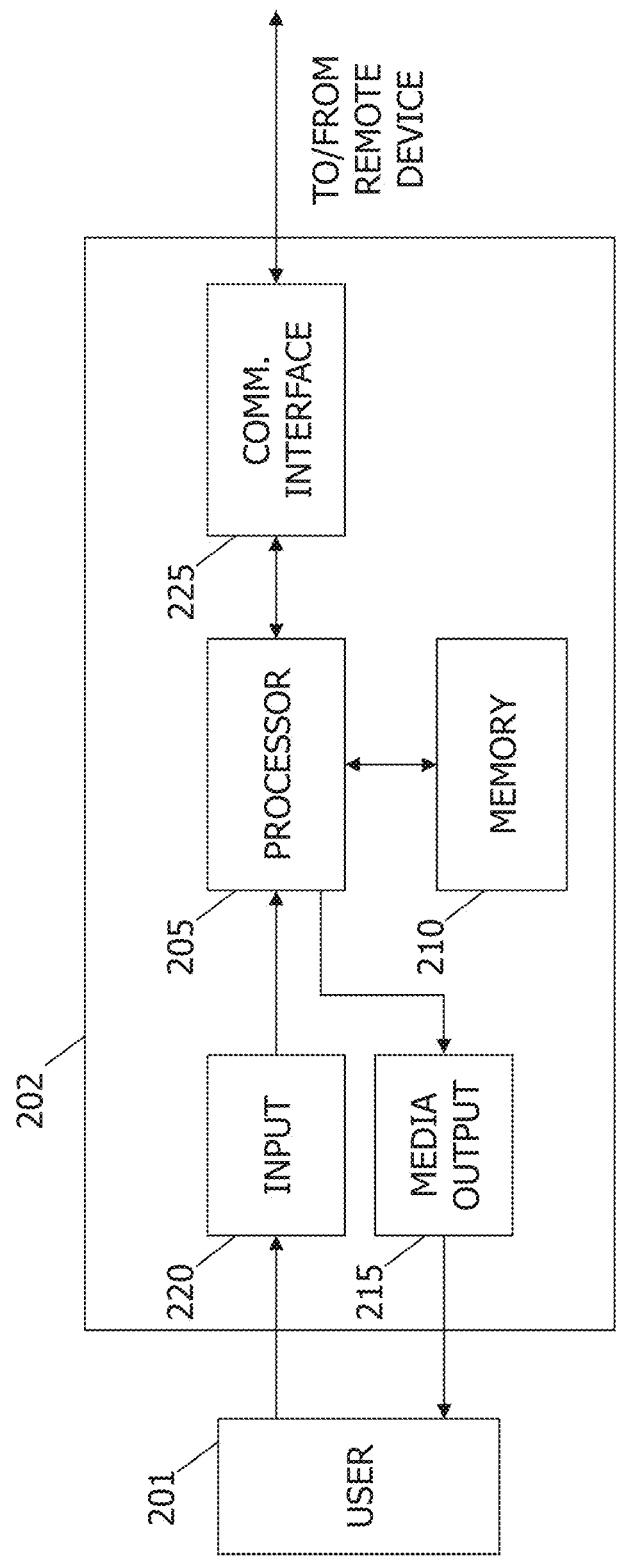

FIG. 4 illustrates an example configuration of a user computer device 202 operated by a user 201. User computer device 202 may include, but is not limited to, client systems 114, 115, 138, 140, 144, 142, 146, POS terminal 118, workstation 154, and manager workstation 156 (shown in FIG. 2).

User computer device 202 includes a processor 205 for executing instructions. In some embodiments, executable instructions are stored in a memory area 210. Processor 205 may include one or more processing units (e.g., in a multicore configuration). Memory area 210 is any device allowing information such as executable instructions and/or other data to be stored and retrieved. Memory area 210 may include one or more computer readable media.

User computer device 202 also includes at least one media output component 215 for presenting information to user 201. Media output component 215 is any component capable of conveying information to user 201. In some embodiments, media output component 215 includes an output adapter such as a video adapter and/or an audio adapter. An output adapter is operatively coupled to processor 205 and operatively coupleable to an output device such as a display device (e.g., a liquid crystal display (LCD), organic light emitting diode (OLED) display, cathode ray tube (CRT), or "electronic ink" display) or an audio output device (e.g., a speaker or headphones).

In some embodiments, user computer device 202 includes an input device 220 for receiving input from user 201. Input device 220 may include, for example, a keyboard, a pointing device, a mouse, a stylus, a touch sensitive panel (e.g., a touch pad or a touch screen), a gyroscope, an accelerometer, a position detector, or an audio input device. A single component such as a touch screen may function as both an output device of media output component 215 and input device 220.

User computer device 202 may also include a communication interface 225, which is communicatively coupleable to a remote device such as server system 112. Communication interface 225 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 210 are, for example, computer readable instructions for providing a user interface to user 201 via media output component 215 and, optionally, receiving and processing input from input device 220. A user interface may include, among other possibilities, a web browser and client application. Web browsers enable users, such as user 201, to display and interact with media and other information typically embedded on a web screen or a website from server system 112. A client application allows user 201 to interact with a server application from server system 112.

Figure 5:
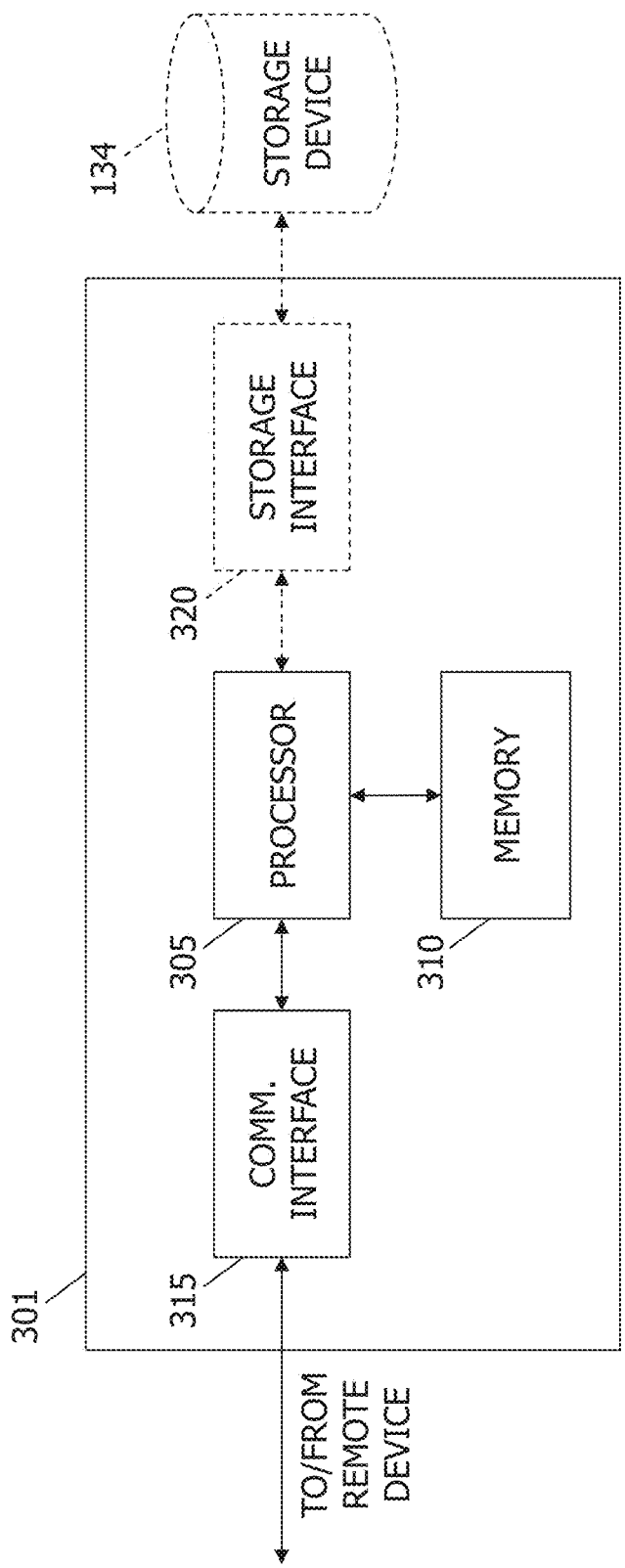

FIG. 5 illustrates an example configuration of a server computer device 301 such as server system 112 (shown in FIGS. 2 and 3). Server computer device 301 may include, but is not limited to, database server 116, transaction server 124, web server 126, fax server 128, directory server 130, and mail server 132.

Server computer device 301 includes a processor 305 for executing instructions. Instructions may be stored in a memory area 310, for example. Processor 305 may include one or more processing units (e.g., in a multi-core configuration).

Processor 305 is operatively coupled to a communication interface 315 such that server computer device 301 is capable of communicating with a remote device such as user computer device 202 or another server computer device 301. For example, communication interface 315 may receive requests from user computer device 114, 115 via the Internet, as illustrated in FIGS. 1 and 2.

Processor 305 may also be operatively coupled to a storage device 134. Storage device 134 is any computer-operated hardware suitable for storing and/or retrieving data. In some embodiments, storage device 134 is integrated in server computer device 301. For example, server computer device 301 may include one or more hard disk drives as storage device 134. In other embodiments, storage device 134 is external to server computer device 301 and may be accessed by a plurality of server computer devices 301. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Memory areas 210 and 310 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are by way of example only, and are thus not limiting as to the types of memory usable for storage of a computer program.

Merchants can activate an account with the merchant manager module and use the merchant manger application to facilitate processing transactions, as described herein.

Figure 6:
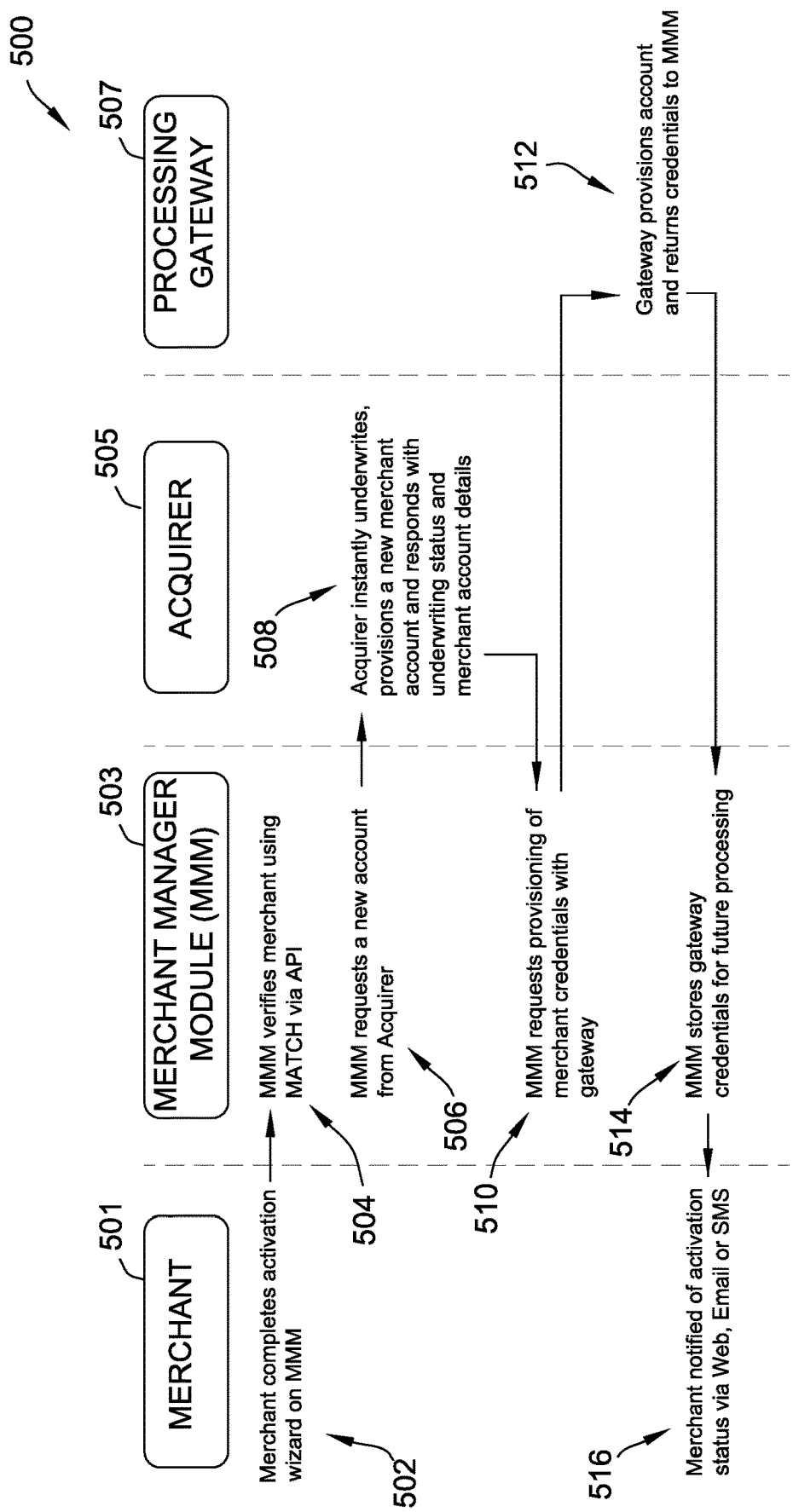

FIG. 6 is a flow diagram of an example embodiment of a merchant activation process 500 for an example merchant manager module 503, according to one embodiment of the invention. Activation process 500 creates a merchant account and associated credentials for use with the merchant manager module 503.

In activation process 500, a merchant 501 completes an activation wizard on the merchant manager module 503. After the activation wizard is completed 502, merchant manager module 503 verifies 504 the merchant using a MATCH (Member Alert To Control High Risk) file via an API platform, such as an API platform 113 maintained on a service provider server 112 (shown in FIG. 2). This verification process may also be referred to as a primary approval process (in which a business name is compared to a high risk list, or a model is employed to calculate risk).

With merchant 501 verified, merchant manager module 503 requests 506 a new account from an acquirer 505. In response, acquirer 505 begins 508 underwriting for merchant 501, provisions a new merchant account, and responds to merchant manager module 503 with the underwriting status and merchant account details.

In the example embodiment, once the new merchant account is created, merchant manager module 503 transmits 510 a request to a processing gateway 507 (also referred to as a "payment processor") to generate credentials (also referred to herein as a token). In response, processing gateway 507 creates 512 a gateway account and associated gateway credentials for merchant 501, and transmits the generated gateway credentials to merchant manager module 503. Merchant manager module 503 stores 514 the gateway credentials and merchant 501 is notified 516 of the activation. The gateway credentials may also be stored on a merchant computing device for use in processing transactions, as described below. In the example embodiment, the entire activation process takes less than two seconds. The gateway credentials may also include access data needed to communicate with merchant manager module 503 using a merchant computing device. For example, a developer of a website for merchant 501 may use the access data when configuring the website to process payment card transactions such that the merchant website is able to send transaction data to merchant manager module 503 for processing.

Figure 7:
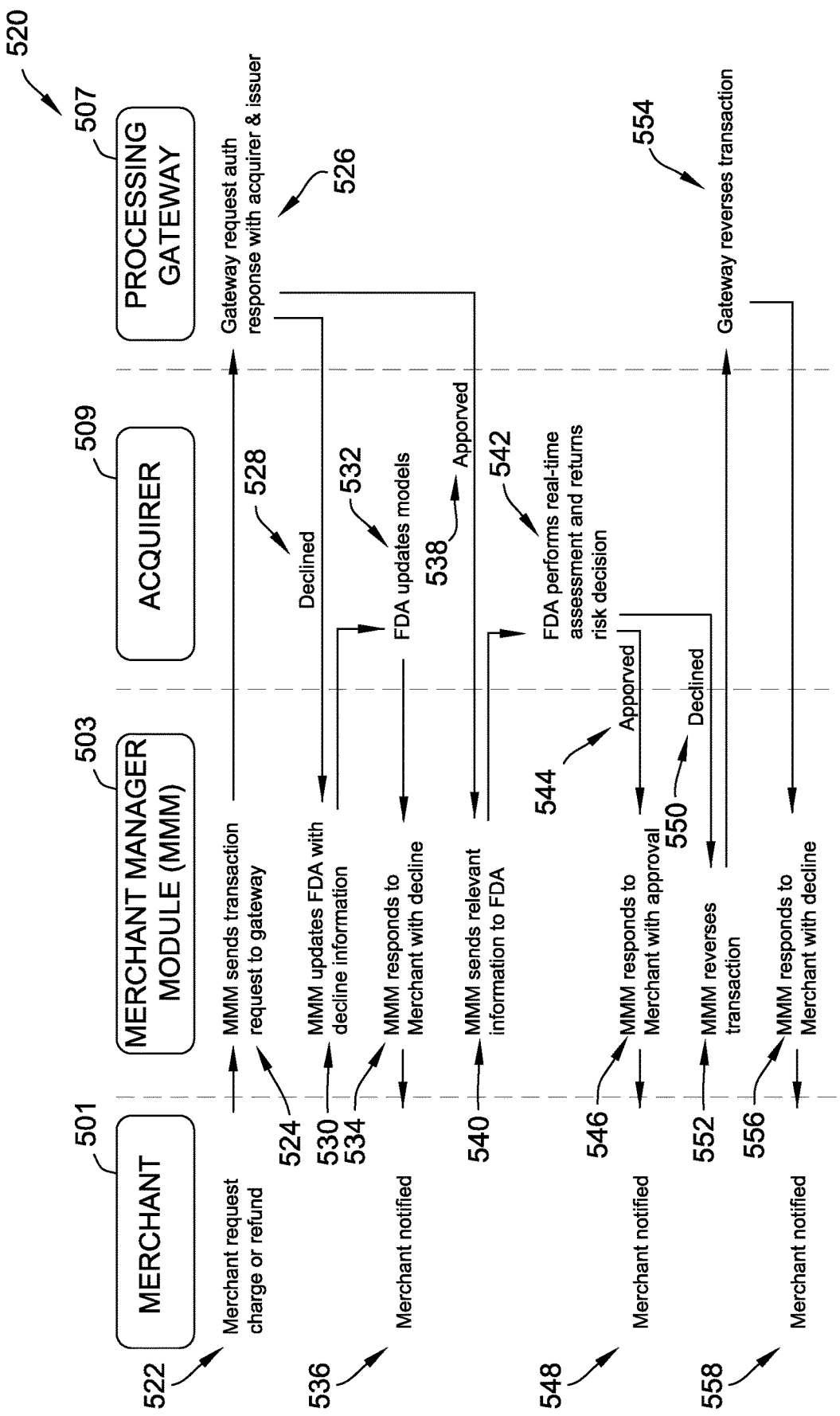

FIG. 7 is a flow diagram of an example transaction approval process 520 using merchant manager module 503, according to one embodiment of the invention. Transaction approval process 520 authorizes or declines a transaction request from merchant 501 (shown in FIG. 6).

In transaction approval process 520, merchant 501 submits 522 a transaction request for a charge or refund to merchant manager module 503, which forwards 524 the transaction request to processing gateway 507. In the example embodiment, the transaction request includes the gateway credentials created during activation process 500. Processing gateway 507 communicates 526 with acquirer 505 and/or an issuer to generate an authorization response for the transaction (i.e., whether the transaction is approved or declined). The authorization response is generated based at least in part on the gateway credentials in the example embodiment.

If the transaction is declined 528, merchant manager module 503 provides 530 decline information to a fraud detection application. The fraud detection application uses the decline information to update applicable fraud, risk, and/or security models. Merchant manager module 503 also notifies 534 merchant 501 that the transaction is declined. After merchant 501 is notified 536, merchant 501 may advise a customer of the declined transaction.

If the transaction is approved 538, merchant manager module 503 submits 540 transaction information (e.g., dollar amount, consumer identity, merchant identity, etc.) to the fraud detection application. Using the transaction information, the fraud detection application performs 542 a real-time assessment of the transaction and generates a risk decision (separate from the authorization response generated at the processing gateway) that indicates whether or not the transaction should be approved. If the risk decision indicates 544 approval, merchant manager module 503 notifies merchant 501 that the transaction is approved. After notification 548, merchant 501 may complete the customer's transaction. If the risk decision is declined 550, merchant manager module 503 and processing gateway 507 reverse (552, 554) the transaction (i.e., decline the previously approved transaction), and merchant manager module 503 notifies 556 merchant 501 that the transaction is declined. After merchant 501 is notified 558, merchant 501 may advise a customer of the declined transaction. In the example embodiment, the entire transaction approval process takes less than one second.

Figure 8:
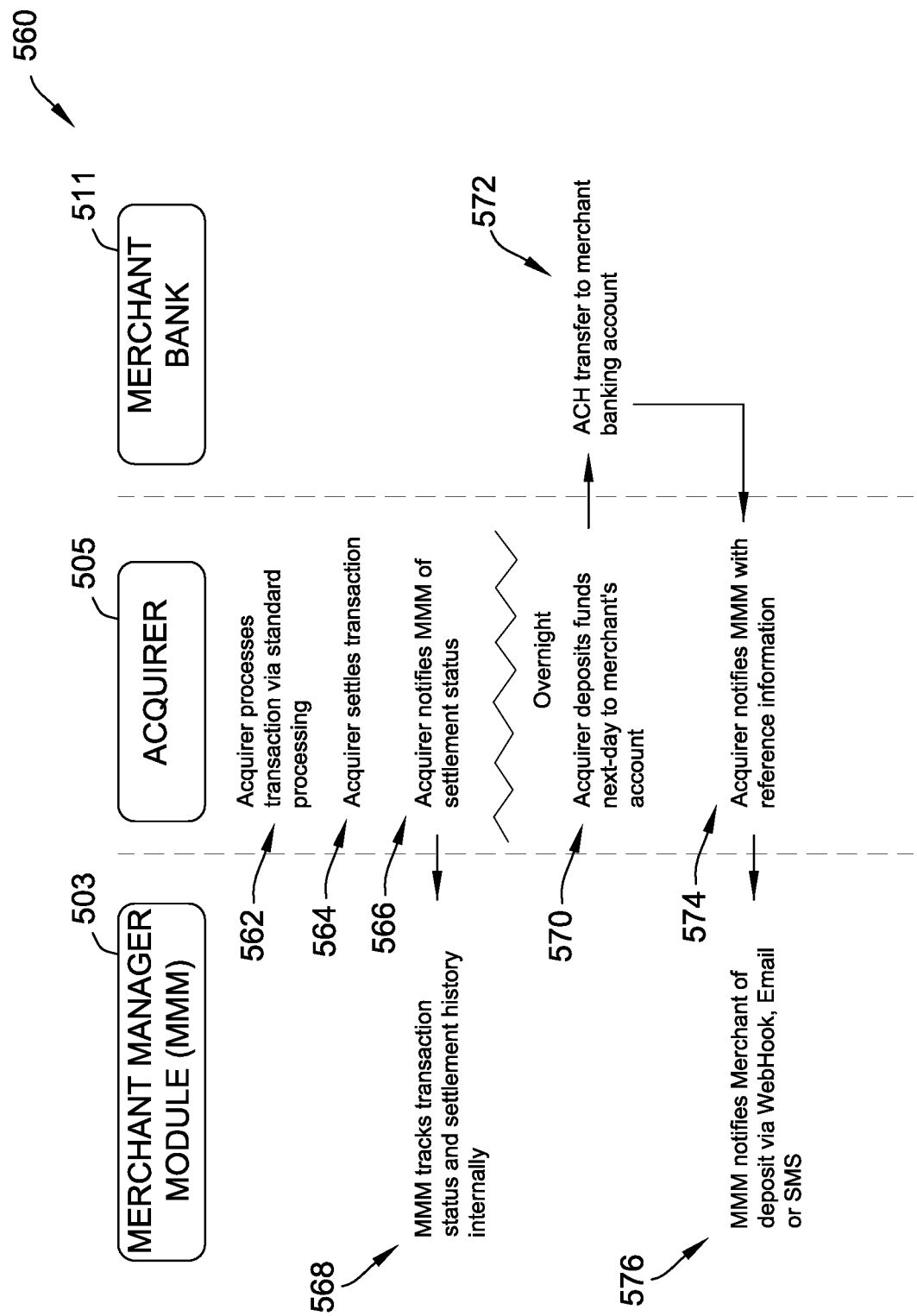

FIG. 8 is a flow diagram of an example deposit process 560 using example merchant manager module 503, according to one embodiment of the invention. Deposit process 560 transfers funds to a merchant banking account.

In deposit process 560, acquirer 505 processes 562 a transaction (such as a transaction approved as indicated in process 520 (shown in FIG. 7)), and settles 564 the transaction, determining what funds merchant 501 (shown in FIGS. 6 and 7) is due. Acquirer 505 additionally notifies 566 merchant manager module 503 of the settlement status of the transaction. Merchant manager module 503 is in communication with acquirer 505, and notes and records 568 the transaction status and settlement history.

In the example embodiment, acquirer 505 deposits 570, via an automated clearing house (ACH) transfer, the funds in the merchant's bank account at the merchant's bank overnight. In some embodiments, merchant 501 may have a debit card account to which the funds are transferred. Acquirer 505 also provides 574 deposit reference information (e.g., amount, deposit status, charges/refunds, and fees) to merchant manager module 503, and merchant manager module 503 notifies 576 merchant 501 of the deposit.

Figure 9:
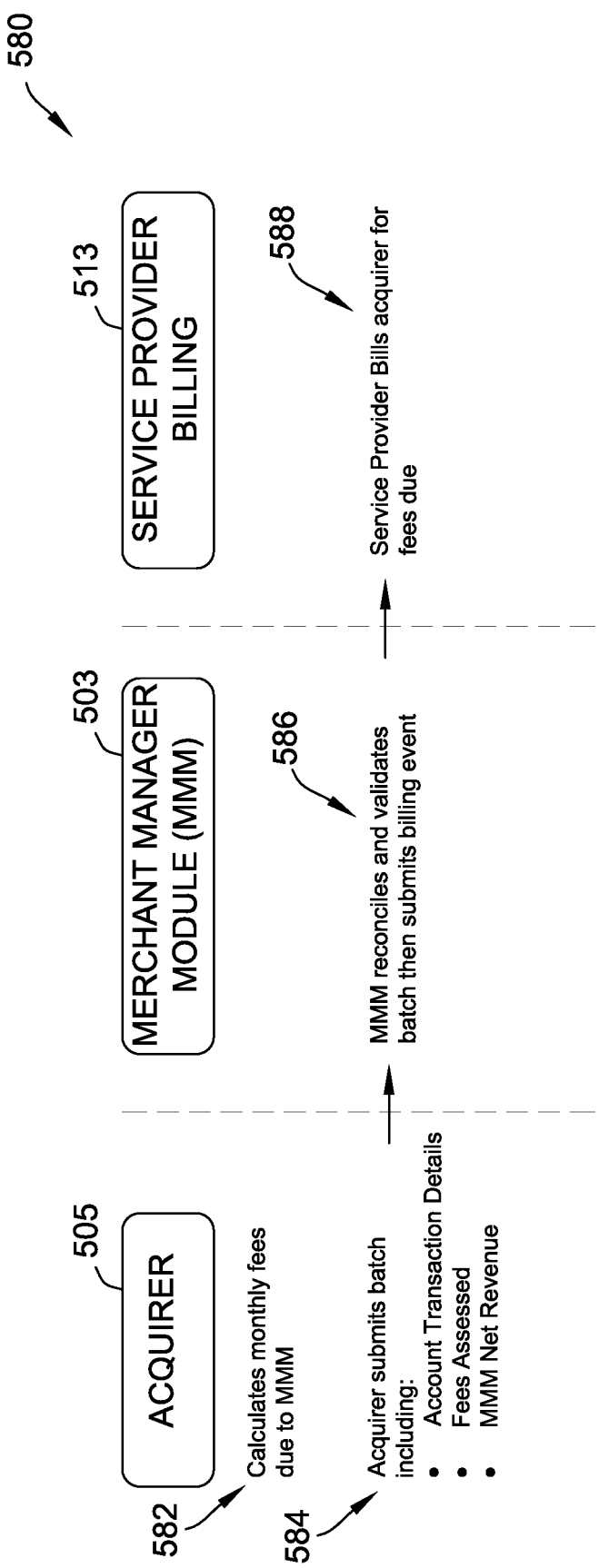

FIG. 9 is a flow diagram of an example billing process 580 using merchant manager module 503 according to one embodiment of the invention. In billing process 580, acquirer 505 calculates 582 monthly fees due by merchant 501 (shown in FIGS. 6 and 7) to merchant manager module 503 (i.e., the service provider). Acquirer 505 submits 584 billing information to merchant manager module 503 including merchant account transaction details, fees assessed, and the net revenue due to merchant manager module 503. Merchant manager module 503 reconciles and validates 586 the information from acquirer 505, and generates and submits a billing event to a service provider billing module 513. Using the billing event, service provider billing module 513 bills 588 acquirer 505 for the fees due.

FIGS. 10-26 show example screenshots displayed from using an example embodiment of a merchant manager module (such as merchant manager module 503 of FIGS. 6-9) including a plurality of screenshots for a web-based module which is accessible by a merchant computer device, such as user computer device 115 (shown in FIGS. 2 and 3) in accordance with one embodiment of the present invention.

Figure 10:
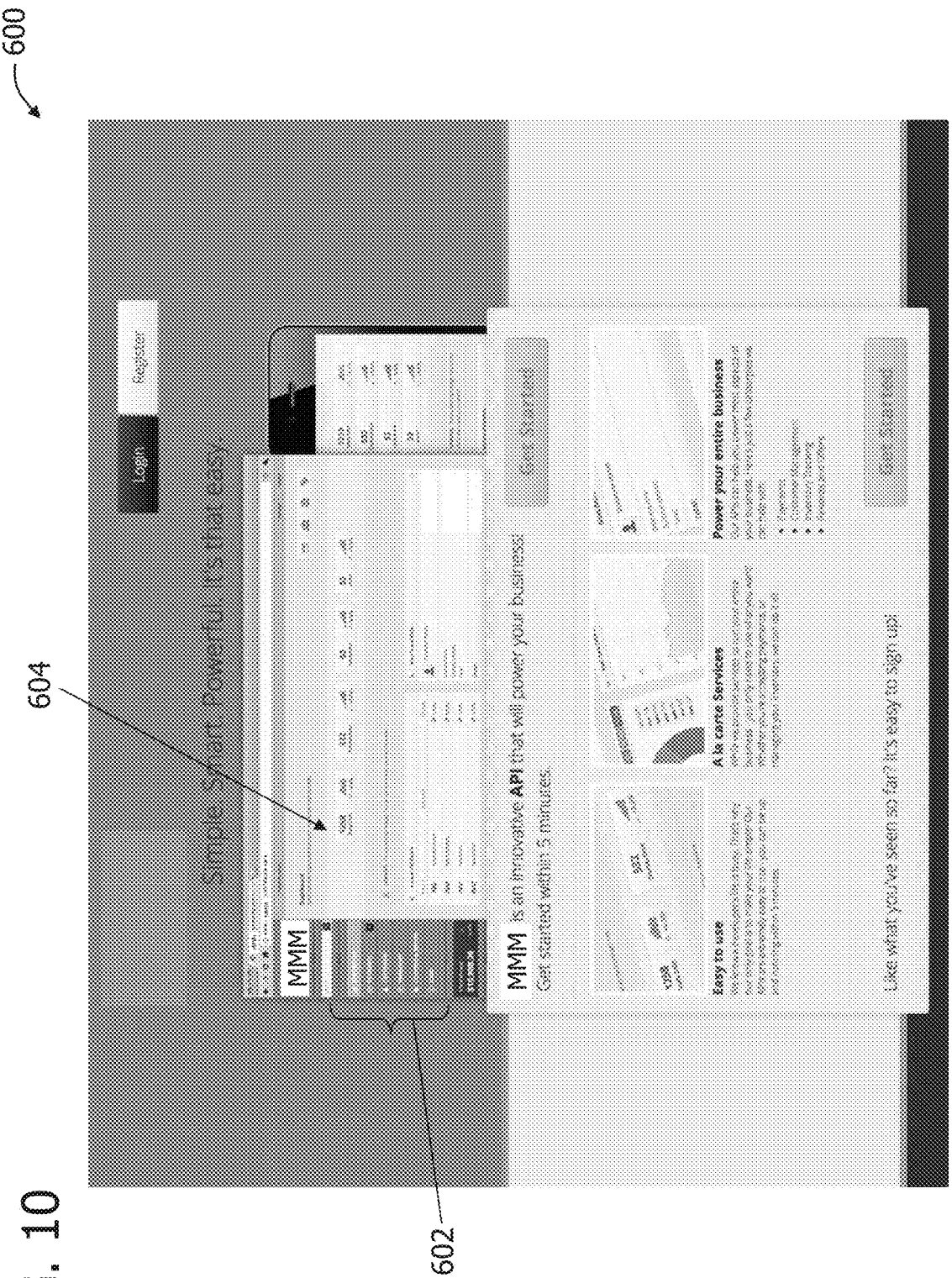

FIG. 10 illustrates an example screenshot 600 of an introduction screen showing category links 602 such as, but not limited to dashboards, payments, customers, inventory, coupons and offers and logs. More particularly, screenshot 600 illustrates selected dashboard category links 602 and illustrates information summaries 604.

Figure 11:
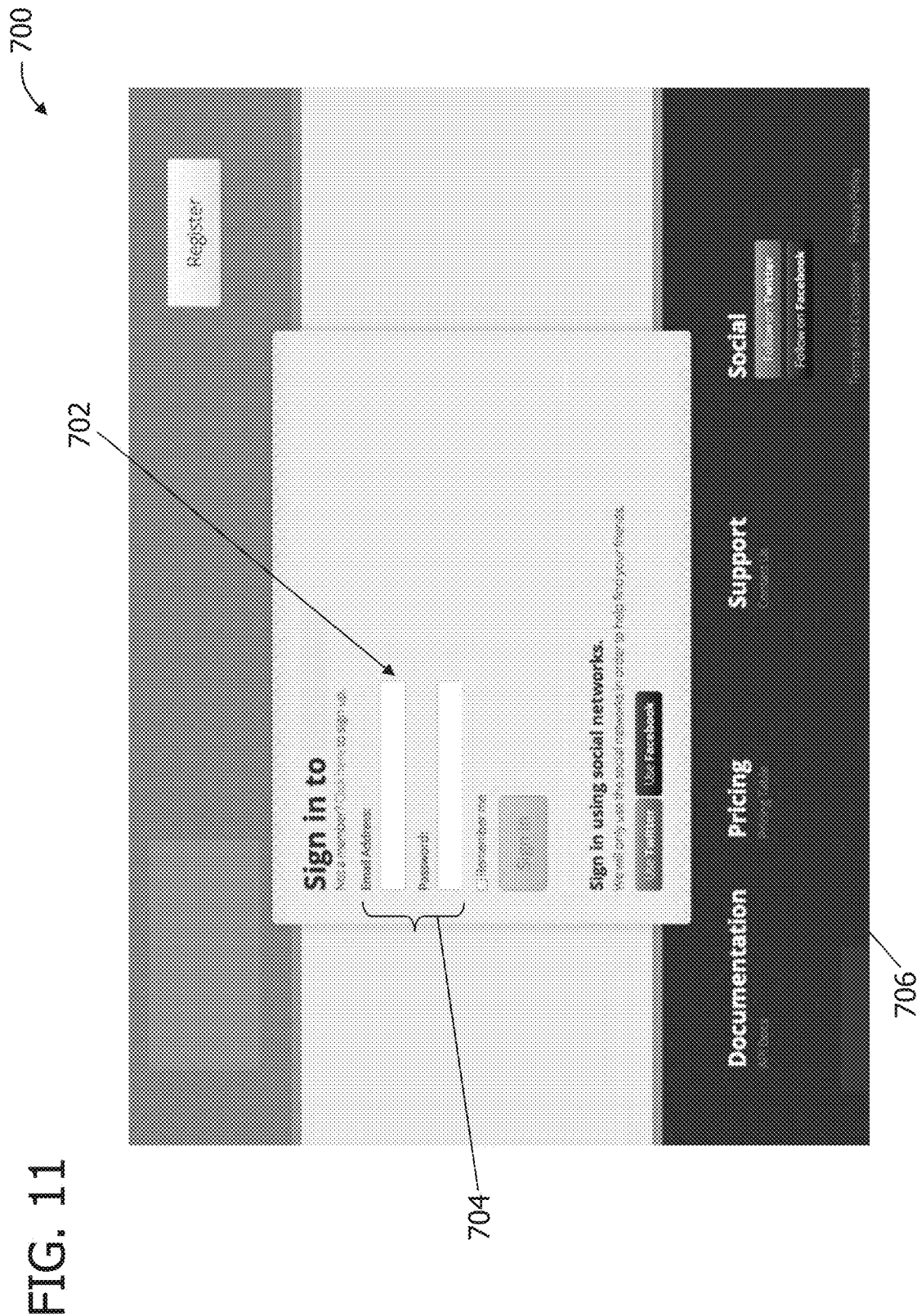

FIG. 11 illustrates an example screenshot 700 of a sign-in screen. Screenshot 700 illustrates links 702 for inputting information 704 such as, for example, email address and password information. Moreover, screenshot 700 illustrates information links 706 for example documentation, pricing, support and social media links.

Figure 12:
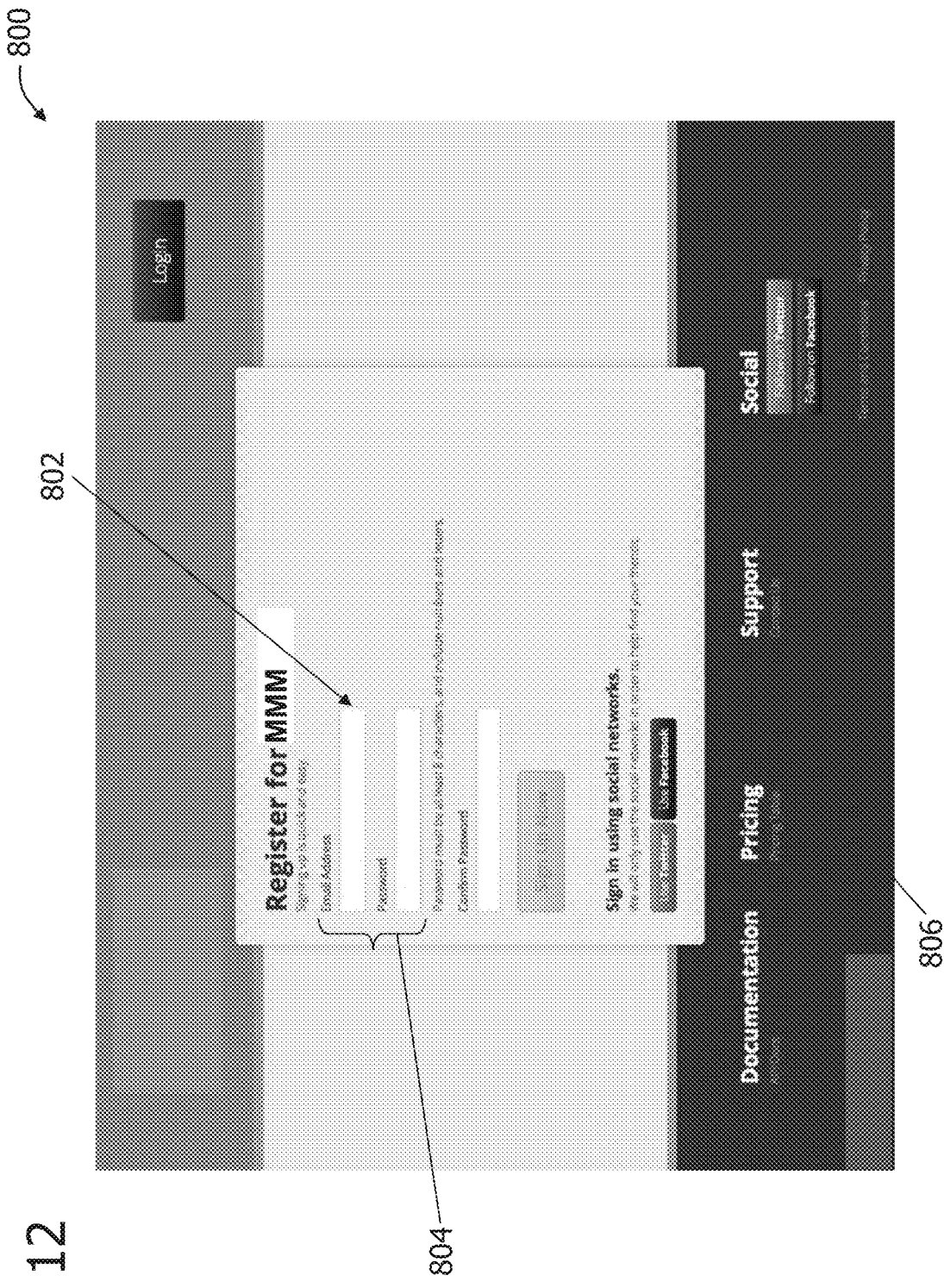

FIG. 12 illustrates an example screenshot 800 for a registration screen. Screenshot 800 illustrates links 802 for inputting information 804 such as, for example, email address and password information. Moreover, screenshot 800 illustrates information links 806 for example documentation, pricing, support and social media links.

Figure 13:
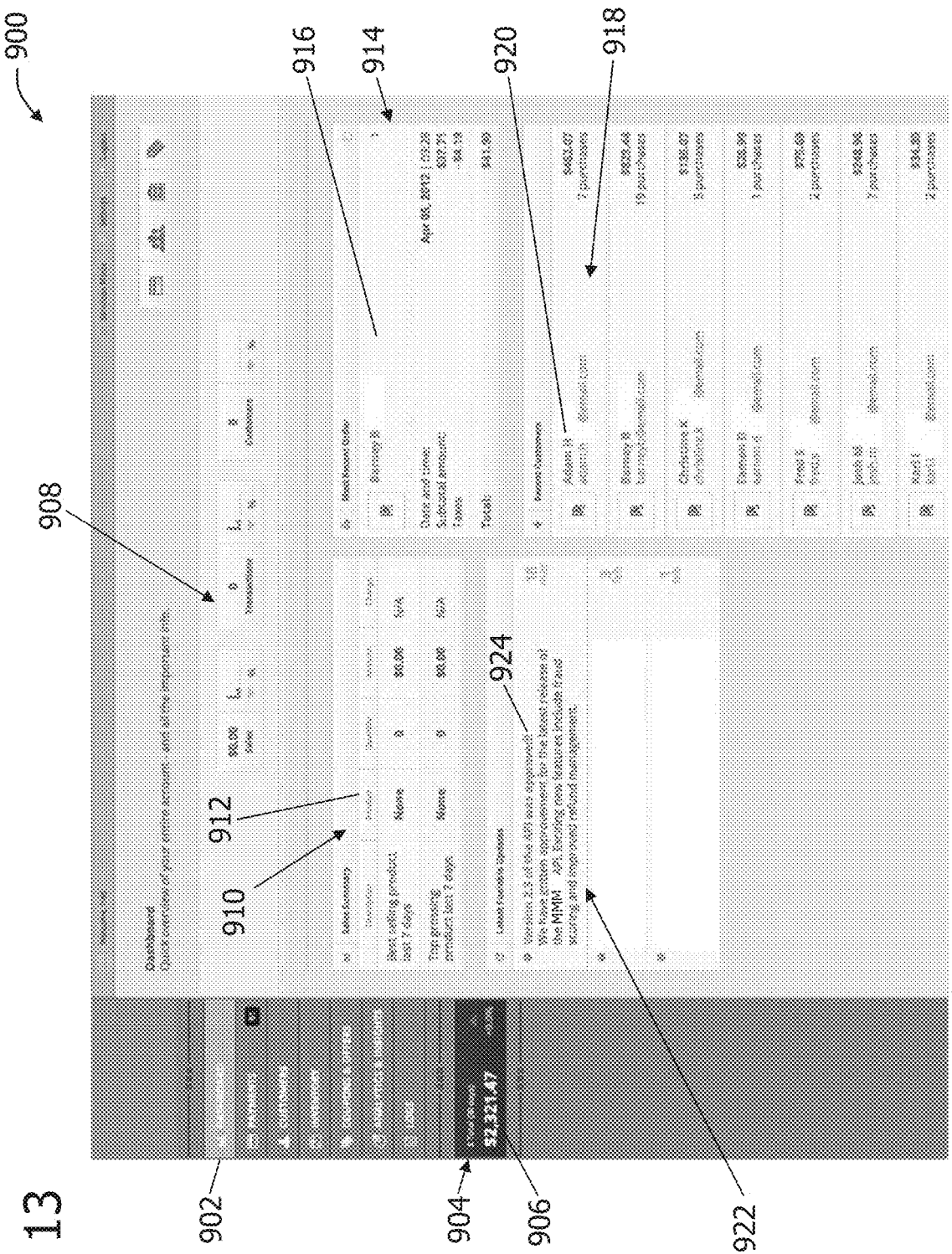

FIG. 13 illustrates an example screenshot 900 of a dashboard screen. Screenshot 900 shows a representative dashboard link 902 highlighted. Screenshot 900 illustrates a total summary 904. In one embodiment, total summary 904 includes information 906 such as, for example, total sales over a pre-selected time period and a sales percentage. Screenshot 900 includes a current summary 908 presenting information such as sales, transactions and customers. A sales summary 910 presents information 912 including description, product, quantity, amount and change. An order summary 914 presents information 916 such as customer name, date and time of transaction, and transaction amount. A customer summary 918 presents information 920 for example customer names and associated quantity and amount of purchases. An update summary 922 presents information 924 such as product updates.

Figure 14:
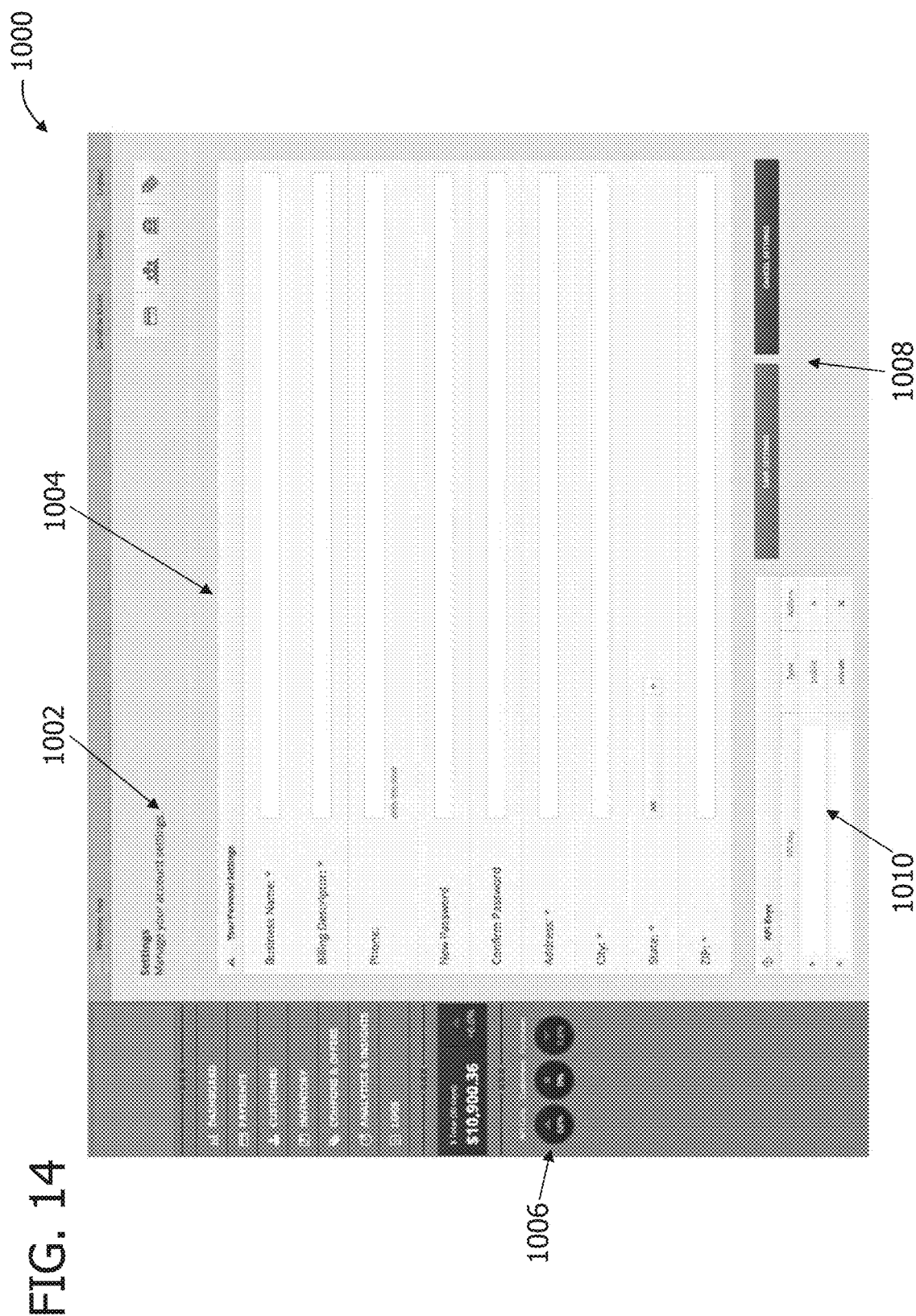

FIG. 14 illustrates an example screenshot 1000 illustrating an account settings screen 1002. Account settings screen 1002 includes input links 1004 for information such as business name, billing description, phone number, password and address. Screenshot 1000 further includes a total summary 1006 having additional information such as API calls, customers and purchases. In one embodiment, screenshot 1000 illustrates confirmation link 1008. Moreover, screenshot 1000 includes a link 1010 for API keys.

Figure 15:
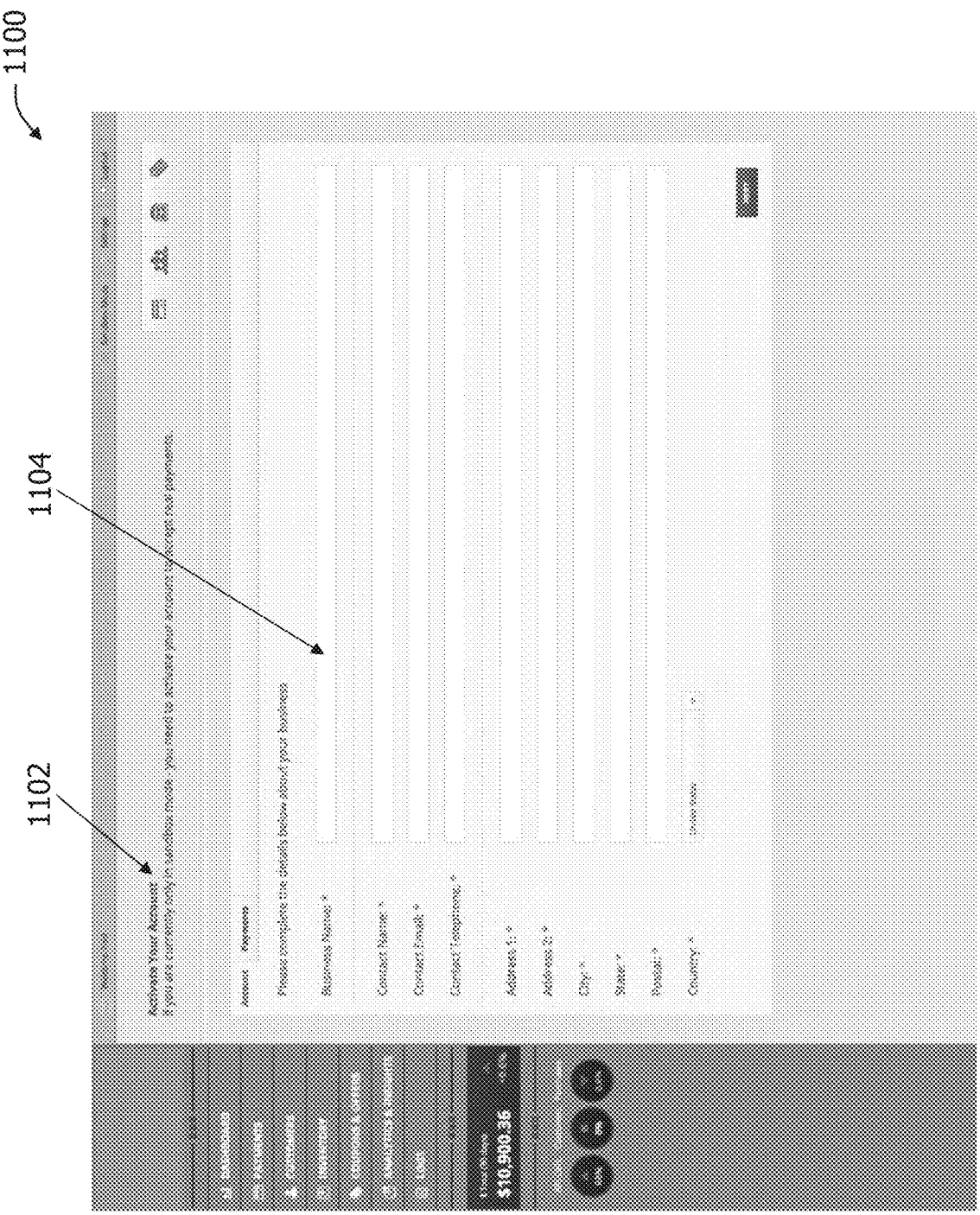

FIG. 15 illustrates an example screenshot 1100 illustrating an account activation screen 1102. Account activation screen 1102 includes information links 1104 for inputting information such as, for example, business name, contact name, email, telephone number, and address.

Figure 16:
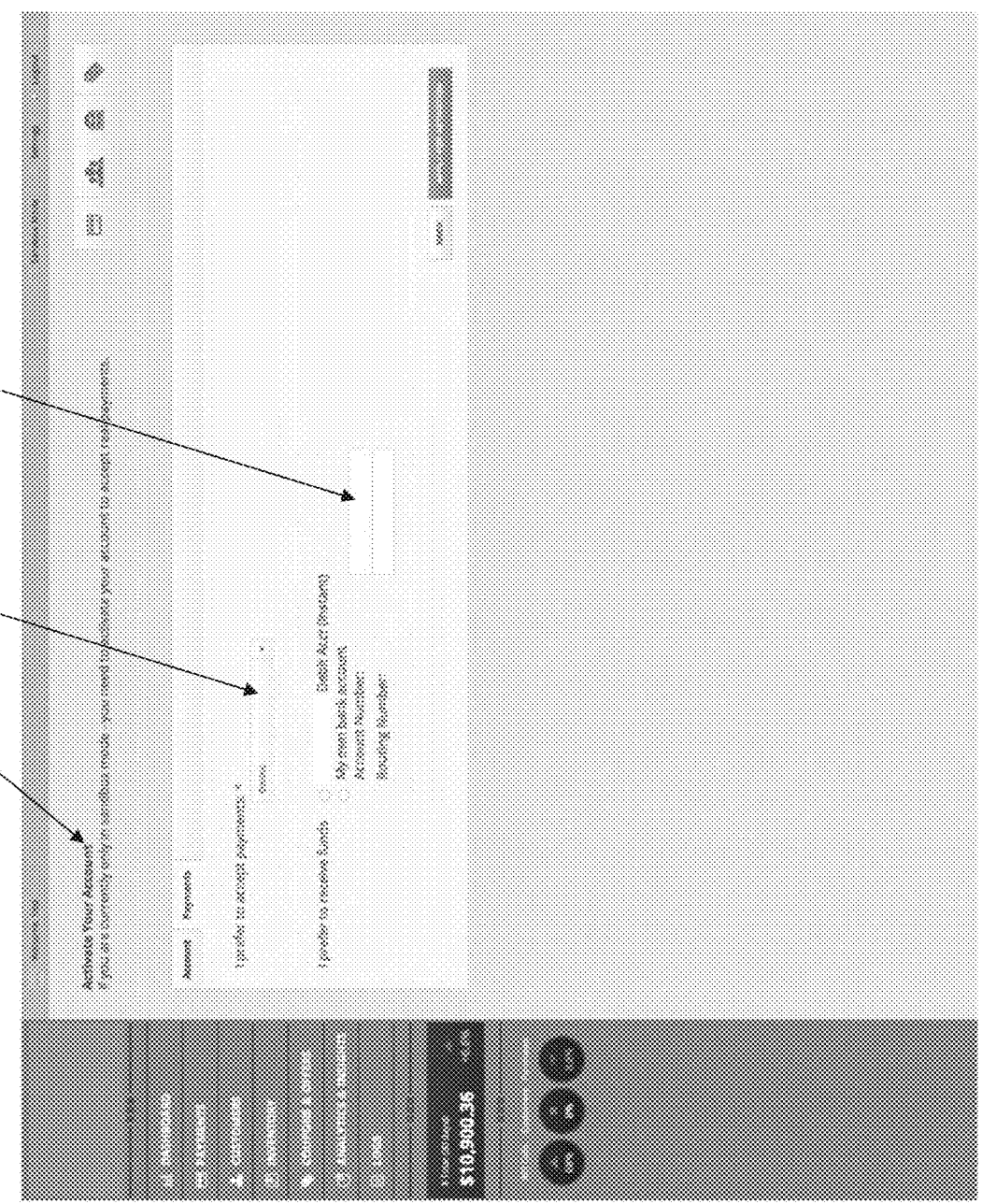

FIG. 16 illustrates an example screenshot 1200 illustrating a payment activation screen 1202. Payment activation screen 1202 includes a link 1204 relating to options for accepting payment. Payment activation screen 1202 further includes a link 1206 for inputting options for receiving funds.

Figure 17:
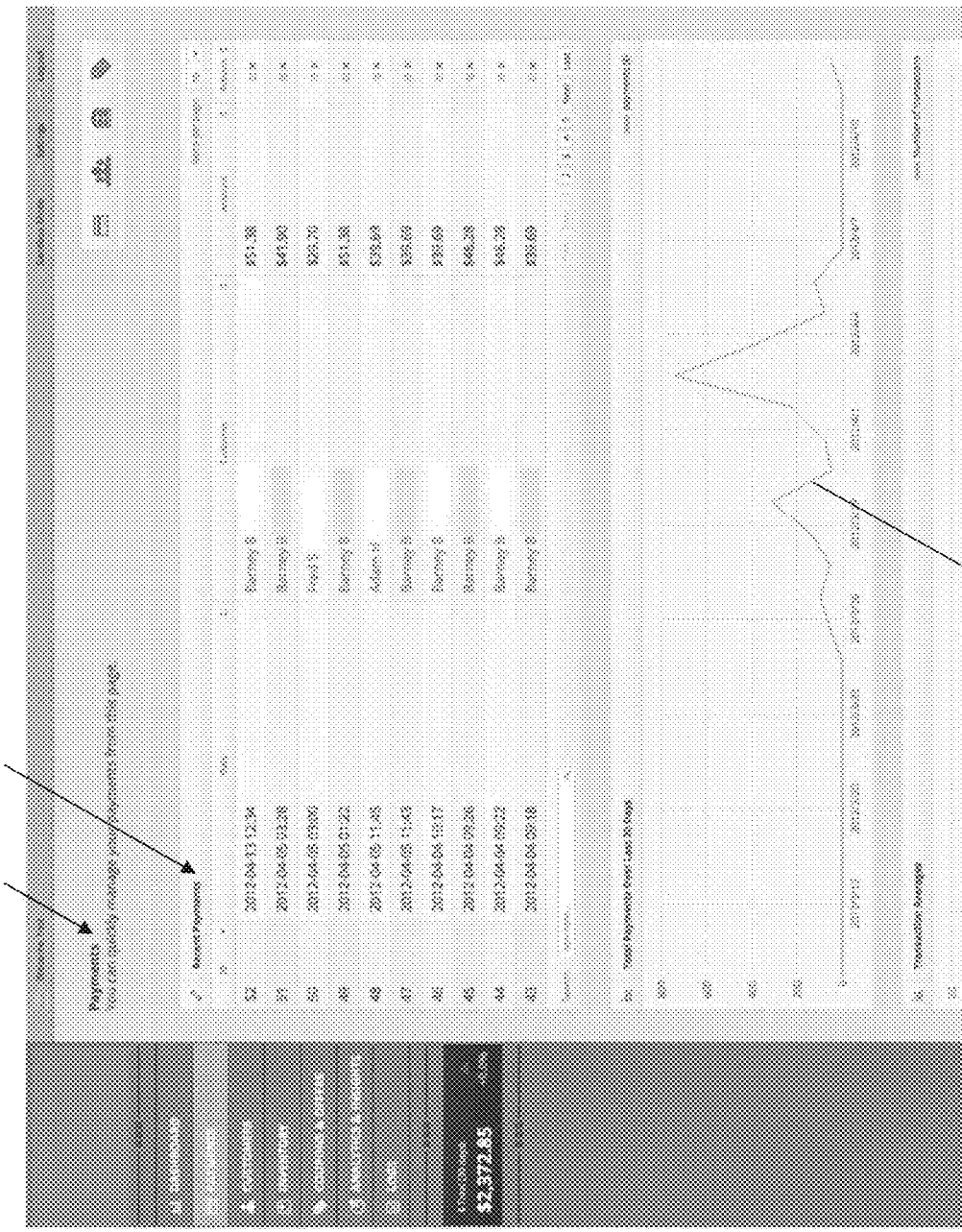

FIG. 17 illustrates an example screenshot 1300 illustrating a search payment category screen 1302. Search payment category screen 1302 includes recent payment information 1304, such as ID number, date, customer and amount. Screenshot 1300 further includes a graphical representation 1306 of sales over time and/or transaction averages over time.

Figure 18:
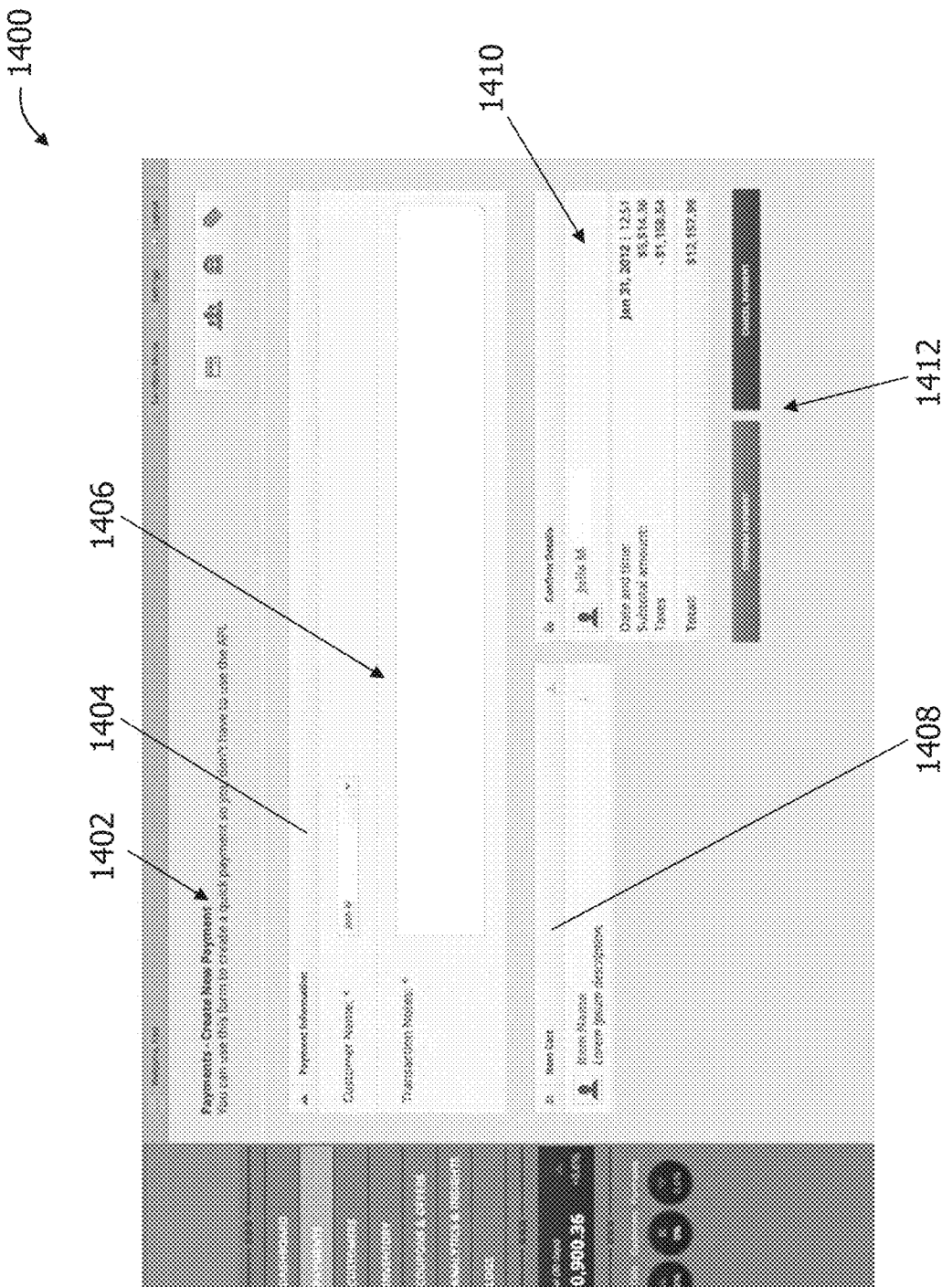

FIG. 18 illustrates an example screenshot 1400 illustrating a create payments category screen 1402. Create payments category screen 1402 includes a link 1404 for inputting information 1406, such as customer name and transaction notes. Screenshot 1400 further includes an item cart link 1408 and a confirm details link 1410. Screenshot 1400 further includes a link 1412 for confirming payment and for cancelling payment.

Figure 19:
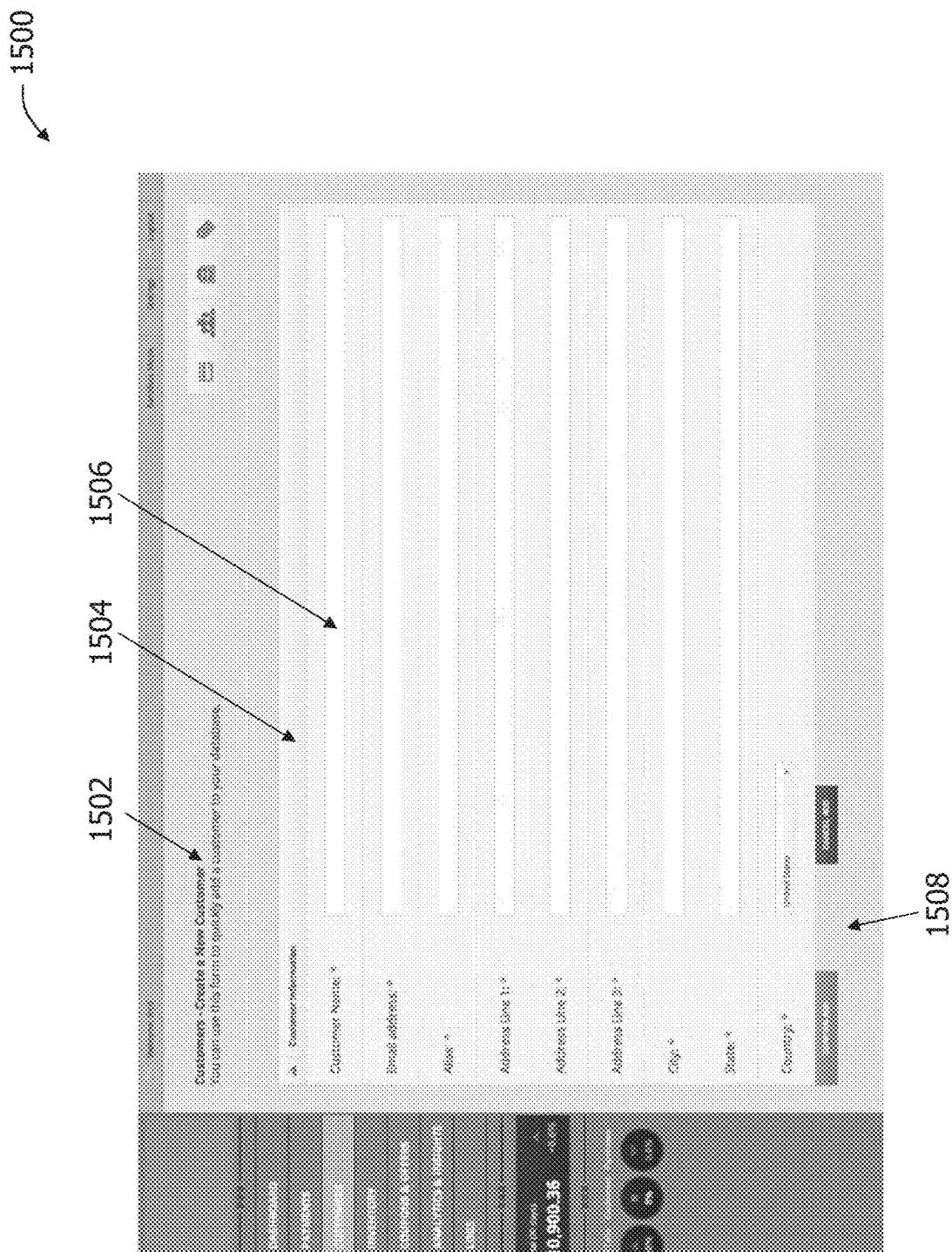

FIG. 19 illustrates an example screenshot 1500 illustrating a new customer category screen 1502. New customer category screen 1502 includes a link 1504 for inputting information 1506 related to customer name, email address and address. Screenshot 1500 further includes link 1508 for confirming new customer addition and for canceling customer addition.

Figure 20:
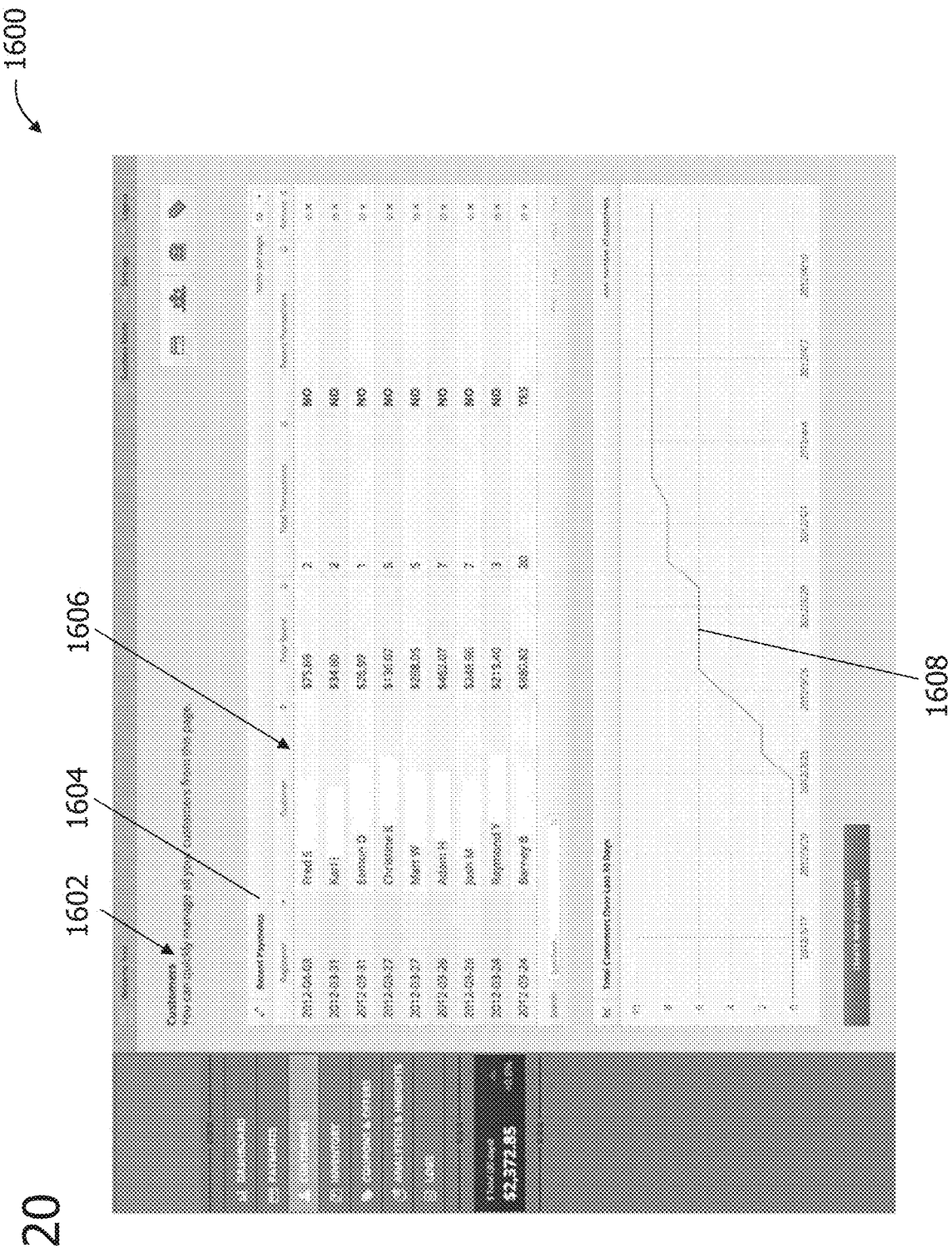

FIG. 20 illustrates an example screenshot 1600 illustrating a search customers category screen 1602. Search customers category screen 1602 includes a recent payment link 1604 which presents information 1606 such as date registered, customer name, total spent, total transactions and recent transactions. Screenshot 1600 further includes a graphical representation 1608 of total customers over time.

Figure 21:
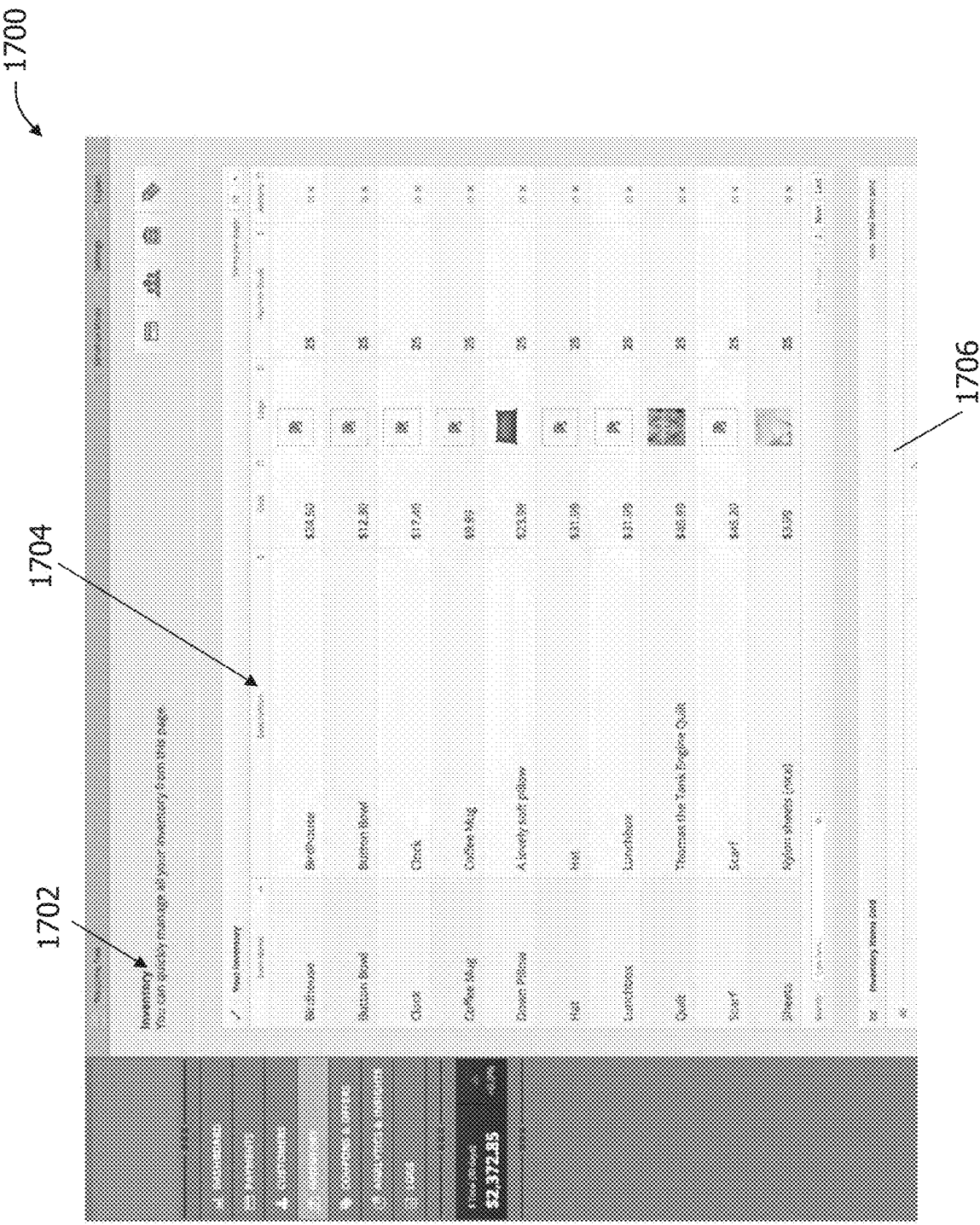

FIG. 21 illustrates an example screenshot 1700 in which an inventory category 1702 is highlighted. Inventory category 1702 includes information 1704 such as, but not limited to, item name, description, cost, logo/picture, numbers in stock and action. Screenshot 1700 further includes a graphical representation 1706 of inventory items sold over time.

Figure 22:
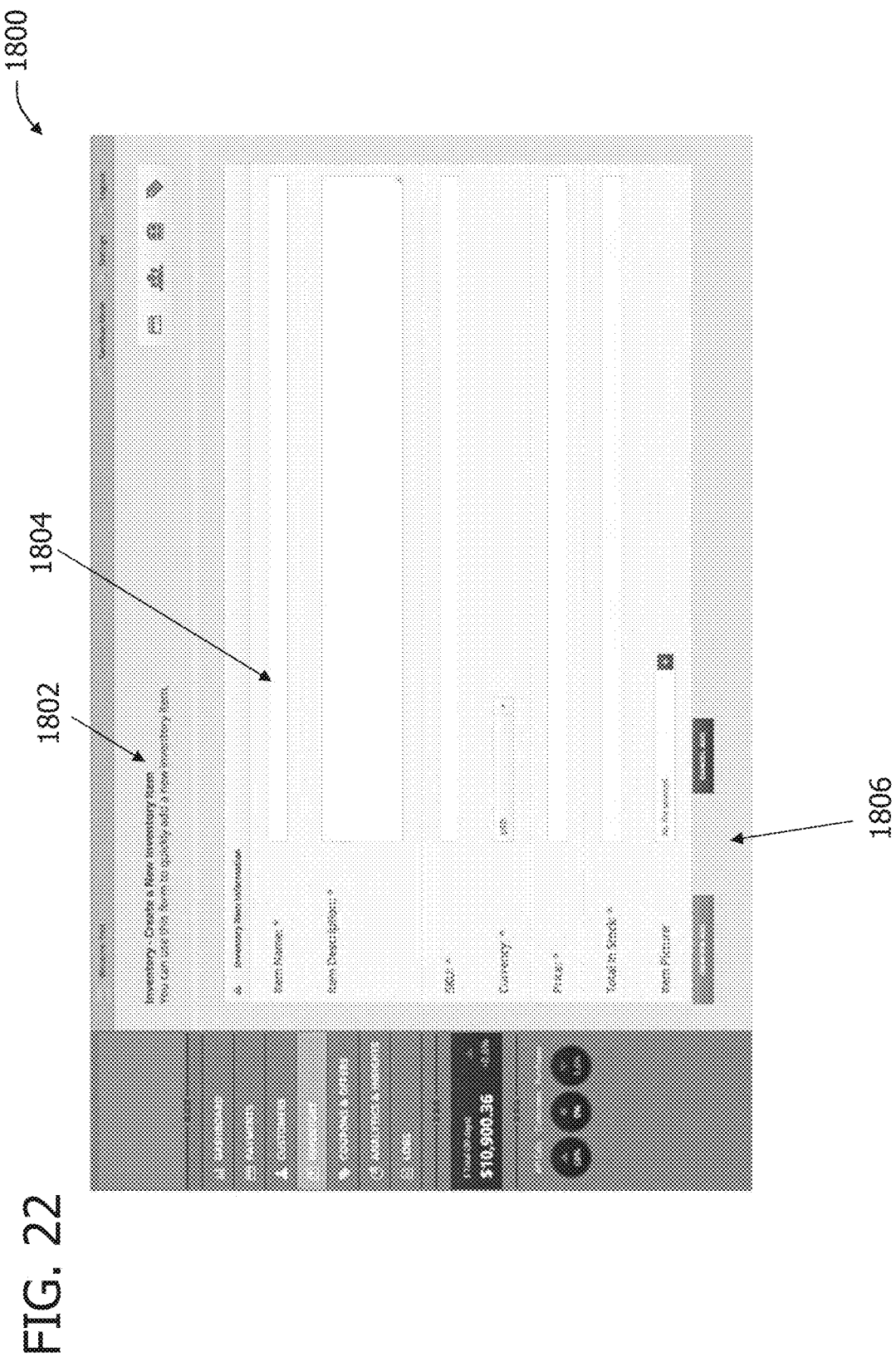

FIG. 22 illustrates an example screenshot 1800 illustrating a new inventory category screen 1802. New inventory category screen 1802 includes a link 1804 for inputting information such as, for example, item name, SKU #, currency, price, stock total and picture. Screenshot 1800 includes a link 1806 for confirming new inventory and for canceling inventory addition.

Figure 23:
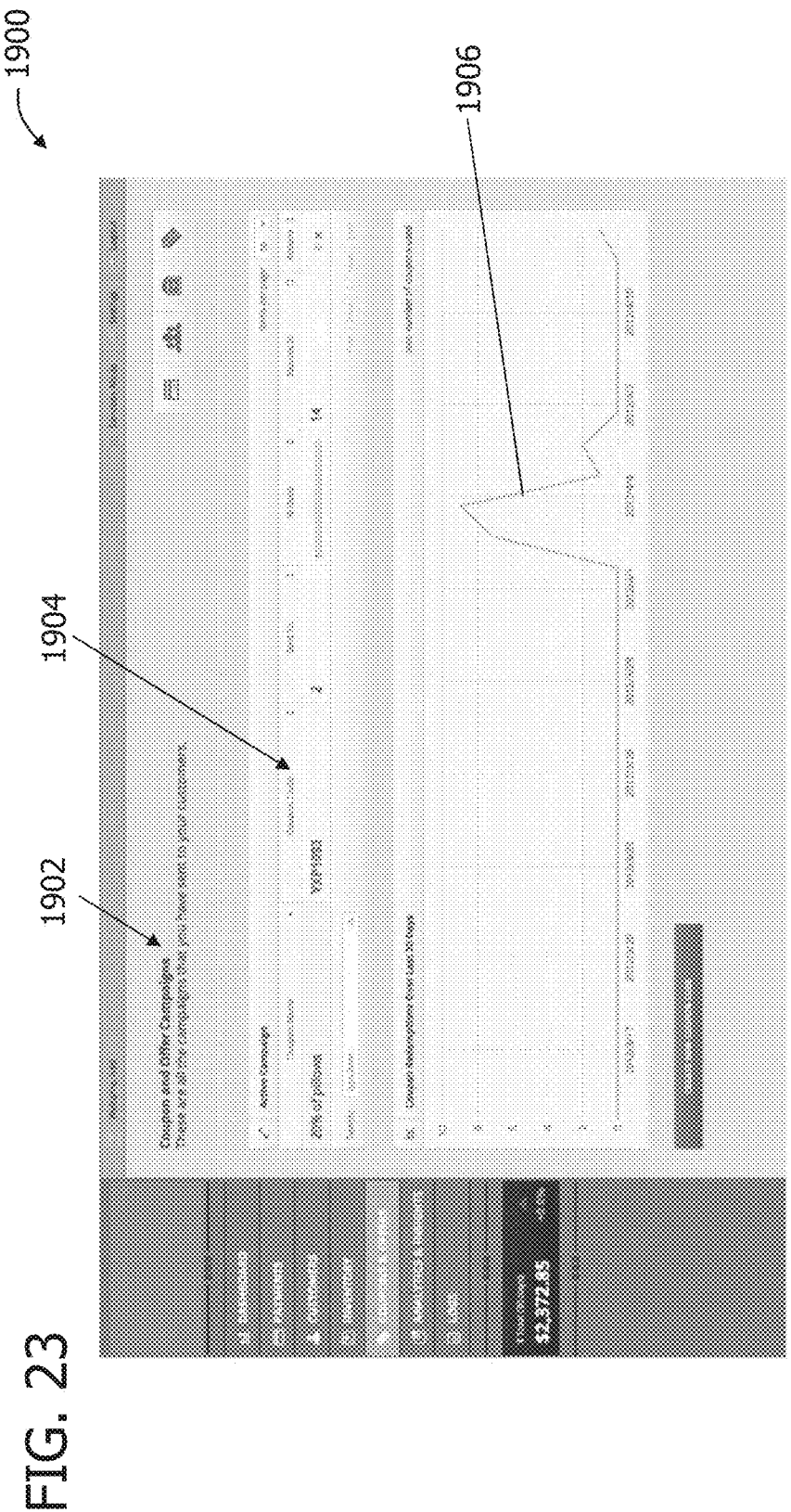

FIG. 23 illustrates an example screenshot 1900 illustrating an coupon and offer category screen 1902. Coupon and offer category screen 1902 includes information 1904 such as coupon name, coupon code, sent to, percentages used, expiration and action. Screenshot 1900 includes a graphical representation 1906 of coupon redemption over time.

Figure 24:
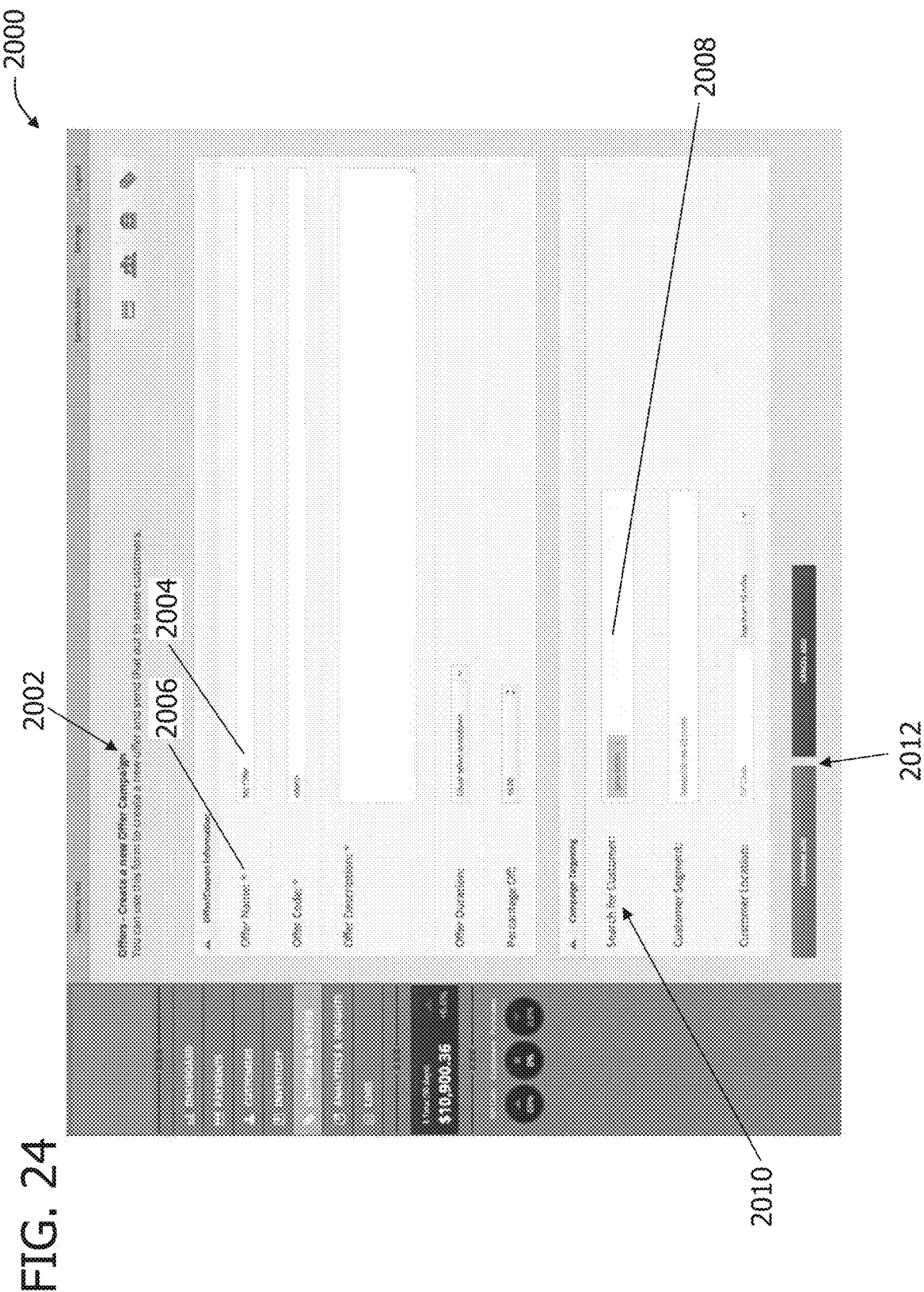

FIG. 24 illustrates an example screenshot 2000 in which a new coupon offer category screen 2002 is highlighted. New coupon offer category offer screen 2002 includes a link 2004 for inputting information 2006 such as, for example, offer name, offer code, offer description, offer duration and percentages off. New coupon category 2002 includes a link 2008 for information 2010 relating to campaign targeting. Screenshot 2000 includes a link 2012 relating to confirming new coupon campaign and canceling new coupon campaign.

Figure 25:
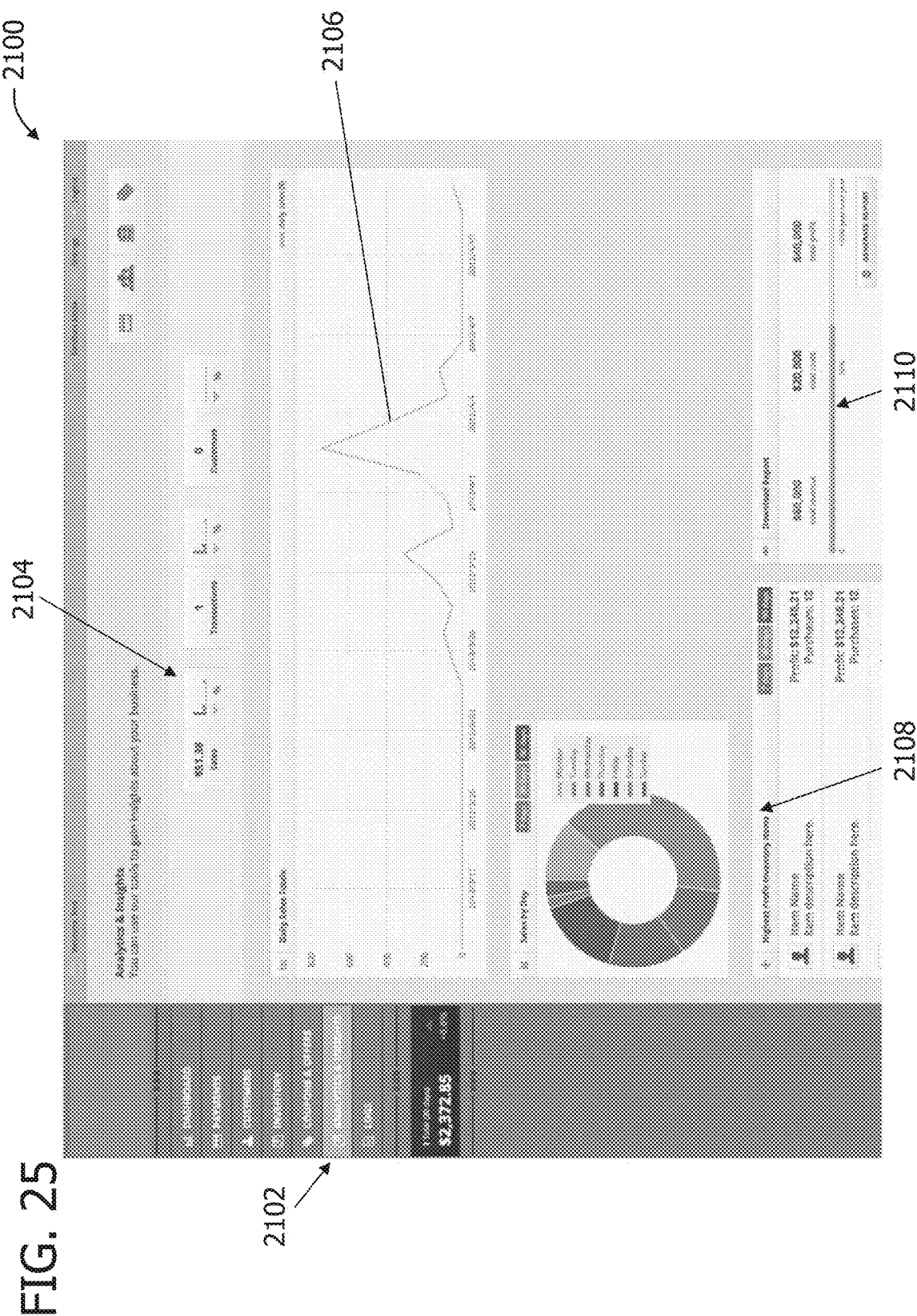

FIG. 25 illustrates an example screenshot 2100 in which an analytic category screen 2102 is highlighted. Analytic category screen 2102 illustrates summary information 2104, such as sales, transactions and customers. Screenshot 2100 includes a graphical representation 2106 of sales over time, such as weekly and/or daily time periods. Screenshot 2100 further includes information 2108 relating to higher profit items. Screenshot 2100 further includes information 2110 relating to a summary report.

Figure 26:
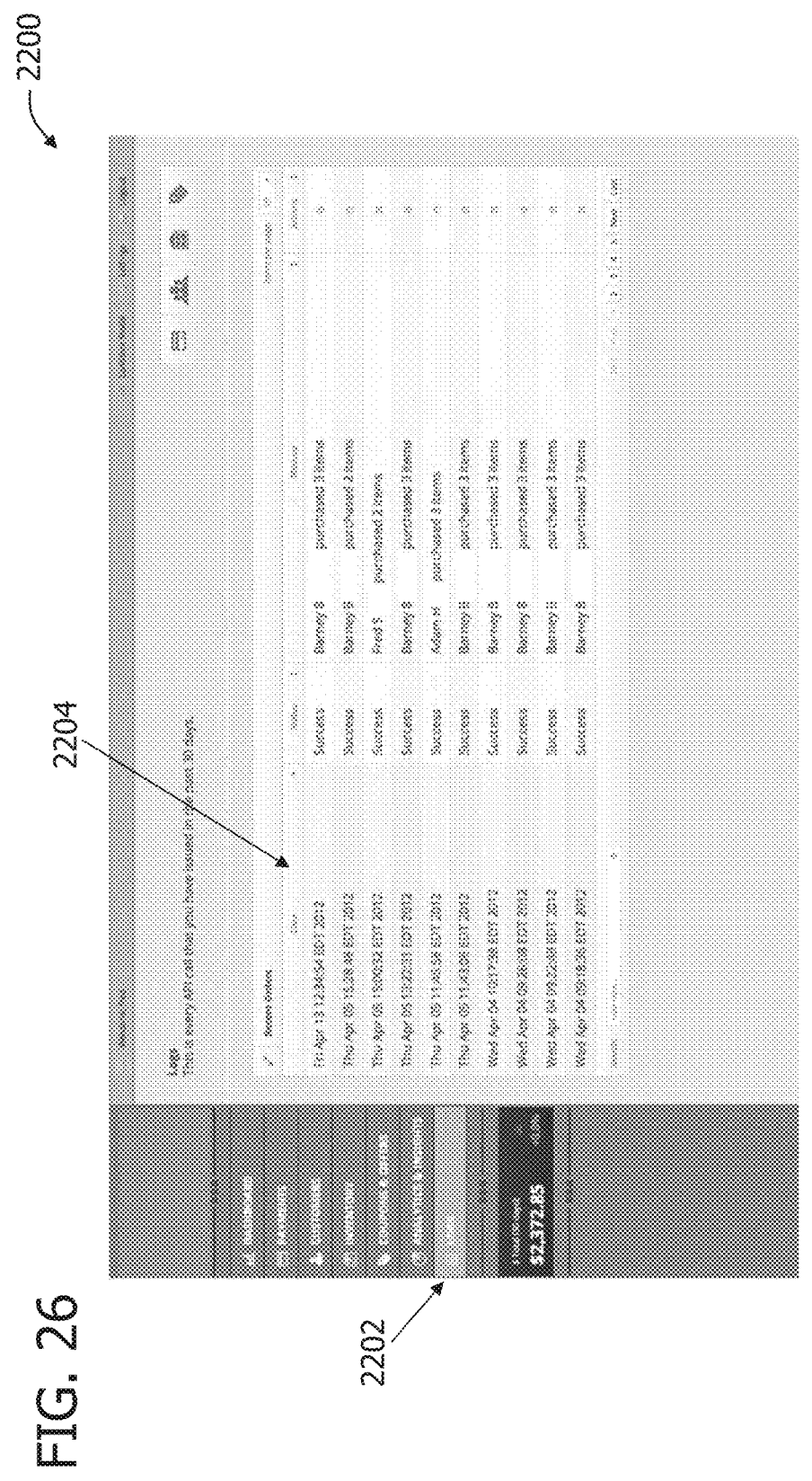

FIG. 26 illustrates an example screenshot 2200 illustrating a log category screen 2202. Log category screen 2202 includes information 2204 relating to recent order such as date, status, customer, method and action.

Figure 27:
Figure 28:
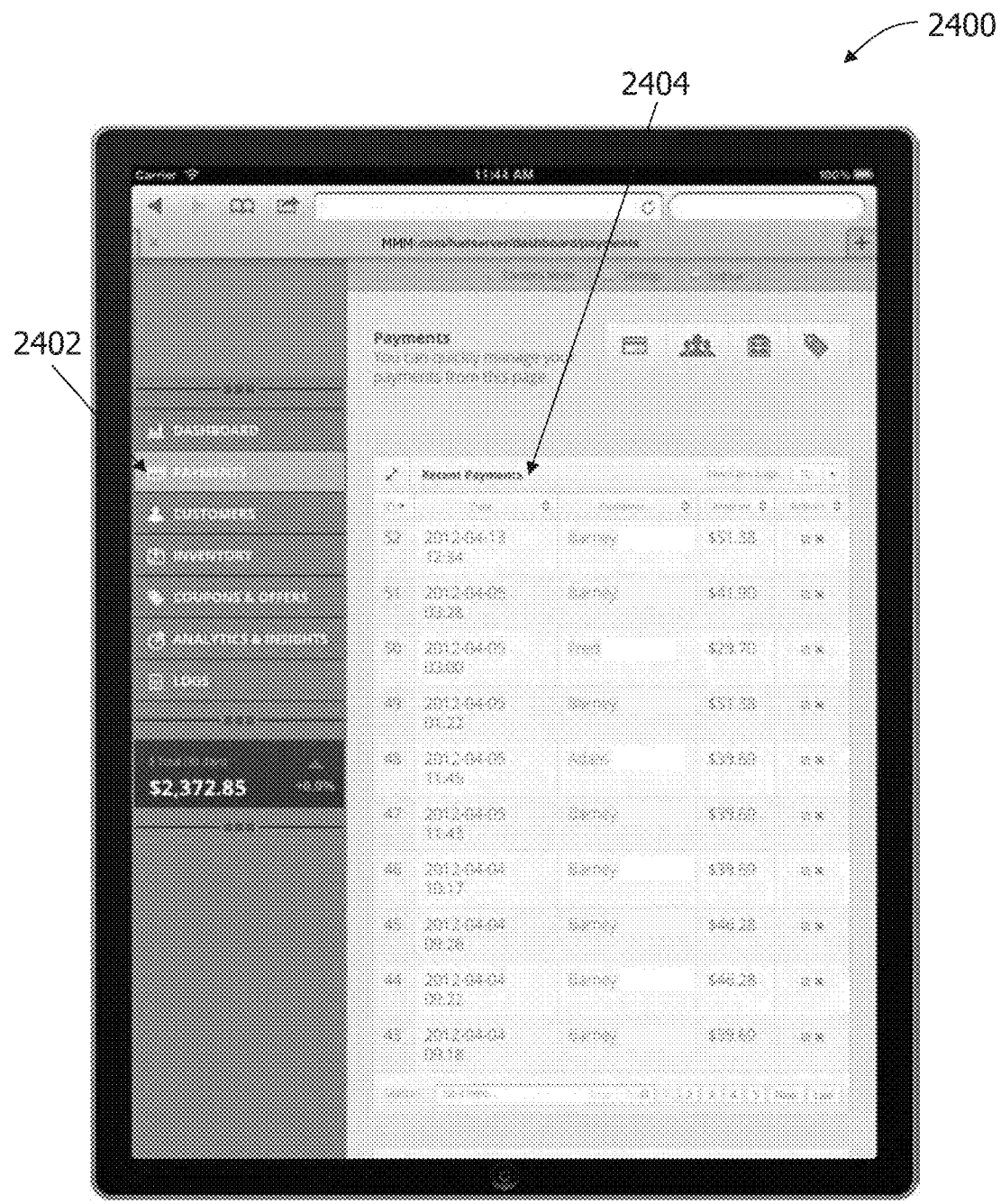
Figure 29:
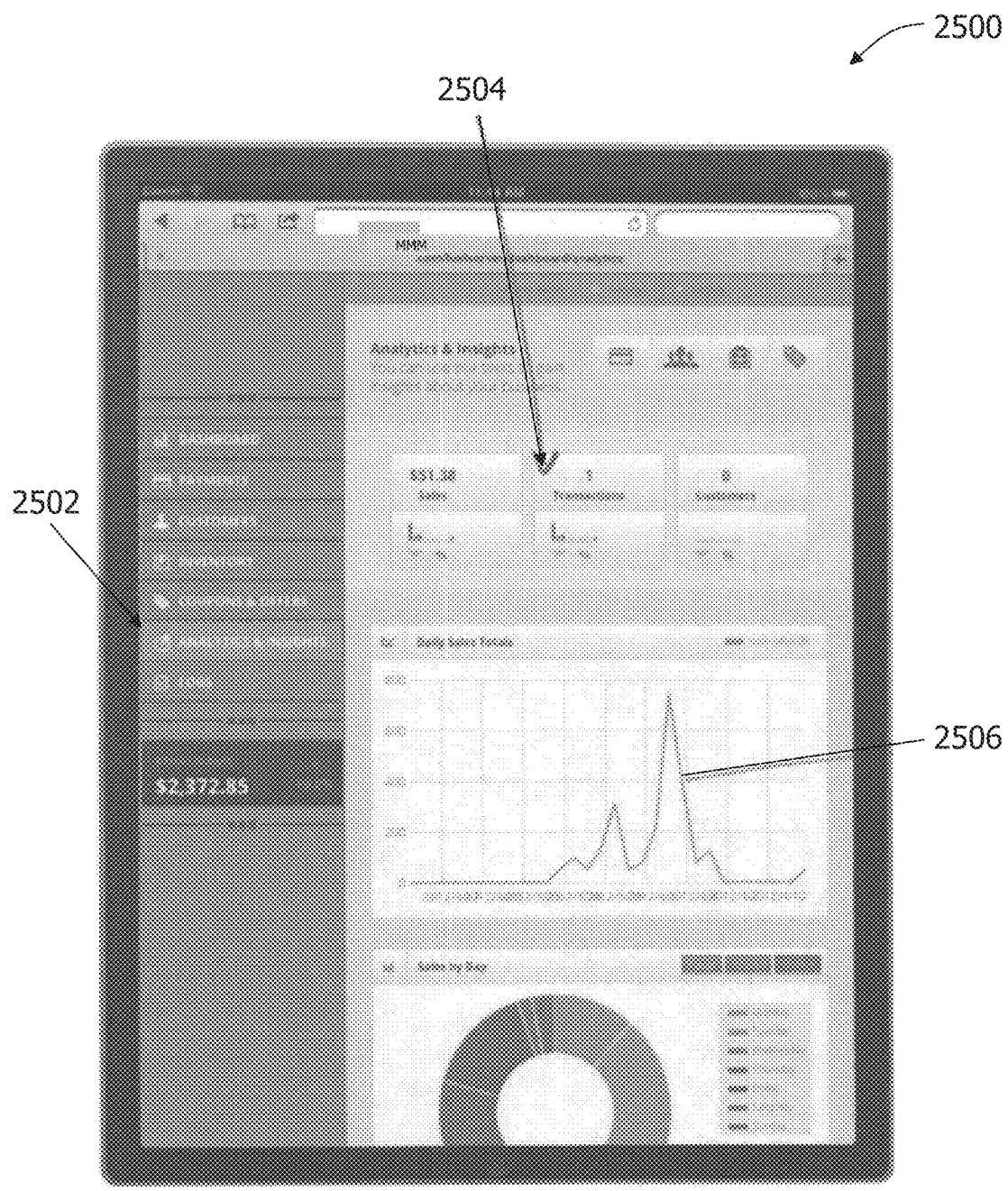

FIGS. 27-29 show example screenshots displayed from using an example embodiment of merchant manager module 503 (shown in FIGS. 6-9) that is accessible by a merchant computer device (such as user computer device 115, shown in FIGS. 2 and 3) in accordance with one embodiment of the present invention. In one embodiment, a merchant computer device includes a computer tablet which is configured to interact with service computer system 100 shown in FIGS. 2-5.

FIG. 27 illustrates an example screenshot 2300 for device 115 (shown in FIG. 2) such as, for example, a computer tablet. Screenshot 2300 includes selected dashboard category 2302 (shown highlighted), which includes summary information 2304 such as sales, transactions and customers. Screenshot 2300 further includes a sale summary category 2306 for information such as description, product, quantity and change.

FIG. 28 illustrates an example screenshot 2400, for example for input device 115. Screenshot 2400 includes a payment summary category 2402 which includes recent payment information 2404 such as, for example, payment data, customer name and payment amounts.

FIG. 29 illustrates an example screenshot 2500, for example for input device 119. Screenshot 2500 illustrates an analytic category 2502 highlighted, which includes information 2504, such as sales, transactions and customers. Screenshot 2500 further includes a graphical representation 2506 of sales over time.

Figure 30:
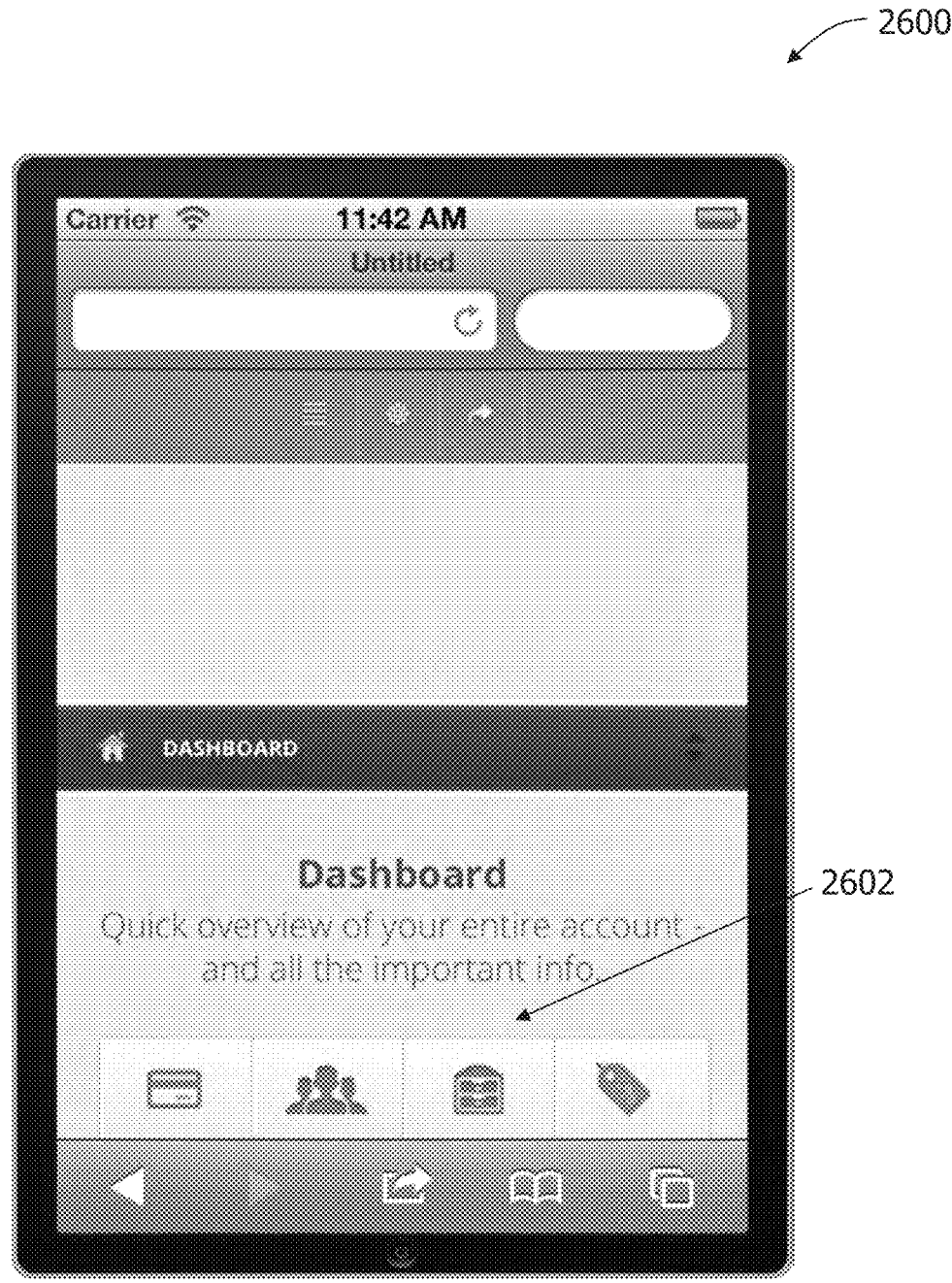
Figure 31:
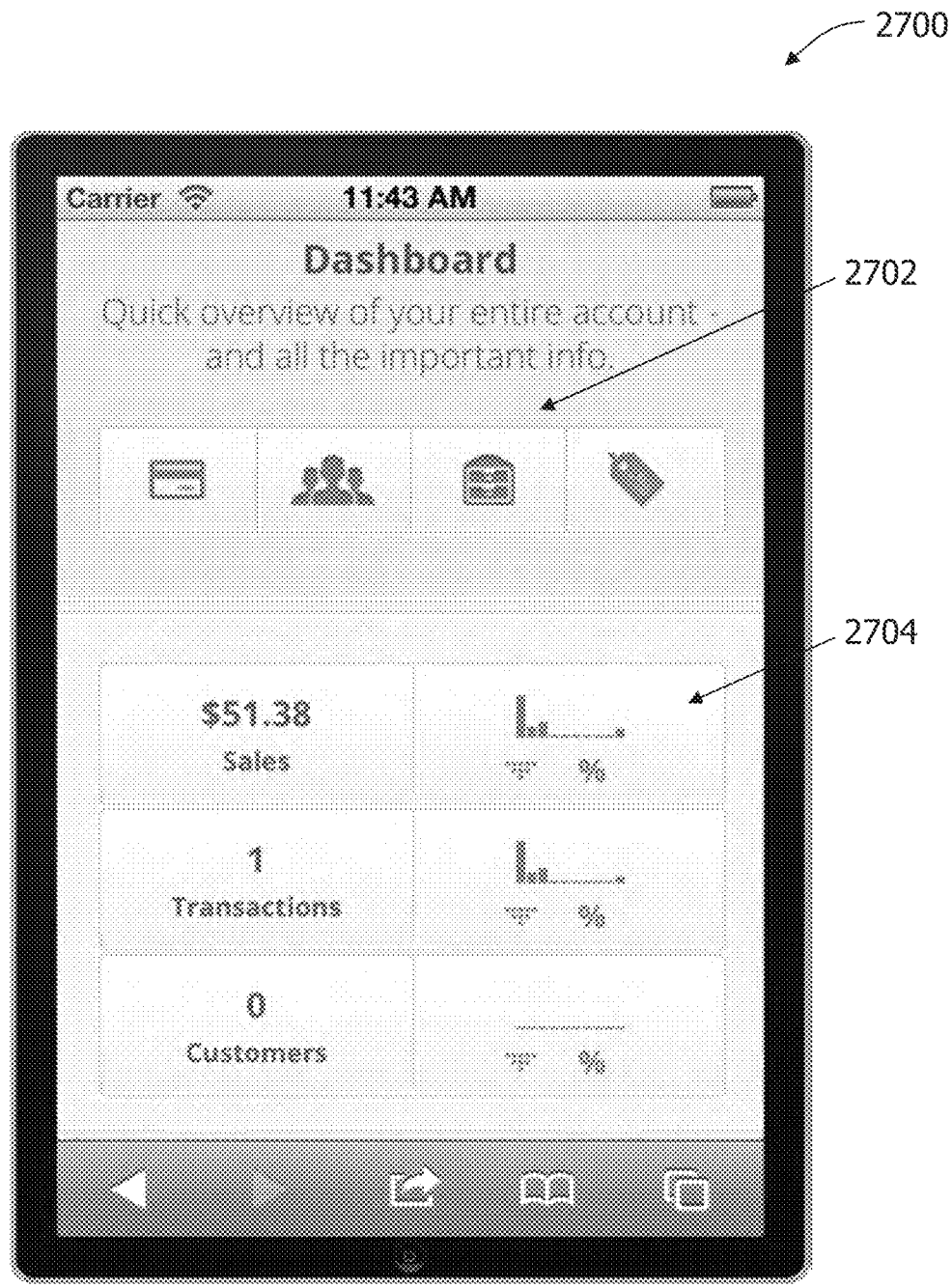

FIGS. 30-31 show example screenshots of an example embodiment of a merchant manager module 503 (shown in FIGS. 6-9) that is accessible by a merchant computer device (such as user computer device 115 shown in FIGS. 2 and 3) in accordance with one embodiment of the present invention. In one embodiment, the merchant computing device includes a smart phone 119 (shown in FIG. 2), which is configured to interact with service computer system 100 shown in FIG. 2-5.

FIG. 30 illustrates an example screenshot 2600 for input device 119 (shown in FIG. 2) such as a smart phone. Screenshot 2600 includes links 2602 for selecting category links 602 such as payment, customers, inventory and coupons and offers.

FIG. 31 illustrates an example screenshot 2700 for the device shown in FIG. 30. Screenshot 2700 includes links 2702 related to payment, customers, inventory and coupons and offers. Screenshot 2700 includes summary information 2704 related to sales, transactions and customers.

FIGS. 32-44 show example screenshots displayed from using an example embodiment of an application of merchant manager module 503 of FIGS. 30-31 that is accessible by a merchant computer device in accordance with one embodiment of the present invention.

Figure 32:

FIG. 32 illustrates an example screenshot 2800 illustrating an application 2802 for device 119 of FIGS. 30-31.

Figure 33:
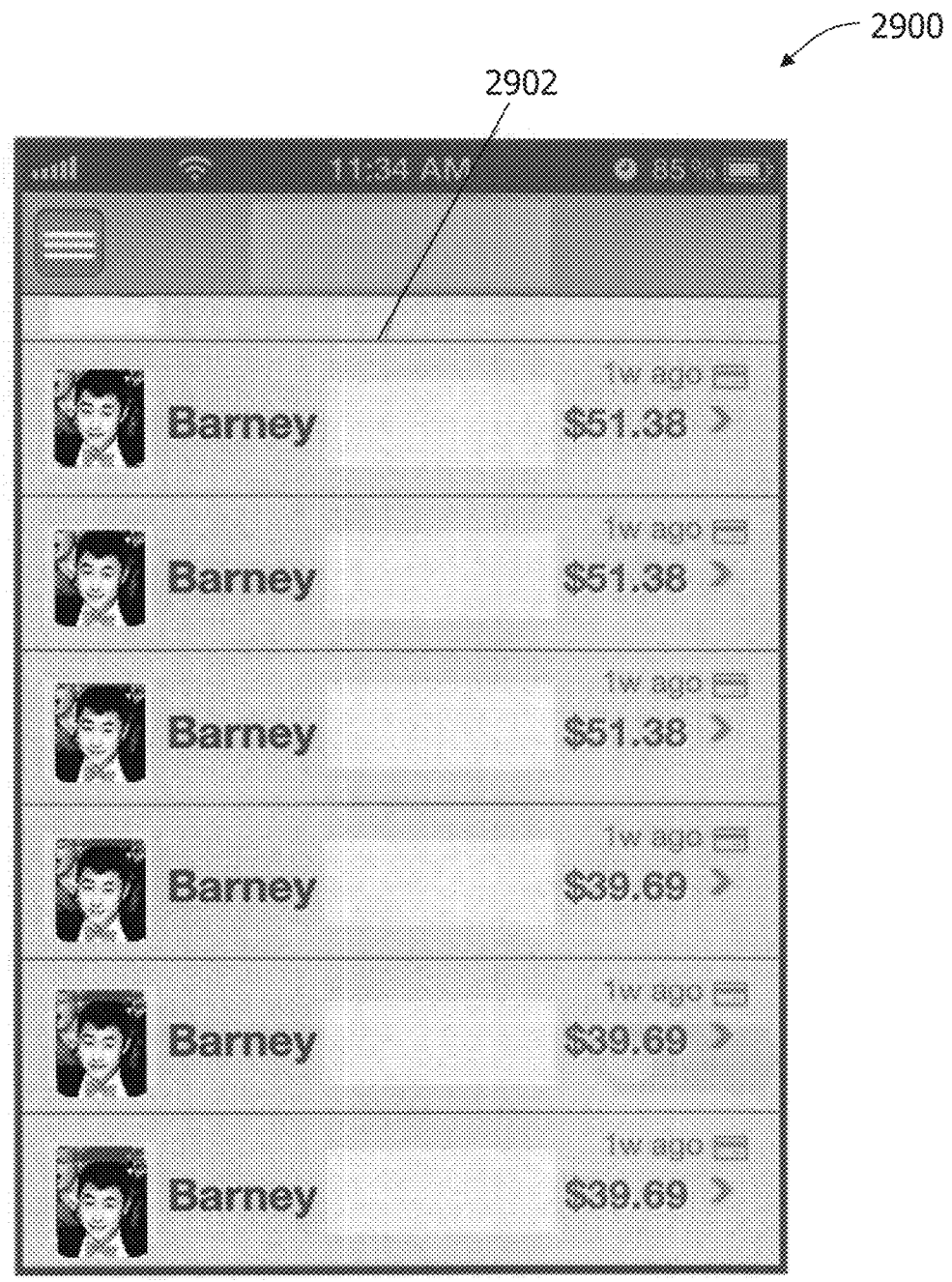

FIG. 33 illustrates an example screenshot 2900 illustrating payment information 2902 such as customer name, payment date and payment amounts.

Figure 34:
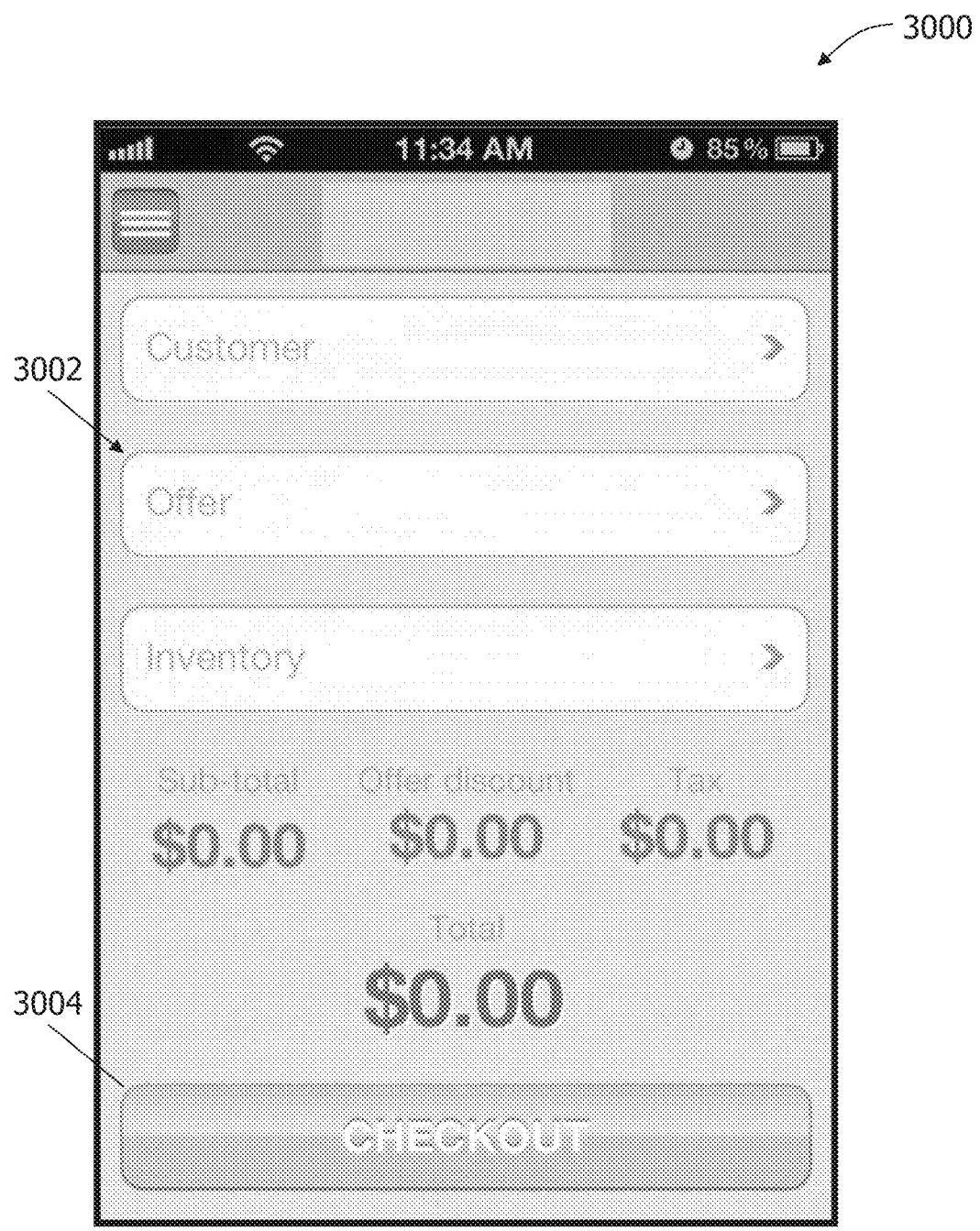

FIG. 34 illustrates an example screenshot 3000 illustrating a checkout 3002. Checkout 3002 includes input links 3004 for information such as customer, offer and inventory.

Figure 35:
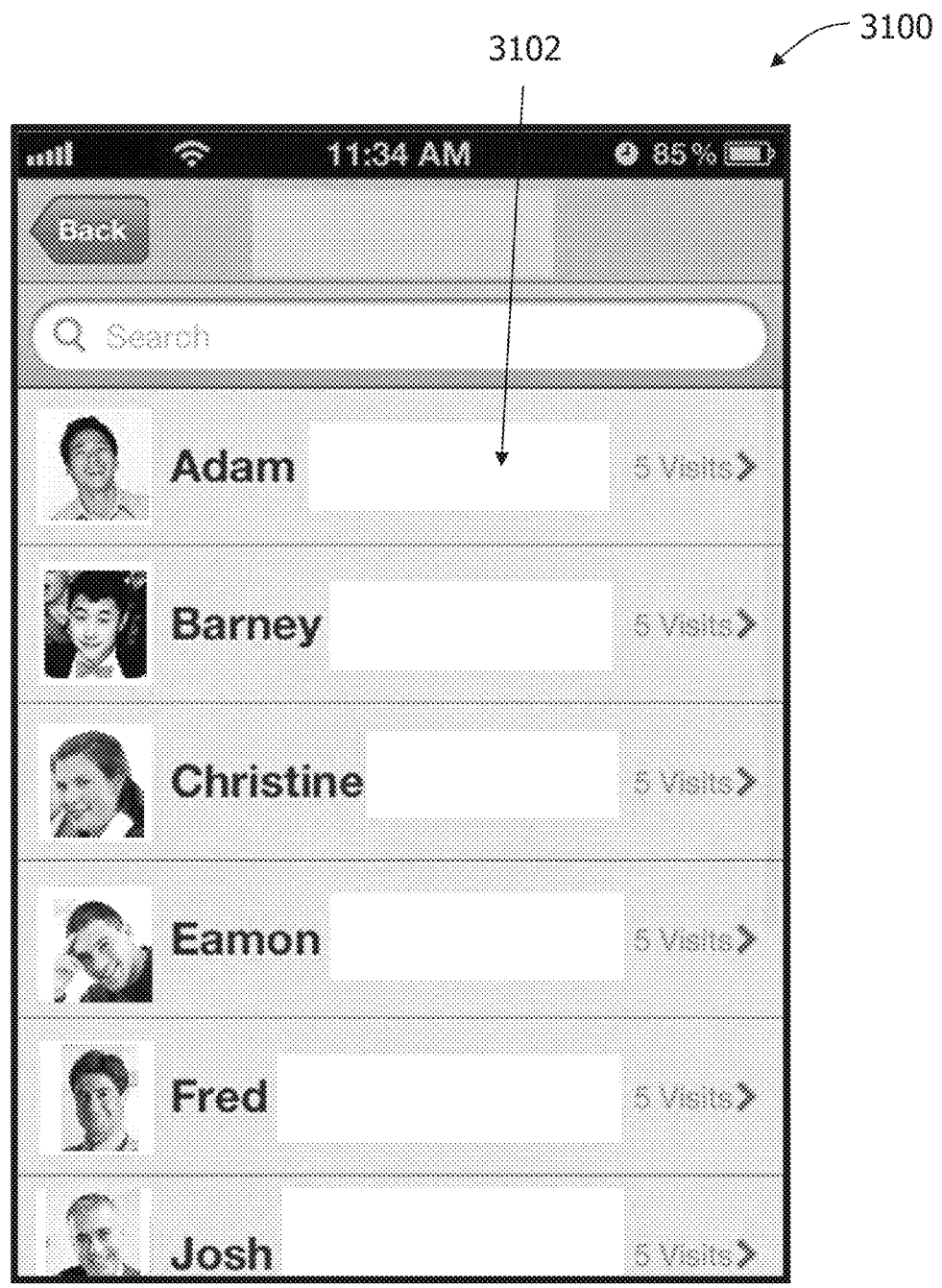
Figure 36:
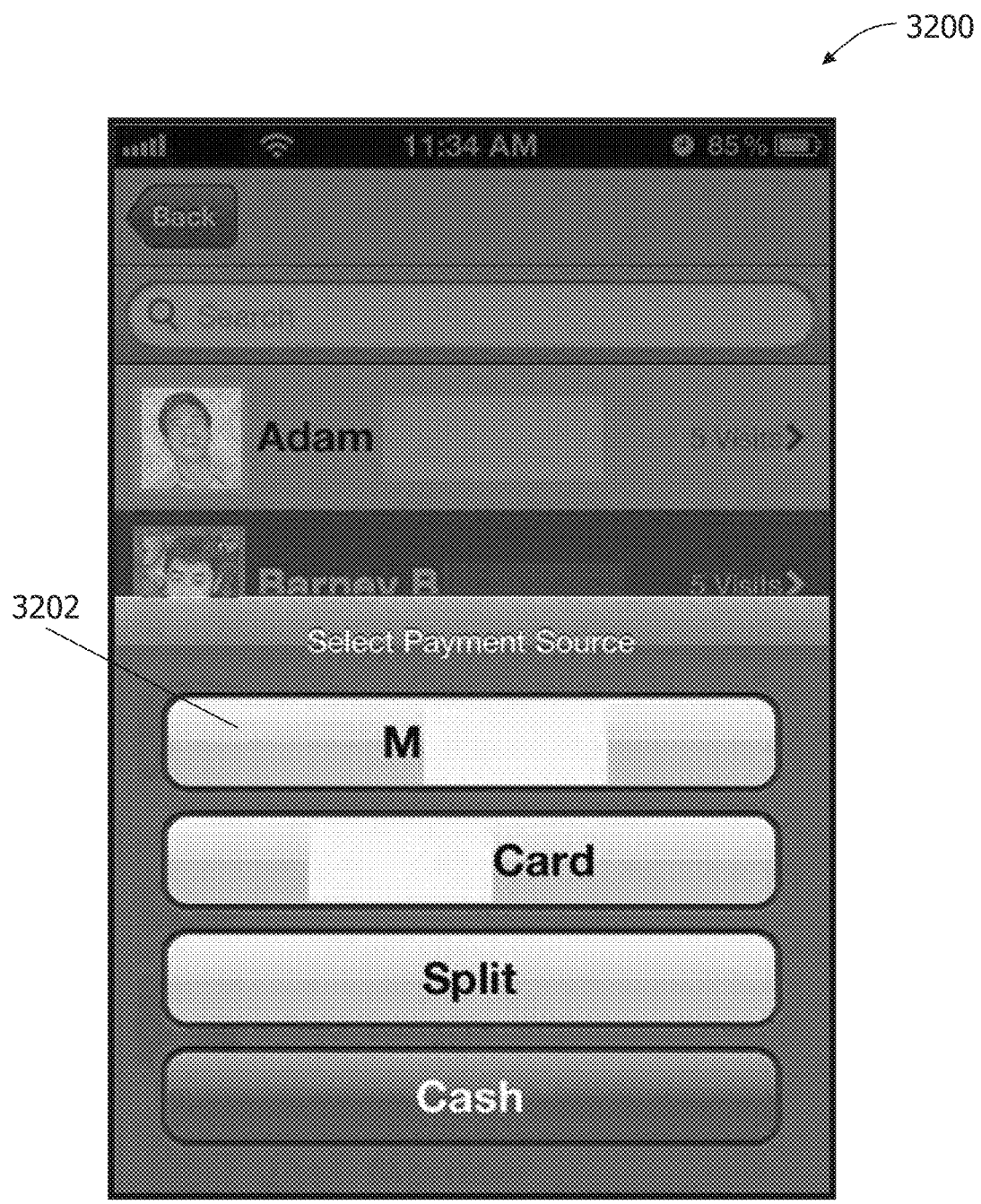
Figure 37:
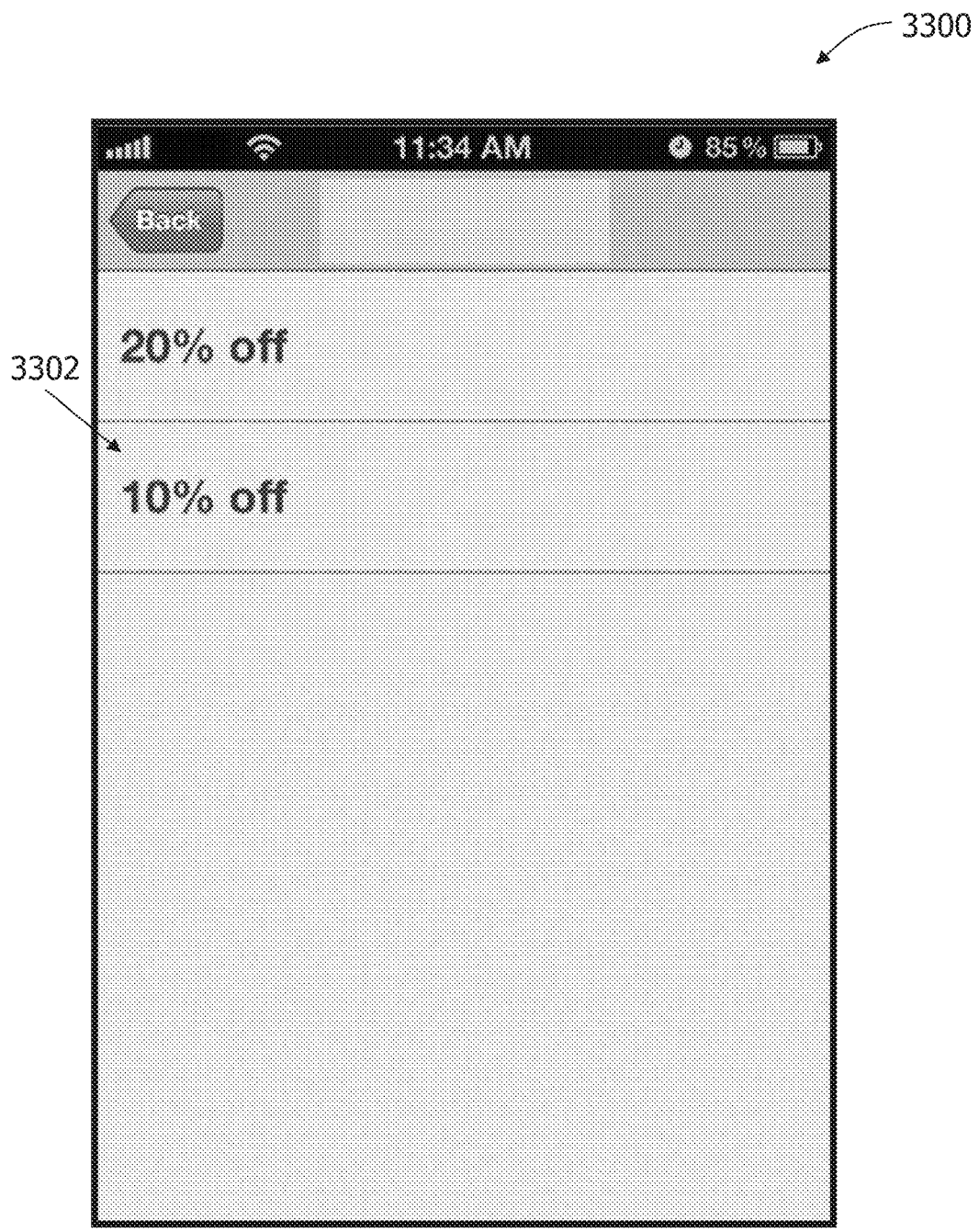

FIG. 35 illustrates an example screenshot 3100 illustrating customer information 3102 such as customer name and number of customer visits. FIG. 36 illustrates an example screenshot 3200 illustrating payment options 3202. FIG. 37 illustrates an example screenshot 3300 to illustrate coupon offerings 3302.

Figure 38:
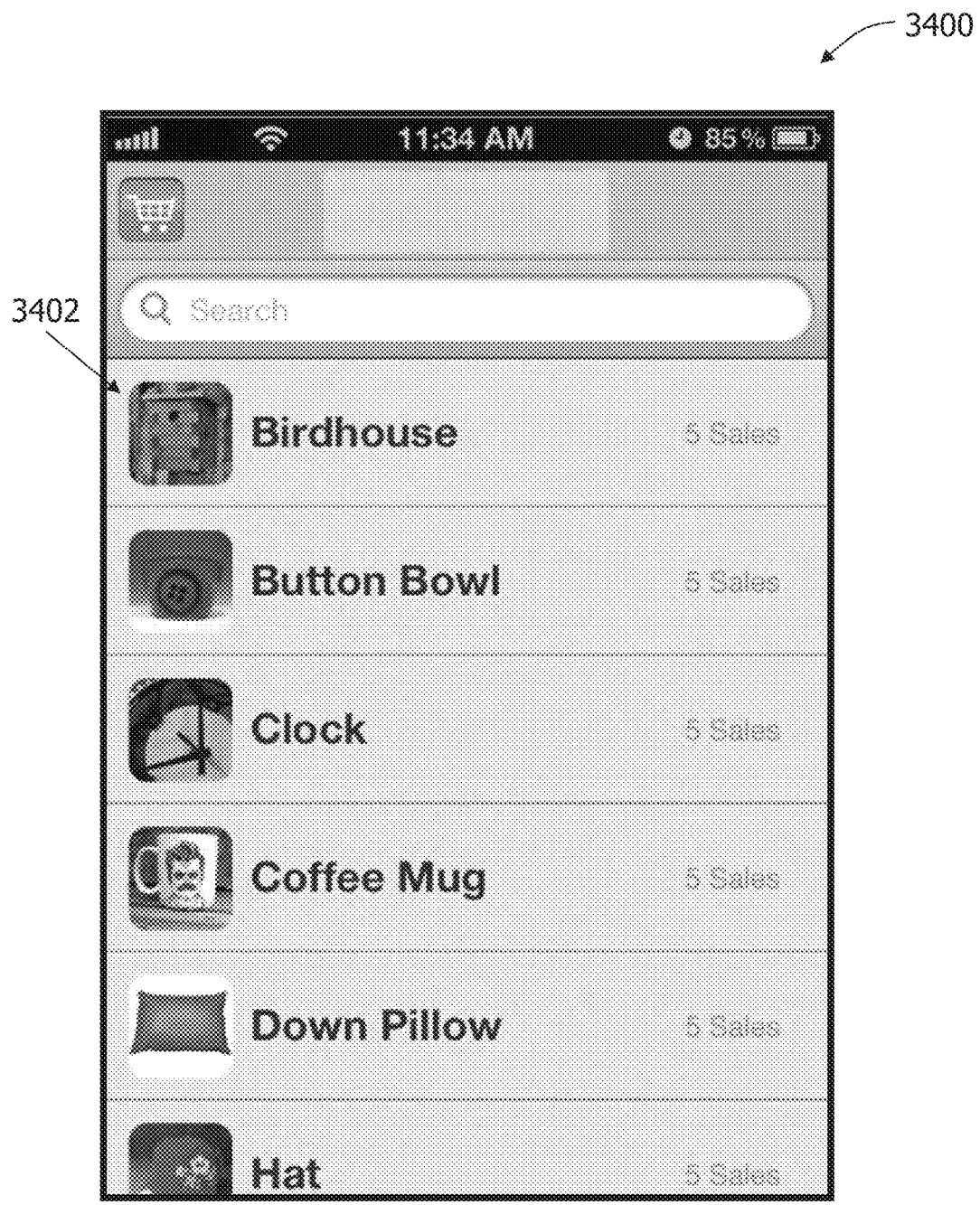
Figure 39:
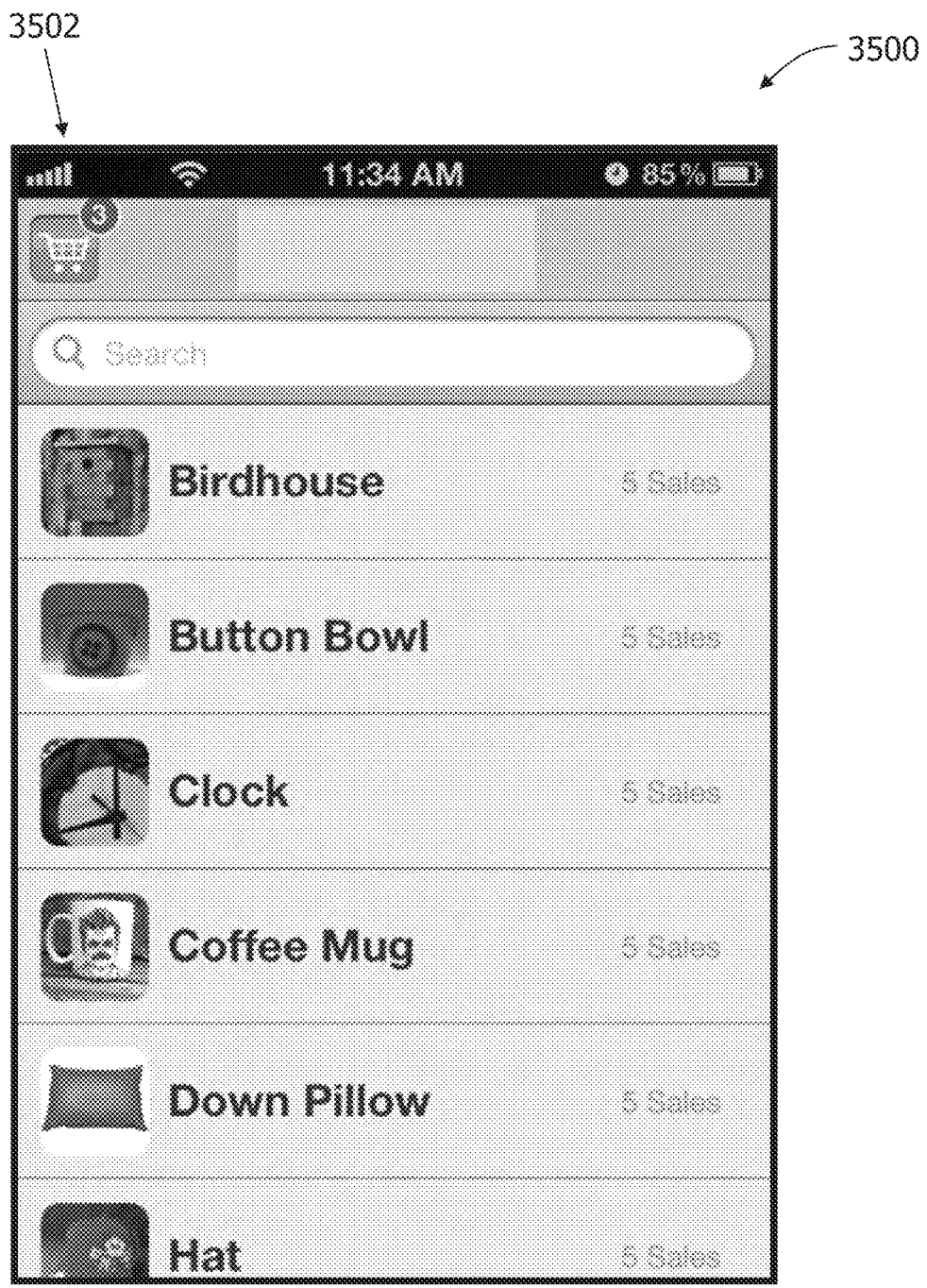

FIG. 38 illustrates an example screenshot 3400 illustrating inventory information 3402 such as product and number of sales. FIG. 39 illustrates an example screenshot 3500 of checked out items 3502 of FIG. 38.

Figure 40:
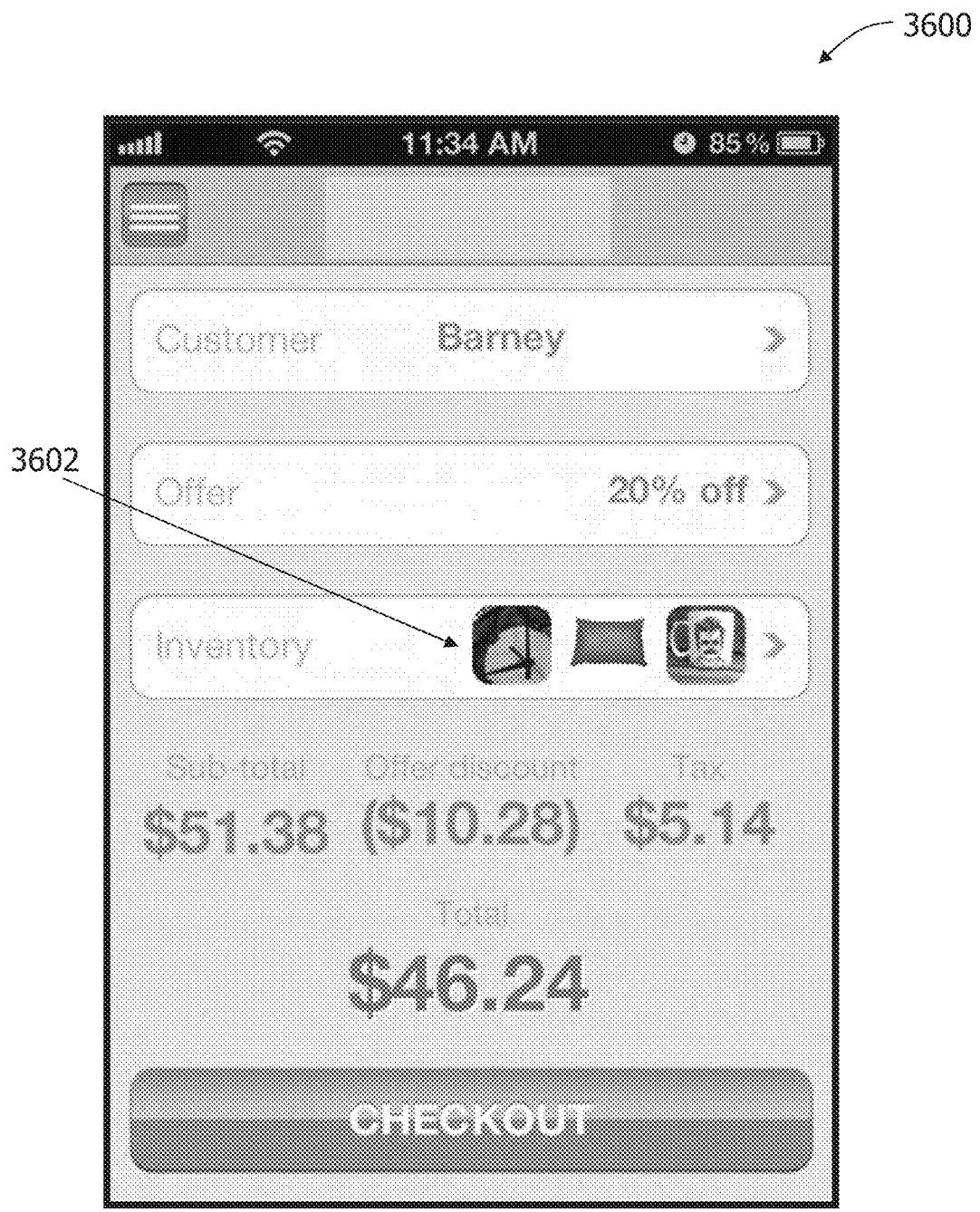
Figure 41:
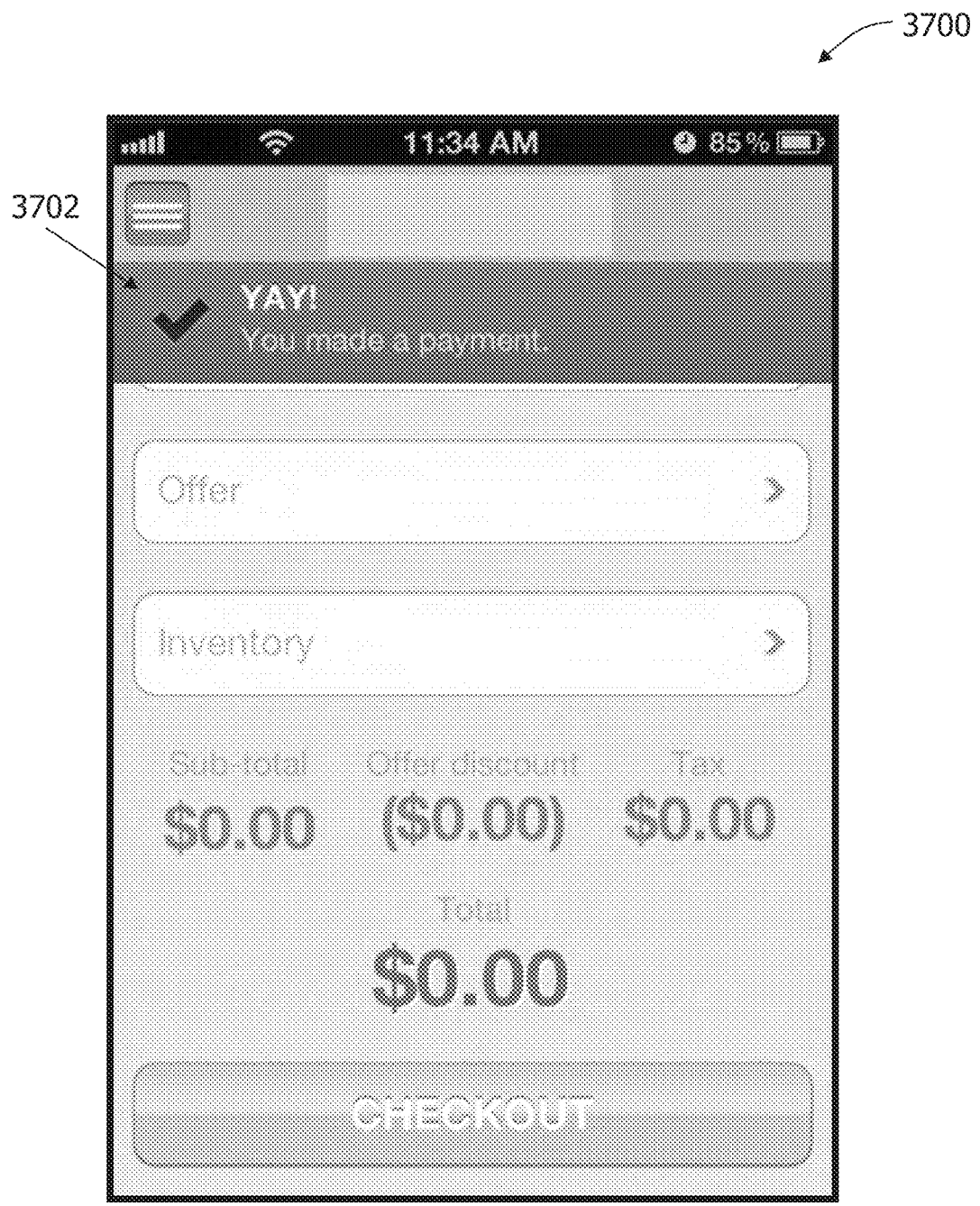

FIG. 40 illustrates an example screenshot 3600 illustrating checkout information 3602. FIG. 41 illustrates an example screenshot 3700 illustrating a payment confirmation 3702.

Figure 42:
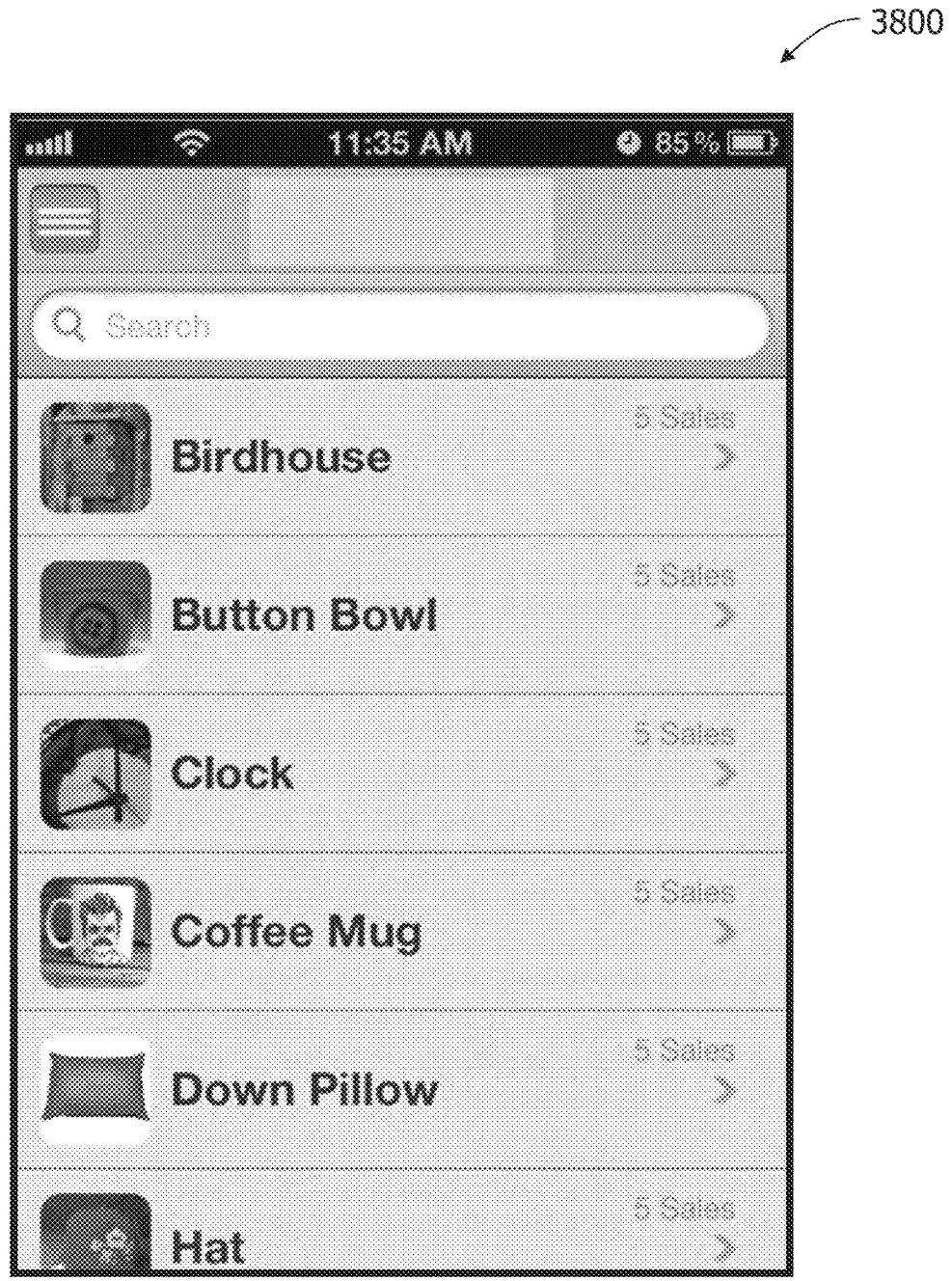
Figure 43:
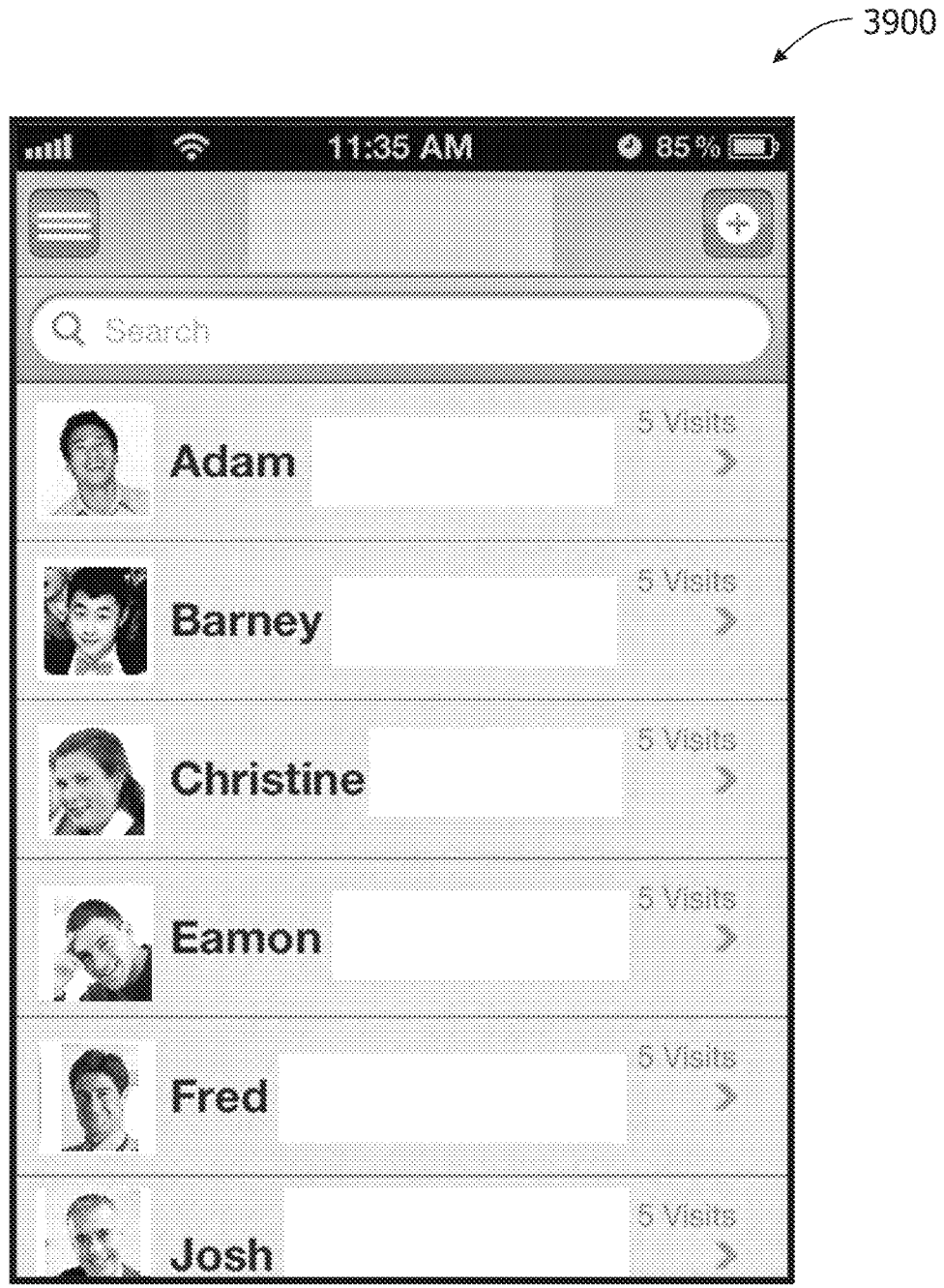
Figure 44:
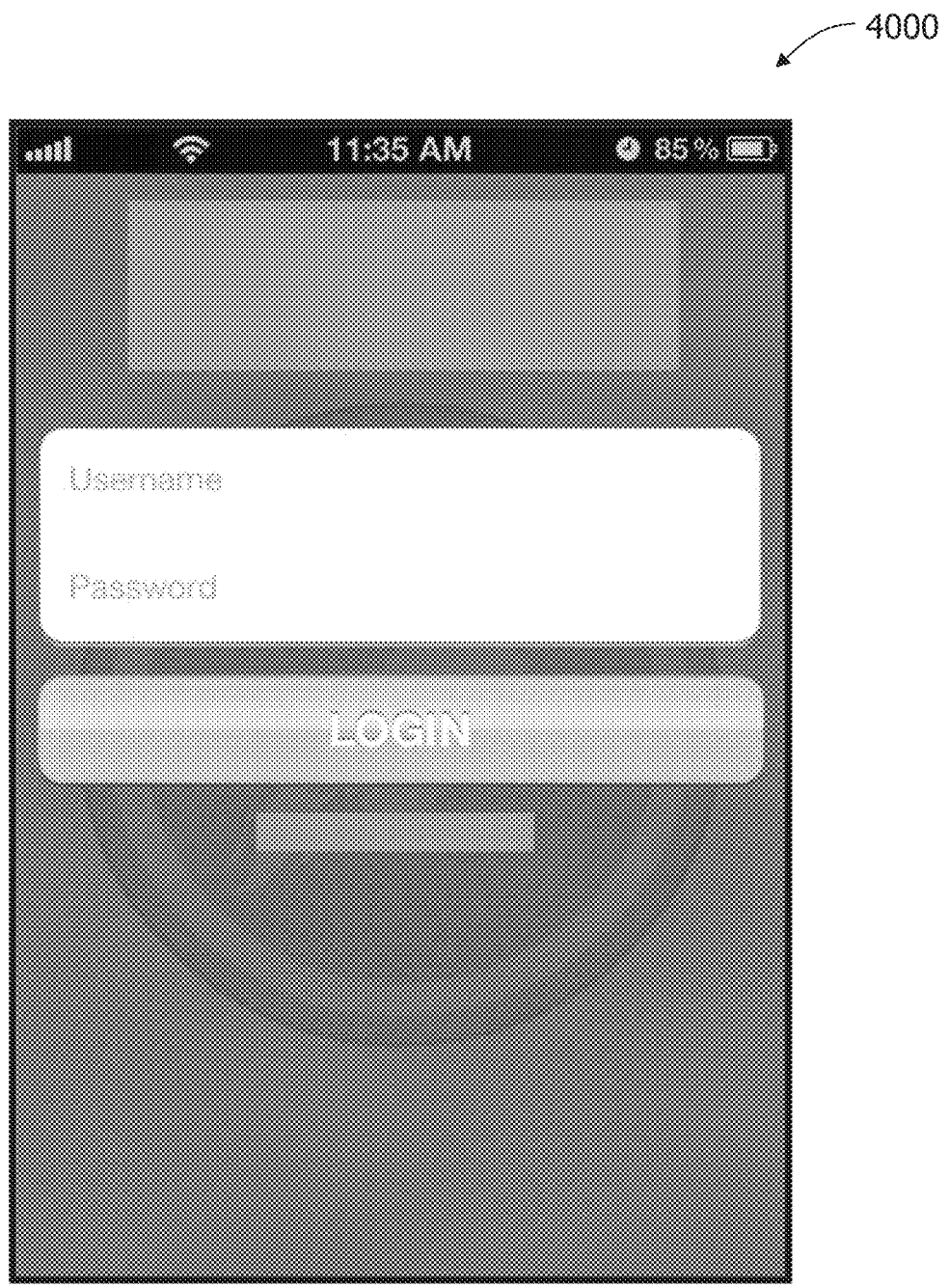

FIG. 42 illustrates an example screenshot 3800 illustrating items and number of sales. FIG. 43 illustrates an example screenshot 3900 illustrating customers and number of visits. FIG. 44 illustrates an example login screenshot 4000.

In the example embodiment, the API portal include API services documentation pages which include an explanation of service levels between general and multiple premium levels, and the process to obtain access. In addition, a developer may be required to register with a service provider computer system and provide certain additional information such as a developer pseudo ICA and an acquirer ICA (Interbank Card Association).

The systems and methods described herein also enable a developer to request a sandbox key and create a key alias. The sandbox key is a key that allows a developer to test their applications in a test area within a service provider computer system such that the application being tested is provided test data from the service provider computer system and not real data. A new sandbox key may be granted with access to all existing services with general access.

In the example embodiment, a request for a production key may use a popup with a merchant manager selection for services with merchant manager access. The developer will be prompted to select general access or merchant manager access for each service offered. If merchant manager is selected and there is a general option, then the service provider computer system will grant general access to the developer. In some cases, certain services may only have general access or only have merchant manager access. A production key with a merchant manager access request will still be generated immediately with general access granted if any of the services requested have general access. For example: in the case where a developer requests merchant manager access for certain locations, the production key will be granted general access until merchant manager access is approved; any message using the production key will be throttled based on general throttling; and messages will be forwarded without a client ID or with a client ID set for general access.

As explained above, when a production key for merchant manager access is requested, an email is sent as notification for the SO to log into an application to approve and manage requests. The email may contain a link to a service management application. The service management application could be part of the API portal or a separate application. The email sent to the SO includes, developer name, alias name, and merchant manager access requested. The system may include a configurable time limit to respond to a request by the service with the result of denying access. For example: SO offers a service having a 7 day time limit to respond to a request for merchant manager access. If the request has not been approved or denied in 7 days, it is automatically denied.

The service management application would allow the SO to log in and review pending requests, and then approve or decline premium service access. The SO would have the ability to select a developer and a key alias. After making the developer and alias selection, a screen would display at least the developer name, contact information, alias name, alias description, and merchant manager access requested. The SO would have the ability to approve or deny access, select throttling limits and throttling time limits based from the service setup. The API platform generates a client ID that the service uses to apply rules to messages. The API platform will include the client ID in messages sent to a service from the specified key alias.

The system is also configured to send an email to the developer for notifying the developer as to whether the request has been approved or denied. The system is also configured to allow the SO to view all developers and key alias approval status and transaction metrics by developer and/or by key alias. The system is configured to enable an SO to view, grant and revoke merchant manager access.

The SO provides content for service documentation pages that are accessible through the API portal. The system will also include a list of premium service levels, descriptions, and a designation showing which services require billing reports. The system will provide if a service is general only, premium only, or general and premium. The client ID will be added to messages to allow the service to determine what rules to apply to a message. The system will include a list of pre-established bill codes per service that may be returned with each message from the service that identifies the billing level of the transaction. The system will include a list of throttling settings (numbers of requests), and a SO setup page or registration page.

The system, and more specifically the API platform, may be configured to perform throttling by service, service level or production key level (client ID). All service level enforcement functionality will be handled by each service. The API platform will provide the client ID with each message. The API platform validates each message that comes through prior to sending to service. The API platform rejects any unauthorized requests.

In the example embodiment, the system includes a sandbox key to allow a developer to test an application using test data. All general services may be made available to every sandbox key. In addition, the sandbox key may be configured to allow a developer to test premium services and methods once the developer and client ID are approved.

More specifically, in an example embodiment, the SP offers to software developers a sandbox where the developers can play/test functionality of the sandbox, and receive documentation and codes from the SP. Such software developers may be working on behalf of merchants, especially small merchants, to develop, for example, websites for small merchants through which online customers may make purchases using payment cards. After engaging in such testing, software developers, acting on behalf of their clients (e.g., merchants), may apply for merchant accounts through an online interface maintained by the SP. In an example embodiment, the SP provides SDKs and APIs to developers, which developers then use to enable a merchant's website to accept payment card payments. In an example embodiment, the SP presents to developers a card payments acceptance tool, for inclusion in the developers' clients' websites.

Based on the foregoing specification, the above-discussed embodiments of the invention may be implemented using computer programming or engineering techniques including computer software, firmware, hardware or any combination or subset thereof. Any such resulting program, having computer-readable and/or computer-executable instructions, may be embodied or provided within one or more computer-readable media, thereby making a computer program product, i.e., an article of manufacture, according to the discussed embodiments of the invention. The computer readable media may be, for instance, a fixed (hard) drive, diskette, optical disk, magnetic tape, semiconductor memory such as read-only memory (ROM) or flash memory, etc., or any transmitting/receiving medium such as the Internet or other communication network or link. The article of manufacture containing the computer code may be made and/or used by executing the instructions directly from one medium, by copying the code from one medium to another medium, or by transmitting the code over a network.

While the disclosure has been described in terms of various specific embodiments, it will be recognized that the disclosure can be practiced with modification within the spirit and scope of the claims.

What is claimed is:

1. A computer-based method for managing payment transactions using a real-time merchant account activation process for a merchant using a service provider computing device coupled to a memory device, wherein the real-time merchant account activation process includes a primary approval process and a secondary approval process, and wherein each transaction is initiated by a consumer using a payment card and accepted by the merchant using a merchant mobile device, said method comprising:
   receiving, at the service provider computing device, a registration request requesting an activation of a merchant account for a candidate merchant and including registration data associated with the candidate merchant;
   initiating the primary approval process for registering the candidate merchant with an acquiring bank in real-time, wherein the primary approval process includes comparing the registration data of the candidate merchant to a high risk merchant list, and verifying the candidate merchant under the primary approval process if the comparing generates a no match for the candidate merchant;
   transmitting, from the service provider computing device, in real-time, an account request message to an acquiring bank computer device associated with the acquiring bank upon approval by the primary approval process, the account request message requesting an opening of the merchant account for the verified candidate merchant with the acquiring bank;
   receiving, at the service provider computing device, in real-time, merchant account data from the acquiring bank computer device, the merchant account data representing an agreement by the acquiring bank to underwrite payment transactions submitted by the candidate merchant to a merchant manager module of the service provider computing device, the verified candidate merchant becoming a registered merchant in real-time and having a merchant account with the acquiring bank upon approval through the secondary approval process;
   based on the registered merchant account, transmitting a credential request message to a payment processor computing device requesting provisioning of registered merchant credentials for the registered merchant from the payment processor computing device after the merchant account data is received, wherein the registered merchant credentials include security keys for the merchant to access and communicate with the merchant manager module during a first payment transaction;
   prompting the payment processor computing device to generate, in response to the credential request message, a gateway account and associated registered merchant credentials enabling the registered merchant to perform the first transaction and receive an amount of funds associated with the first transaction, wherein the gateway account is different from the merchant account;
   receiving, at the merchant manager module, the gateway account and associated registered merchant credentials from the payment processor computing device, wherein the associated registered merchant credentials include access data, and wherein the access data enables the merchant computing device to interface with the merchant manager module for processing payment card transactions;
   after the secondary approval process is completed, receiving, from the merchant mobile device associated with the registered candidate merchant, a request to access a dashboard application served by the service provider computing device, the dashboard application enabling access to a plurality of merchant manager applications including a payment application;
   receiving, from the merchant mobile device via an interaction with the payment application served to the merchant mobile device, transaction data associated with the first payment transaction and the merchant account data;
   processing, at the merchant manager module using the gateway account and associated registered merchant credentials, the first payment transaction; and
   causing the merchant manager module of the service provider computing device to complete, in real-time, the processing of the first payment transaction.

2. A computer-based method in accordance with claim 1, wherein processing the first payment transaction comprises:
   determining whether or not to approve the first payment transaction by:
      submitting transaction information to a fraud detection application to perform a real-time assessment of the first payment transaction;
      generating, based on the real-time assessment of the first payment transaction, a risk decision that indicates whether or not to approve the first payment transaction; and
      causing the merchant manager module of the service provider computing device, based on the generated risk decision, to i) approve and complete the first payment transaction, or (ii) decline and reverse the first payment transaction.

3. A computer-based method in accordance with claim 1, further comprising completing the real-time merchant account activation process in less than 30 seconds.

4. A computer-based method in accordance with claim 1, further comprising:
   storing the registered merchant credentials within the memory device; and
   notifying the registered merchant of account activation, wherein the registered merchant is then approved to submit payment transactions initiated by consumers using payment cards to the merchant manager module.

5. A computer-based method in accordance with claim 1, wherein the plurality of merchant manager applications accessible from the dashboard application further includes at least one of an inventory application, a coupons and offers application, an analytics application, and a fraud management application.

6. A computer-based method in accordance with claim 5, wherein the dashboard application displays a total summary that includes total sales over a pre-selected period of time, customer name, product, quantity, date and time of transaction, transaction amount, and product updates.

7. A computer-based method in accordance with claim 1, wherein receiving a registration request comprises receiving the registration request through an application programming interface (API) platform maintained on the service provider computing device, and wherein initiating the primary approval process comprises verifying the candidate merchant using a Member Alert To Control High Risk (MATCH) file via the API platform.

8. A computer-based method in accordance with claim 1, wherein the transaction data is transmitted from a merchant website to the merchant manager module using a proprietary communications standard promulgated by a payment network associated with the payment processor computing device.

9. A computer system for managing payment transactions using a real-time merchant account activation process for a merchant, wherein the real-time merchant account activation process includes a primary approval process and a secondary approval process, and wherein each transaction is initiated by a consumer using a payment card and accepted by the merchant using a merchant mobile device, said system comprising:

a memory device for storing data; and
a service provider computing device in communication with the memory device, said service provider computing device programmed to:
  receive, at the service provider computing device, a registration request the registration request requesting an activation of a merchant account for a candidate merchant and including registration data associated with the candidate merchant;
  initiate the primary approval process for registering the candidate merchant with an acquiring bank in real-time, wherein the primary approval process includes comparing the registration data of the candidate merchant to a high risk merchant list, and verifying the candidate merchant under the primary approval process if the compare step generates a no match for the candidate merchant;
  transmit, from the service provider computing device, in real-time an account request message to an acquiring bank computer device associated with an acquiring bank upon approval by the primary approval process, the account request message requesting an opening of the merchant account for the verified candidate merchant with the acquiring bank;
  receive, at the service provider computing device, in real-time, merchant account data from the acquiring bank computer device, the merchant account data representing an agreement by the acquiring bank to underwrite payment transactions submitted by the candidate merchant to a merchant manager module of the service provider computing device, the verified candidate merchant becoming a registered merchant in real-time and having a merchant account with the acquiring bank upon approval through the secondary approval process;
  based on the registered merchant account, transmit a credential request message to a payment processor computing device requesting provisioning of registered merchant credentials for the registered merchant from the payment processor computing device after the merchant account data is received, wherein the registered merchant credentials include security keys for the merchant to access and communicate with the merchant manager module during a first payment transaction;
  prompt the payment processor computing device to generate, in response to the credential request message, a gateway account and associated registered merchant credentials enabling the registered merchant to perform the first transaction and receive an amount of funds associated with the first transaction, wherein the gateway account is different from the merchant account;
  receive, at the merchant manager module, the gateway account and associated registered merchant credentials from the payment processor computing device, wherein the associated registered merchant credentials include access data, and wherein the access data enables the merchant computing device to interface with the merchant manager module for processing payment card transactions;
  after the secondary approval process is completed, receive, from the merchant mobile device associated with the registered candidate merchant, a request to access a dashboard application served by the service provider computing device, the dashboard application enabling access to a plurality of merchant manager applications including a payment application;
  receive, from the merchant mobile device via an interaction with the payment application served to the merchant mobile device, transaction data associated with the first payment transaction and the merchant account data;
  process, at the merchant manager module, using the gateway account and the associated registered merchant credentials, the first payment transaction; and
  cause the merchant manager module of the service provider computing device to complete, in real-time, the processing of the first payment transaction.

10. A computer system in accordance with claim 9, wherein the registration data includes at least one of a legal name, a statement name, a URL (Uniform Resource Locator), a description, a customer service phone number, a business address, a business city, a business state, a business zip code, a business state of filing, a business start date, a business type, a tax id/EIN, an owner first name, an owner last name, an owner address, an owner city, an owner state, an owner zip code, a social security number, a date of birth, a phone number, a mobile phone number, a bank name, a routing number, an account number, an average payment amount, an average number of payments monthly, a maximum payment amount, whether the merchant ships goods (Y/N), and a typical number of days to delivery.

11. A computer system in accordance with claim 9, wherein the service provider computing device is programmed to complete the real-time merchant account activation process in less than 30 seconds.

12. A computer system in accordance with claim 9, wherein the service provider computing device is programmed to:
  cause the memory device to store the registered merchant credentials thereon; and
  notify the registered merchant of account activation, wherein the registered merchant is then approved to submit payment transactions initiated by consumers using payment cards to the merchant manager module.

13. A computer system in accordance with claim 9, wherein the plurality of merchant manager applications accessible from the dashboard application further includes at least one of a customer's application, an inventory application, a coupons and offers application, an analytics application and a fraud management application.

14. A computer system in accordance with claim 13, wherein the dashboard application displays a total summary that includes at least one of total sales over a pre-selected period of time, customer name, product, quantity, date and time of transaction, transaction amount, and product updates.

15. One or more computer-readable storage media having computer-executable instructions embodied thereon for managing payment transactions using a real-time merchant account activation process for a merchant, wherein each transaction is initiated by a consumer using a payment card and accepted by the merchant using a merchant mobile device, wherein the real-time merchant account activation process includes a primary approval process and a secondary approval process, and wherein when executed by at least one service provider computing device coupled to a memory device, said computer-executable instructions cause the service provider computing device to:

initiate a registration request requesting an activation of a merchant account for a candidate merchant and including registration data associated with the candidate merchant;

initiate the primary approval process for registering the candidate merchant with an acquiring bank in real-time, wherein the primary approval process includes comparing the registration data of the candidate merchant to a high risk merchant list, and verifying the candidate merchant under the primary approval process if the compare step generates a no match for the candidate merchant;

transmit, from the service provider computing device, in real-time, an account request message to an acquiring bank computer device associated with an acquiring bank upon approval by the primary approval process, the account request message requesting an opening of the merchant account for the verified candidate merchant with the acquiring bank;

receive, at the service provider computing device, in real-time, merchant account data from the acquiring bank computer device, the merchant account data representing an agreement by the acquiring bank to underwrite payment transactions submitted by the candidate merchant to a merchant manager module of the service provider computing device, the verified candidate merchant becoming a registered merchant in real-time and having a merchant account with the acquiring bank upon approval through the secondary approval process;

based on the registered merchant account, transmit a credential request message to a payment processor computing device requesting provisioning of registered merchant credentials for the registered merchant from the payment processor computing device after the merchant account data is received, wherein the registered merchant credentials include security keys for the merchant to access and communicate with the merchant manager module during a first payment transaction;

prompt the payment processor computing device to generate, in response to the credential request message being received, generate a gateway account and associated registered merchant credentials enabling the registered merchant to perform the first transaction and receive an amount of funds associated with the first transaction, wherein the gateway account is different from the merchant account;

receive, at the merchant manager module, the gateway account and associated registered merchant credentials from the payment processor computing device, wherein the associated registered merchant credentials include access data, and wherein the access data enables the merchant computing device to interface with the merchant manager module for processing payment card transactions;

after the secondary approval process is completed, receive, from the merchant mobile device associated with the registered candidate merchant, a request to access a dashboard application served by the service provider computing device, the dashboard application enabling access to a plurality of merchant manager applications including a payment application;

receive, from the merchant mobile device via an interaction with the payment application served to the merchant mobile device, transaction data associated with the first payment transaction and the merchant account data;

process, at the merchant manager module, using the gateway account and associated registered merchant credentials, the first payment transaction; and cause the merchant manager module of the service provider computing device to complete, in real-time, the processing of the first payment transaction.

16. The computer-readable storage media in accordance with claim 15, wherein the registration data includes at least one of a legal name, a statement name, a URL (Uniform Resource Locator), a description, a customer service phone number, a business address, a business city, a business state, a business zip code, a business state of filing, a business start date, a business type, a tax id/EIN, an owner first name, an owner last name, an owner address, an owner city, an owner state, an owner zip code, a social security number, a date of birth, a phone number, a mobile phone number, a bank name, a routing number, an account number, an average payment amount, an average number of payments monthly, a maximum payment amount, whether the merchant ships goods (Y/N), and a typical number of days to delivery.

17. The computer-readable storage media in accordance with claim 15, wherein said computer-executable instructions cause said service provider computing device to complete the real-time merchant account activation process in less than 30 seconds.

18. The computer-readable storage media in accordance with claim 15, wherein said computer-executable instructions cause said service provider computing device to:
cause the memory device to store the registered merchant credentials thereon; and
notify the registered merchant of account activation, wherein the registered merchant is then approved to submit payment transactions initiated by consumers using payment cards to the merchant manager module.

19. The computer-readable storage media in accordance with claim 15, wherein the plurality of merchant manager applications accessible from the dashboard application further includes at least one of a customer's application, an inventory application, a coupons and offers application, an analytics application and a fraud management application.

20. The computer-readable storage media in accordance with claim 19, wherein said computer-executable instructions cause said service provider computing device to cause the merchant manager module to:
receive from the merchant computing device a selection of an application;
receive from the merchant computing device input data related to the selected application; and
cause the merchant manager module to process the input data within the selected application.

* * * * *